US 8,089,664 B2
Jan. 3, 2012

(12) United States Patent
Yokochi

(10) Patent No.: US 8,089,664 B2
(45) Date of Patent: Jan. 3, 2012

(54) IMAGE READING DEVICE

(75) Inventor: Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 979 days.

(21) Appl. No.: 12/010,966

(22) Filed: Jan. 31, 2008

(65) Prior Publication Data
US 2008/0198426 A1 Aug. 21, 2008

(30) Foreign Application Priority Data

Jan. 31, 2007 (JP) ................................. 2007-022450
Feb. 28, 2007 (JP) ................................. 2007-049979

(51) Int. Cl.
H04N 1/04 (2006.01)
(52) U.S. Cl. ........ 358/474; 358/498; 358/497; 358/496; 358/486; 399/221
(58) Field of Classification Search .................. 358/486, 358/498, 497, 475, 488, 474, 496, 1.9; 399/12, 399/211
See application file for complete search history.

(56) References Cited

U.S. PATENT DOCUMENTS

| 4,914,525 | A | * | 4/1990 | Abe et al. ........................ 358/498 |
| 5,107,344 | A | * | 4/1992 | Nosaki et al. ................... 358/401 |
| 5,289,100 | A | * | 2/1994 | Joseph ............................ 318/799 |
| 5,875,376 | A | * | 2/1999 | Chou .............................. 399/211 |
| 5,912,747 | A | * | 6/1999 | Murakami ...................... 358/497 |
| 6,603,514 | B1 | | 8/2003 | Tsai et al. |
| 6,608,705 | B1 | | 8/2003 | Oshima et al. |
| 6,611,360 | B1 | * | 8/2003 | Kataoka ......................... 358/461 |
| 6,760,132 | B1 | * | 7/2004 | Shibata .......................... 358/488 |
| 6,970,272 | B2 | * | 11/2005 | Nanno ............................ 358/1.9 |
| 7,119,934 | B2 | | 10/2006 | Yoshida et al. |
| 7,149,012 | B2 | * | 12/2006 | Fang et al. ..................... 358/497 |
| 7,235,769 | B2 | | 6/2007 | Uemura |
| 7,345,797 | B2 | * | 3/2008 | Jones ............................. 358/496 |
| 7,418,818 | B2 | * | 9/2008 | Kato et al. ....................... 60/324 |

(Continued)

FOREIGN PATENT DOCUMENTS
JP H01-174160 A 7/1989
(Continued)

OTHER PUBLICATIONS

Japan Patent Office, Notification of Reasons for Refusal for Japanese Patent Application No. 2007-022389 (related to above-captioned patent application), dispatched May 17, 2011.

(Continued)

Primary Examiner — Negussie Worku
(74) Attorney, Agent, or Firm — Baker Botts L.L.P.

(57) ABSTRACT

An image reading device according to one aspect of the invention comprises: a conveying unit configured to convey a recording medium; a first transmissive portion having a first surface that allows the recording medium to pass the first surface; a second transmissive portion having a second surface on which a recording medium is allowed to be placed; an image reading unit comprising a line sensor extending in a first direction and movable on a second path, the second path continuously extending below the first transmissive portion and the second transmissive portion; and a driver configured to move the image reading unit on the second path. A relative distance between the line sensor and the first surface changes in the second path below the first transmissive portion. The recording medium can be read at positions having the relative distances different one another.

35 Claims, 43 Drawing Sheets

U.S. PATENT DOCUMENTS

| | | | |
|---|---|---|---|
| 7,477,427 B2 * | 1/2009 | Fujikawa et al. | 358/474 |
| 7,583,864 B2 * | 9/2009 | Susaki | 382/312 |
| 7,688,477 B2 * | 3/2010 | Ikeno et al. | 358/449 |
| 7,733,538 B2 * | 6/2010 | Kanesaka et al. | 358/474 |
| 7,920,301 B2 * | 4/2011 | Kobayashi | 358/474 |
| 2001/0043375 A1 | 11/2001 | Yokota | |
| 2002/0121590 A1 | 9/2002 | Yoshida et al. | |
| 2004/0160648 A1 * | 8/2004 | Ishizuka | 358/486 |
| 2004/0165225 A1 | 8/2004 | Harris et al. | |
| 2004/0169895 A1 | 9/2004 | Hashizume et al. | |
| 2006/0028698 A1 * | 2/2006 | Chen et al. | 358/498 |
| 2006/0028700 A1 | 2/2006 | Chi-Sheng et al. | |
| 2006/0092481 A1 * | 5/2006 | Nakano et al. | 358/474 |
| 2008/0285093 A1 * | 11/2008 | Sheng et al. | 358/474 |

FOREIGN PATENT DOCUMENTS

| | | |
|---|---|---|
| JP | 9-65078 | 3/1997 |
| JP | H09-163090 A | 6/1997 |
| JP | H09-219772 A | 8/1997 |
| JP | H09-321946 A | 12/1997 |
| JP | H10-004474 A | 1/1998 |
| JP | H11-146140 A | 5/1999 |
| JP | H11-239249 A | 8/1999 |
| JP | 2000-261625 A | 9/2000 |
| JP | 2000-351482 A | 12/2000 |
| JP | 2002-171391 | 6/2002 |
| JP | 2002-262032 | 9/2002 |
| JP | 2004-056583 A | 2/2004 |
| JP | 2004-266656 A | 9/2004 |
| JP | 2005-051304 A | 2/2005 |
| JP | 2006-211353 A | 8/2006 |

OTHER PUBLICATIONS

Japan Patent Office, Office Action for Japanese Patent Application No. 2007-022450 (counterpart to above-captioned patent application), dated May 17, 2011.

Japan Patent Office, Office Action for Japanese Patent Application No. 2007-049979 (counterpart to above-captioned patent application), dated May 17, 2011.

European Patent Office, extended European Search Report for European Patent Application No. 08001738.7 (related to above-captioned patent application), dated Jul. 2, 2009.

* cited by examiner 75 lpi

39

150 lpi

39

50 lpi

39

IMAGE READING DEVICE

CROSS-REFERENCE TO RELATED APPLICATIONS

This application is based upon and claims the benefit of priority from Japanese Patent Application No. 2007-022450 filed on Jan. 31, 2007, and Japanese Patent Application No. 2007-049979 filed on Feb. 28, 2007, the entire contents of which are incorporated herein by reference.

TECHNICAL FIELD

One aspect of the present invention relates to an image reading device including an auto document feeder (ADF) and a flat bed scanner (FBS).

BACKGROUND

An image reading device having an auto document feeder (hereinafter, simply referred to as "ADF") and a flat bed scanner (hereinafter, simply referred to as "FBS") is known. The image reading device includes a close-contact line sensor such as a contact image sensor (CIS) reciprocating relative to a platen glass. A document placed on the platen glass is optically read by the line sensor while the line sensor moves along the platen glass. The document placed on a document bed of the ADF is optically read by the line sensor disposed at a predetermined reading position while the document is being conveyed along a conveying passage.

When a dot document such as a printing matter is read by the above-mentioned line sensor, an interference pattern called a moiré may be generated. In order to suppress the generation of the moiré, JP-A-2002-171391 discloses a configuration for changing a relative distance between a reading surface of a document placed on the platen glass and a line sensor by vertically moving the line sensor.

In the image reading device described in JP-A-2002-171391, an image reading unit including a charge coupled device (CCD) and a rod lens array is mounted on a carriage. The image reading unit includes an actuator in which an oval disc cam is disposed on a rotation shaft of a stepping motor. The image reading unit is mounted on a carriage in a state where the circumferential surface of the disc cam is in contact with the carriage. By driving the stepping motor, the disc cam rotates and thus a distance between the image reading unit and the carriage is changed. As a result, a distance between the image reading unit and the platen glass is changed.

In JP-A-2002-171391, it is described that a modulation transfer function (MTF) value is measured on the basis of an image signal obtained by reading a focus detecting chart and the height of the image reading unit is changed on the basis of the MTF value. The image reading device has two reading modes of a photograph mode and a printing matter mode. In the photograph mode, the image reading unit is disposed at a height where the MTF value is the maximum and a document on the platen glass is read. In the printing matter mode, the image reading unit is disposed at a height where the MTF value is about 40% of the maximum value and a document on the platen glass is read.

Similarly to the above-described image reading device, JP-A-2002-262032 discloses the relative distance is adjusted by changing the height of the line sensor. The image reading device described in JP-A-2002-262032 includes a rail of which the longitudinal direction is a moving direction of the CIS. The CIS moves over the rail along the rail. A cross-section of the rail in a direction perpendicular to the longitudinal direction (axis direction) thereof is oval and the rail rotates around the axial direction by means of an operation of a lever, thereby serving as a disc cam. The CIS gets close to or apart from the platen glass with the rotation of the rail. That is, the relative distance between the CIS and the reading surface of a document on the platen glass is changed by means of the operation of the lever. JP-A-2002-262032 also discloses that a jack is disposed between the CIS and a supporting plate for mounting the CIS, and the CIS vertically moves by the use of the jack by operating a knob.

JP-A-9-65078 discloses that a moiré preventing plate is used to read a document in which a moiré occurs. The moiré preventing plate is a transparent member on which a document is placed, and is disposed on the platen glass. The document in which the moiré occurs is placed on the moiré preventing plate disposed on the platen glass. In this way, by interposing the moiré preventing plate between the platen glass and the document, the distance between the line sensor and the document increases. Since the document is read by the line sensor in an out-of-focus state, the occurrence of a moiré is suppressed.

In the image reading device described in JP-A-2002-171391, a driving mechanism for vertically moving the line sensor is required to change the relative distance between the reading surface of the document and the line sensor. This is true in using the configuration disclosed in JP-A-2002-262032. Accordingly, the configuration becomes complicated, thereby increasing the cost for manufacturing the image reading device.

In the image reading device described in JP-A-9-65078, an operation of disposing the moiré preventing plate is required to change the relative distance between the reading surface of the document and the line sensor, thereby reducing the occurrence of a moiré. Such an operation is troublesome for a user.

A configuration for changing the relative distance between a reading surface of a document conveyed by the ADF and the line sensor is not disclosed in any patent document. In addition, a configuration for changing the relative distance in the course of reading a document is not disclosed in any patent document.

SUMMARY

One aspect of the invention is conceived by the above-mentioned circumstances. It is an object of one aspect of the invention to provide an image reading device capable of easily changing a relative distance between a line sensor and a reading surface of a document without providing an additional driving mechanism.

According to an aspect of the invention, there is provided an image reading device comprising: a conveying unit configured to convey a recording medium on a first path; a first transmissive portion having a first surface that allows the recording medium to pass the first surface; a second transmissive portion having a second surface on which a recording medium is allowed to be placed; an image reading unit comprising a line sensor extending in a first direction and movable on a second path, the second path continuously extending below the first transmissive portion and below the second transmissive portion, the image reading unit configured to read an image of the recording medium passing the first surface and an image of the recording medium placed on the second surface; a driver configured to move the image reading unit on the second path; and a control unit configured to drive the driver to control a movement of the image reading unit, wherein the second path below the second transmissive portion extends along the second surface in a second direction perpendicular to the first direction, wherein a relative distance of a third direction perpendicular to the first and second directions between the line sensor and the first surface changes in the second path below the first transmissive portion, and wherein the control unit is operable to perform: a first reading mode in which the reading unit is positioned at a first reading position and reads the image of the recording medium passing the first surface, the relative distance at the first reading position is a first relative distance; and a second reading mode in which the reading unit is positioned at a second reading position and reads the image of the recording medium passing the first surface, the relative distance at the second reading position is a second distance different than the first distance.

BRIEF DESCRIPTION OF THE DRAWINGS

FIG. 6A shows a reading position corresponding to a first position, FIG. 6B shows a reading position corresponding to a second position, and FIG. 6C shows a reading position corresponding to a third position;

FIG. 20A shows a reading position corresponding to a first position and FIG. 20B shows a reading position corresponding to a second position;

DESCRIPTION

Hereinafter, embodiments of the invention will be described with reference to the attached drawings. The embodiments are only examples of the invention and may be properly modified without departing from the scope of the claims.

First Embodiment

Figure 1:
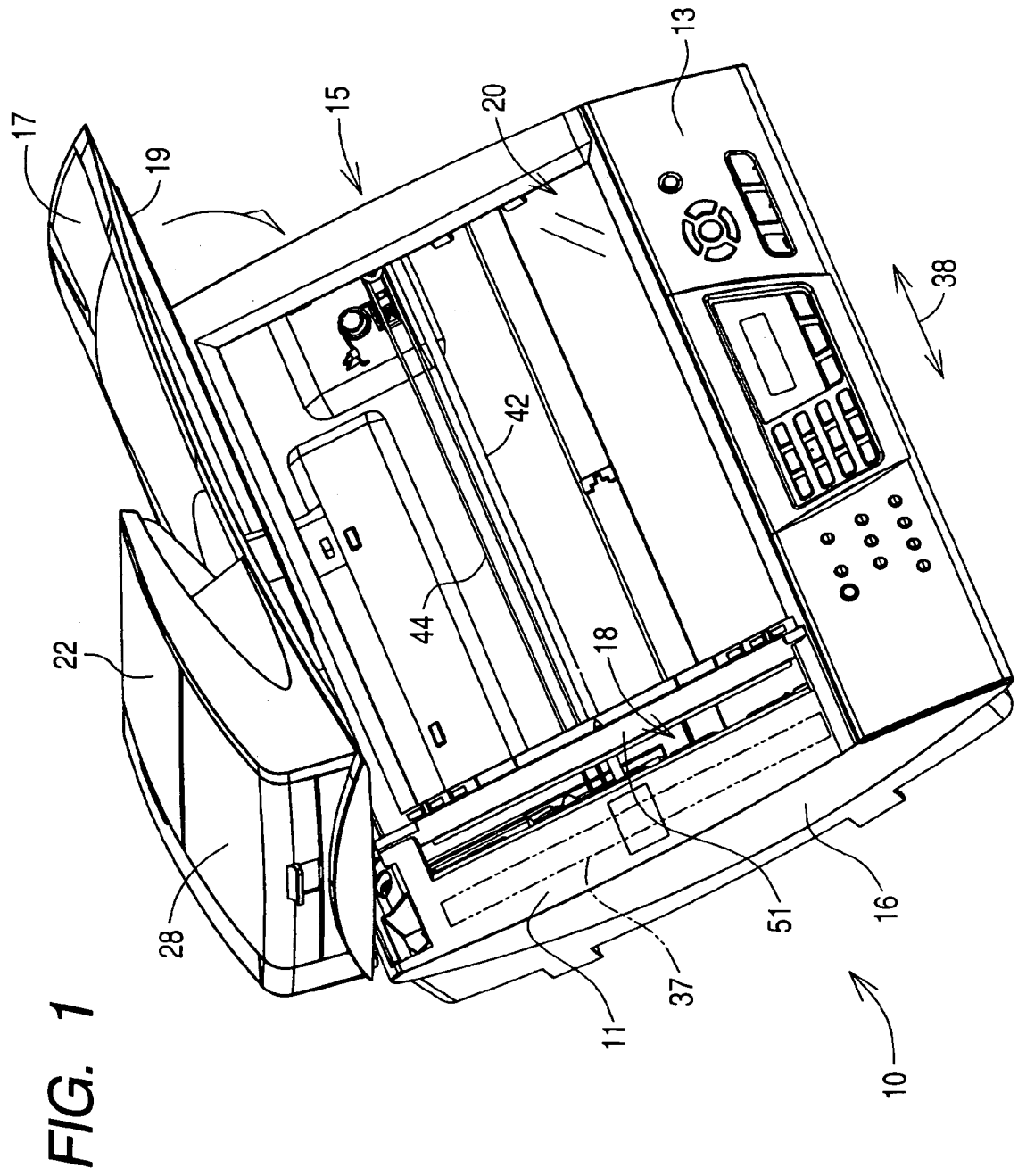
FIG. 1 is a perspective view illustrating an outer configuration of a scanner according to a first embodiment of the invention, where a document cover is opened.

FIG. 1 is a perspective view illustrating an outer shape of a scanner 10 according to a first embodiment of the invention, where a document cover 17 is opened.

The scanner 10 (an example of a image reading device) has a scanner function of reading an image of a document (an example of a recording medium, such as paper). In this embodiment, the scanner 10 having only the scanner function is used to explain the invention. However, the image reading device according to the invention is not limited to the scanner 10. The image reading device may be embodied as various kinds of devices having scanner function, such as a copier, a facsimile, or a multi-function device having plural functions.

As shown in FIG. 1, the scanner 10 includes a document bed 11. The document bed 11 serves as a flat bed scanner (FBS). The document bed 11 includes a substantially rectangular chassis 15. A line sensor 40 (see FIGS. 2 and 3) is disposed in the chassis 15. In the scanner 10, an image of a document is read by the line sensor 40.

As shown in FIG. 1, the scanner 10 includes a document cover 17. The document cover 17 is configured to bring a document placed on a surface (an example of a second surface) of a second glass 20 (an example of a second transmissive portion), which is described later, into close contact with the second glass 20. The document cover 17 can be freely opened and closed with respect to the document bed 11. Specifically, the document cover 17 is rotatably connected to the document bed 11 through a hinge (not shown) on the rear side of the document bed 11. The document cover 17 includes an auto document feeder (ADF) 28.

Figure 2:
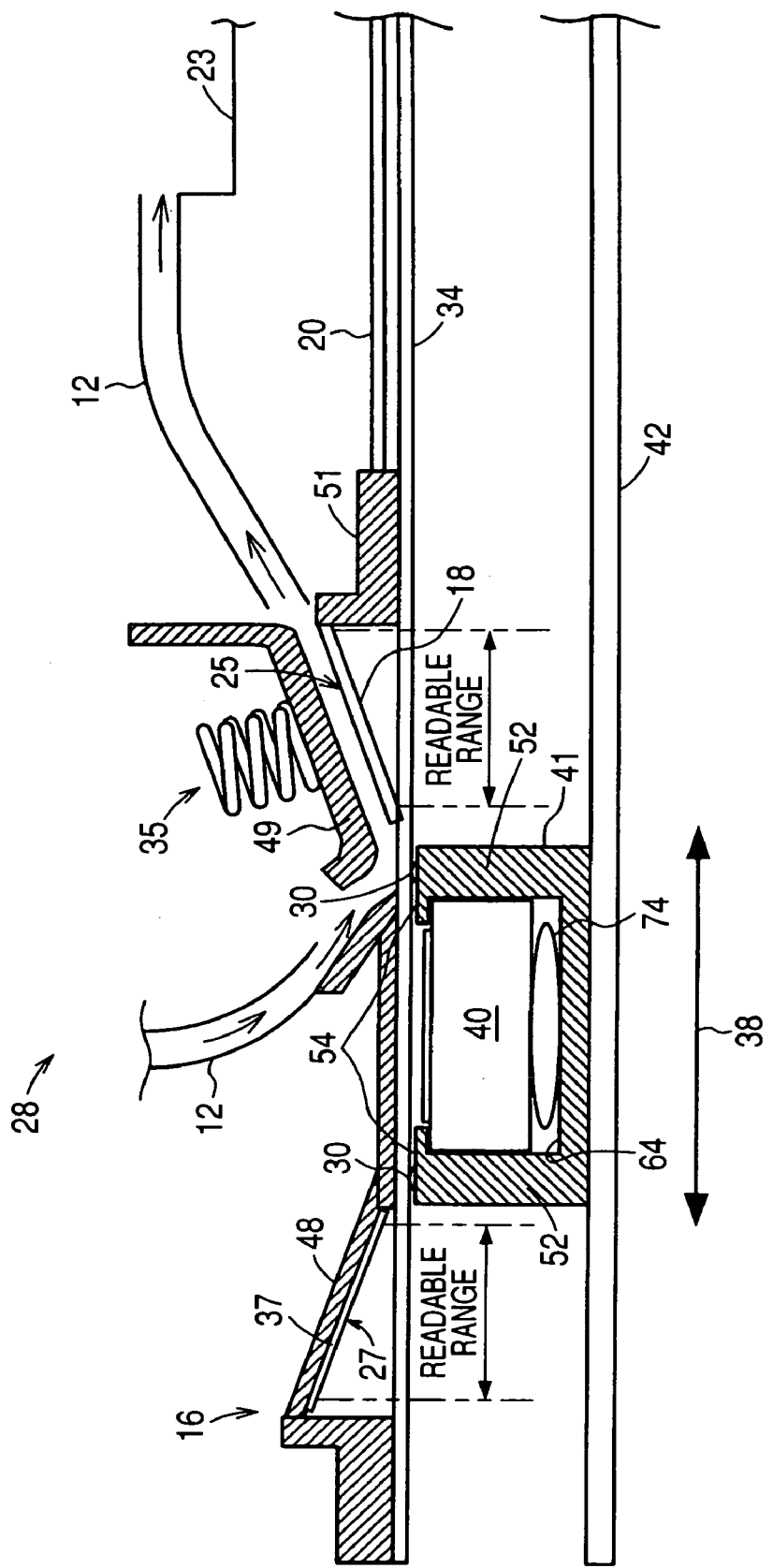
FIG. 2 is a cross-sectional view schematically illustrating a part of a conveying passage of the scanner according to the first embodiment of the invention.

FIG. 2 is a cross-sectional diagram schematically illustrating a part of a conveying passage 12 (an example of a first path) in the scanner 10 according to the first embodiment of the invention.

As shown in FIGS. 1 and 2, the ADF 28 is configured to convey a document placed on a document tray 22 to a sheet discharging tray 23 along the conveying passage 12. That is, the conveying passage 12 is a passage along which a document is conveyed. In FIG. 2, illustration of the document tray 22 and a part of the conveying passage 12 close to the document tray 22 are omitted. The document tray 22 (see FIG. 1) and the sheet discharging tray 23 (see FIG. 2) are disposed in the document cover 17 to form two steps with respect to the vertical direction so that the document tray 22 is disposed upside. The conveying passage 12 is disposed in the ADF 28 to have a substantially lateral U shape in a longitudinal section. The conveying passage 12 is formed continuous as a passage with a predetermined width, which allows a pass of a document, by members constituting the body of the ADF 28 or guide plates and guide ribs. The document tray 22 is connected to the sheet discharging tray 23 through the conveying passage 12.

Plural rollers 73 (an example of conveying unit; see FIG. 4) for conveying a document is disposed in the conveying passage 12. Although not shown in the figure, the rollers 73 include a pickup roller, a separation roller, a conveying roller, and a discharge roller. A driving force is delivered to the rollers 73 from a single motor 72 (see FIG. 4). The rotation power of the rollers 73 is delivered to the document, and the document is conveyed from the document tray 22 to the sheet discharging tray 23 along the conveying passage 12. As shown in FIG. 2, a first glass 18 (an example of a first transmissive portion) is disposed in the middle of the conveying passage 12. In a state where the document cover 17 is closed, the document placed on the document tray 22 is conveyed along the conveying passage 12 by the ADF 28 and passes over the first glass 18. At this time, an image of the document is read by the line sensor 40 positioned below the first glass 18. The document is further conveyed and discharged onto the sheet discharging tray 23.

As shown in FIG. 1, the first glass 18 and the second glass 20 are disposed on the top surface of a top cover 16 that forms a part of the chassis 15. The first glass 18 is a transmissive plate such as a glass plate or an acryl plate. When a document is placed on the document tray 22 and it is instructed to start reading the document, the line sensor 40 is located at a position (for example, see FIGS. 6A to 6C) opposed to the first glass 18. The document on the document tray 22 is conveyed along the conveying passage 12 by the ADF 28. In the course, the image of the document conveyed over the first glass 18 is read by the line sensor 40 through the first glass 18.

A document is placed on the second glass 20 (see FIG. 1) when the document bed 11 is used as the FBS. The second glass 20 is a transmissive plate such as a glass plate or an acryl plate. When a document is set on the second glass 20 and it is instructed to start reading the document, the line sensor 40 moves in a sub-scanning direction (an example of a second direction; direction indicated by an arrow 38) of a document while opposing to the second glass 20. In the course, the image of the document on the second glass 20 is read by the line sensor 40 through the second glass 20.

A partitioning member 51 (see FIGS. 1 and 2) is disposed between the first glass 18 and the second glass 20 on the top surface of the document bed 11. The partitioning member 51 is a longitudinal member extending in a depth direction (direction indicated by an arrow 39 shown in FIG. 3) of the scanner 10, similarly to the first glass 18 and the second glass 20. As shown in FIG. 2, the partitioning member 51 has a substantially L shape in cross-section in the width direction of the scanner 10. One end (right side in FIG. 2) in the width direction (direction indicated by an arrow 38) of the first glass 18 is supported by the partitioning member 51. The partitioning member 51 is used as a positioning reference at the time of setting a document on the second glass 20. Marks indicating a center position and both end positions of various document sizes such as an A4 (column A, number 4 in the Japanese Industrial Standards) size, a B5 (column B, number 5 in the Japanese Industrial Standards) size, and the like are recorded in the partitioning member 51. The document is set on the second glass 20 using the center position marked on the partitioning member 51 as a reference.

The top surfaces of the first glass 18 and the second glass 20 are exposed by opening the document cover 17 (see FIG. 1). By closing the document cover 17, the whole top surface of the document bed 11 including the first glass 18 and the second glass 20 is covered with the document cover 17. A document pressing member 19 (see FIG. 1) covering the second glass 20 is disposed on the bottom surface of the document cover 17. The document pressing member 19 is formed of a sponge and a white plate to press the document set on the second glass 20. When the document cover 17 is closed, the document set on the second glass 20 is pressed against the second glass 20 by the document cover 17 through the document pressing member 19. Since the first glass 18 is disposed on the top surface of the document bed 11, the first glass forms a part of the conveying passage 12 by closing the document cover 17. Accordingly, the ADF is used in a state where the document cover 17 is closed relative to the document bed 11.

Figure 3:
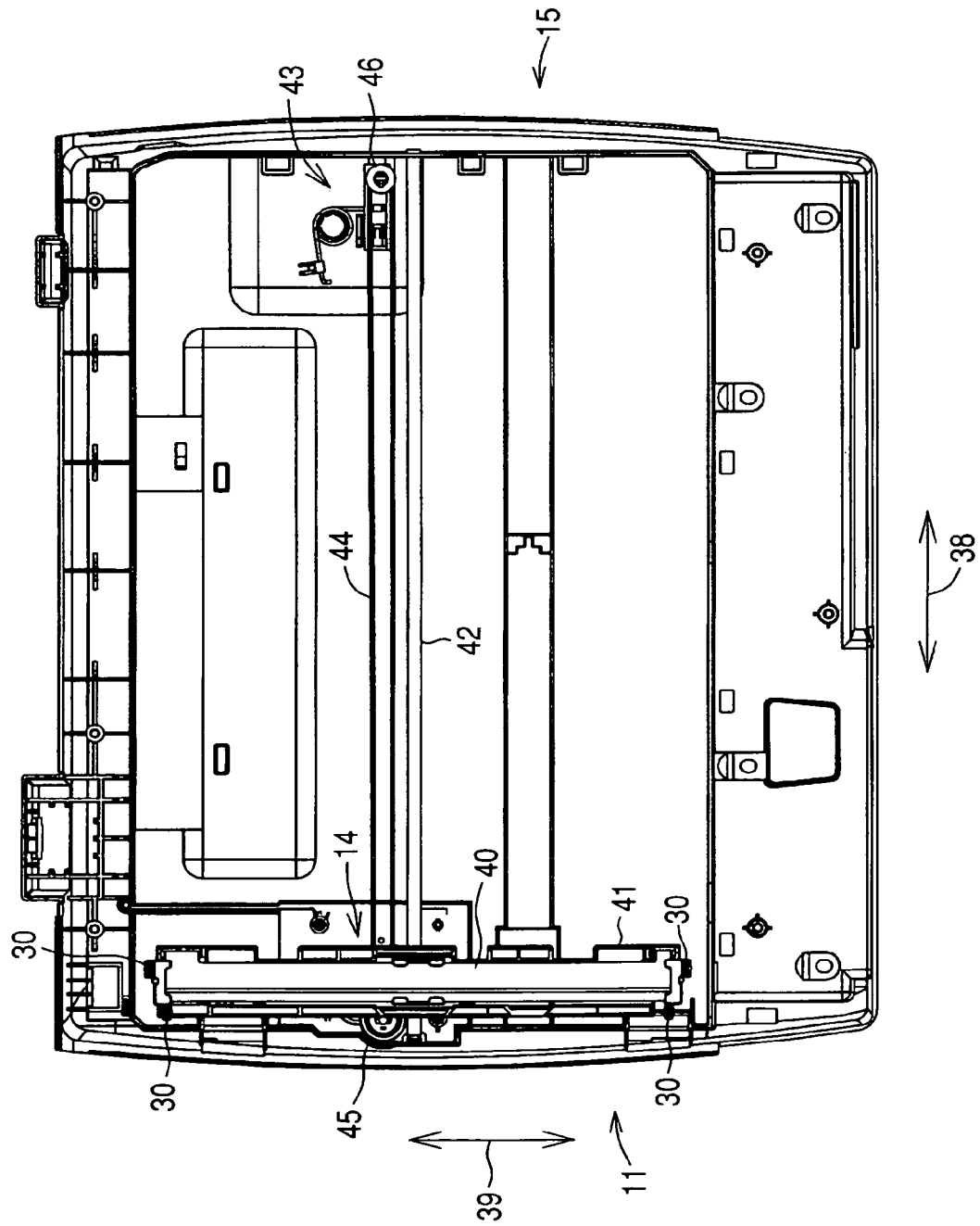
FIG. 3 is a plan view illustrating an inner configuration of a document bed.

FIG. 3 is a plan view illustrating an inner configuration of the document bed 11. In FIG. 3, a state where the top cover 16 is removed is shown.

As shown in FIG. 3, an image reading unit 14 is disposed inside the chassis 15 of the document bed 11. The image reading unit 14 is configured to read a document through the first glass 18 or the second glass 20. The image reading unit 14 includes the line sensor 40, a carriage 41, a guide shaft 42, and a belt driving mechanism 43.

The line sensor 40 applies light to a document from a light source and reads the reflected light from the document in the unit of a main scanning line. A reading device having a small focal distance is used as the line sensor 40. In this embodiment, the line sensor 40 is a so-called contact image sensor (CIS). Although not shown in the figure, the line sensor 40 includes a light source, a lens, and a light-receiving element. The line sensor 40 applies light to a document from the light source through the first glass 18 and the second glass 20. That is, the line sensor 40 applies light to a document conveyed by the ADF 28 through the first glass 18 or applies light to a document set on the second glass 20 through the second glass 20. The line sensor 40 concentrates the reflected light from the document on the light-receiving element by the use of the lens and converts the light into an electrical signal (image signal). Accordingly, an image of the document is obtained. The light-receiving elements of the line sensor 40 are arranged, for example, in the main scanning direction (an example of a first direction; direction indicated by the arrow 39) in the unit of a chip. The light source and lens of the line sensor 40 are arranged in the same direction as the light-receiving elements.

The line sensor 40 is mounted on the carriage 41 (see FIG. 2). The line sensor 40 is mounted on a spring receiving portion 64 via a coil spring 74. A guide shaft 42 is suspended in the width direction thereof (the lateral direction in FIG. 3) inside the chassis 15. The carriage 41 is fitted to the guide shaft 42. The carriage 41 is driven by the belt driving mechanism 43 so as to move along the guide shaft 42 in the direction indicated by the arrow 38. Rollers 30 (see FIGS. 2 and 3) are disposed on the top surface of the carriage 41 corresponding to both ends in the longitudinal direction of the carriage 41. The rollers 30 are axially supported by the carriage 41 in a state where it can be electrically driven in the moving direction (direction indicated by the arrow 38) of the carriage 41. The rollers 30 uniformly protrude upward from the top surface of the carriage 41. A guide member 34 (see FIG. 2) is disposed on the top surface of the chassis 15. The guide member 34 is a thin and longitudinal flat member extending in the moving direction of the carriage 40. The guide member 34 is disposed to extend along the trace of the rollers 30. The rollers 30 come in contact with the rear surface of the guide member 34 (see FIG. 2). Accordingly, a constant gap is formed between the top surface of the line sensor 40 and the rear surface of the second glass 20. The constant gap allows the line sensor 40 to be focused on the top surface of the second glass 20. The electrical driving of the rollers 30 allows the carriage 41 to smoothly move along the guide member 34. Since the line sensor 40 is mounted on the carriage 41, the line sensor 40 moves to positions opposing to the first glass 18 and the second glass 20.

The belt driving mechanism 43 (see FIG. 3) includes a driving belt 44, a driving pulley 45, and a driven pulley 46. As shown in FIG. 3, the driving pulley 45 and the driven pulley 46 are disposed at both ends in the width direction of the chassis 15, respectively. The driving belt 44 has an endless ring shape provided therein with saw-teeth and is suspended on the driving pulley 45 and the driven pulley 46. A driving force is delivered to the axis of the driving pulley 45 from a CR (carriage) motor 65 (an example of a driving unit; see FIG. 4). The driving belt 44 moves circumferentially by means of the rotation of the driving pulley 45 and the line sensor 40 mounted on the carriage 41 moves to be opposed to the first glass 18 or the second glass 20. For example, a stepping motor is used as the CR motor 65. The position of the line sensor 40 in the width direction of the scanner 10 (direction indicated by the arrow 39) is monitored by measuring the number of steps of the CR motor 65 by a controller 55 (see FIG. 4).

The document conveyed by the ADF 28 moves along the first glass 18. The document is read through the first glass 18 by the line sensor 40 disposed below the first glass 18. Accordingly, a document reading surface 25 (an example of a first surface; see FIG. 2) for the line sensor 40 is formed on the top surface of the first glass 18. Here, the reading surface 25 is a reading area of the line sensor 40 in the first glass 18. That is, an image of the document passing over the first glass 18 is read by the line sensor 40 in the reading area 25 on the top surface of the first glass 18. As shown in FIG. 2, the reading surface 25 is tilted with respect to a plane (which is a plane parallel to the paper surface of FIG. 3 and which is also referred to as "motion plane") in which the line sensor 40 moves. In this embodiment, a downstream portion (right side in FIG. 2) of the reading surface 25 in the conveying direction of the document in the conveying passage 12 is more apart from the motion plane in which the line sensor moves than an upstream portion (left side in FIG. 2) thereof (see FIG. 2). Accordingly, the document in conveyance is abutted and pressed on the first glass 18. As a result, it is possible to prevent the relative distance between the top surface of the line sensor 40 and the reading surface 25 from varying due to the floating of the document from the first glass 18.

The line sensor 40 moves to be opposed to the first glass 18 by means of the driving force delivered from the CR motor 65. The driving of the CR motor 65 is controlled by the controller 55 (see FIG. 4) to be described later. The controller 55 is operable as, for example, a control unit, a calculation unit, a decision unit. As described above, the reading surface 25 of the first glass 18 is tilted about the motion plane. The controller 55 drives the CR motor 65 so as to move the line sensor 40 (carriage 41) in the direction indicated by the arrow 38. The position of the reading surface 25 moves in the width direction of the first glass 18 depending on the position of the line sensor 40 (see FIGS. 6A to 6C). Accordingly, the controller 55 changes the relative distance (hereinafter, also referred to as "first relative distance") between the document reading surface 25 of the first glass 18 and the line sensor 40 (see D1 to D3 in FIGS. 6A to 6C). Since the first relative distance is changed by the use of the CR motor 65 as a driving source of the line sensor 40, it is possible to change the first relative distance with a simple configuration. That is, the first relative distance is easily changed without adding a new member for changing the first relative distance. By changing the first relative distance, the focus of the line sensor 40 on the document reading surface 25 can be changed, thereby reading the document conveyed by the ADF 28.

The tilt angle of the reading surface 25 about the motion plane is not particularly limited. However, the tilt angle is set preferably on the basis of a modulation transfer function (MTF) characteristic of the line sensor 40. When the tilt angle increases, the change of the first relative distance with the movement of the line sensor 40 increases. On the contrary, when the tilt angle decreases, the change of the first relative distance with the movement of the line sensor 40 decreases. Accordingly, when a reading device having a very narrow in-focus range is used as the line sensor 40, it is preferable that the tilt angle should be set small. On the contrary, when a reading device having a wide in-focus range is used as the line sensor 40, the tilt angle may be set large. The first glass 18 may be disposed so that the upstream portion of the reading surface 25 in the document conveying direction in the conveying passage 12 is positioned to have larger distance from the motion plane the than the downstream portion thereof. However, the floating of the document from the reading surface 25 can be inhibited according to the configuration in this embodiment where the downstream portion of the reading surface 25 in the document conveying direction is positioned to have larger distance from the motion plane than the upstream portion thereof.

As shown in FIG. 2, a platen 49 is disposed above the first glass 18. A surface of the platen 49 opposed to the first glass 18 extends in the depth direction (direction indicated by the arrow 39) of the scanner 10 along the first glass 18. The platen 49 is attached to a member (not shown) forming the ADF 28 with a coil spring 35 interposed therebetween. Although not shown in the figure, both ends in the longitudinal direction of the platen 49 are provided with protrusions protruding toward the first glass 18. When the document cover 17 is closed, the first glass 18 and the platen 49 are opposed to each other with a predetermined gap therebetween by the use of the protrusions. The predetermined gap is set to be slightly larger than the thickness of the document. Accordingly, the document is smoothly conveyed along the first glass 18 with its movement not being regulated by the platen 49.

As shown in FIGS. 1 and 2, a reference member 37 (an example of a reference portion) is disposed on a side of the first glass 18 opposite to the second glass 20. The reference member 37 is provided on the rear surface of the top cover 16. The reference member 37 serves as a brightness reference of the line sensor 40 and an image thereof is read by the line sensor 40. That is, the reference member 37 is used to adjust the light intensity of the line sensor 40 or to obtain white reference data 90 to 92 (see FIG. 5). The adjustment of the light intensity and the acquisition of the white reference data 90 to 92 will be described in detail later. The reference member 37 is a thin band-like member having substantially the same length as the line sensor 40 in the main scanning direction of the line sensor 40 and its surface opposed to the line sensor 40 is white. The reference member 37 is attached to the rear surface of a tilted portion 48 formed in the top cover 16. The tilted portion 48 is tilted about the motion plane at the same tilt angle as the first glass 18. Accordingly, a reading surface 27 of the reference member 37 is tilted about the motion plane substantially at the same angle as the first glass 18. The reading surface 27 does not mean the whole rear surface of the reference member 37, but means a surface of the reference member 37 which is read by the line sensor 40. As shown in FIG. 2, the first glass 18 and the reference member 37 are tilted symmetrically in the width direction of the scanner 10.

The controller 55 changes the relative distance (hereinafter, also referred to as "second relative distance") between the reading surface 27 of the reference member 37 and the line sensor 40 by driving the CR motor 65 so as to allow the line sensor 40 (carriage 41) to move. Since the second relative distance is changed by the use of the CR motor 65 as a driving source of the line sensor 40, it is possible to change the second relative distance with a simple configuration. That is, the second relative distance can be easily changed without newly adding a member for changing the second relative distance between the line sensor 40 and the reference member 37. By changing the second relative distance, the focus of the line sensor 40 can be changed, thereby reading the reading surface 27.

As shown in FIG. 1, an operation panel 13 (an example of a first display unit, a second display unit and a third display unit) is disposed in a front top portion of the scanner 10. The operation panel 13 includes a liquid crystal display for displaying a variety of information, input keys by which a user can input information, and a touch panel. The scanner 10 is operated in accordance with an operation input from the operation panel 13. A user's operation input instructing to start reading a document placed on the second glass 20 or a document placed on the document tray 22 is performed through the operation panel 13. In addition to the instruction from the operation panel 13, the scanner 10 may be connected to an external device such as a terminal device 140 (see FIG. 4) and may be operated in accordance with an instruction transmitted from the terminal device 140 through a scanner driver or the like.

Figure 4:
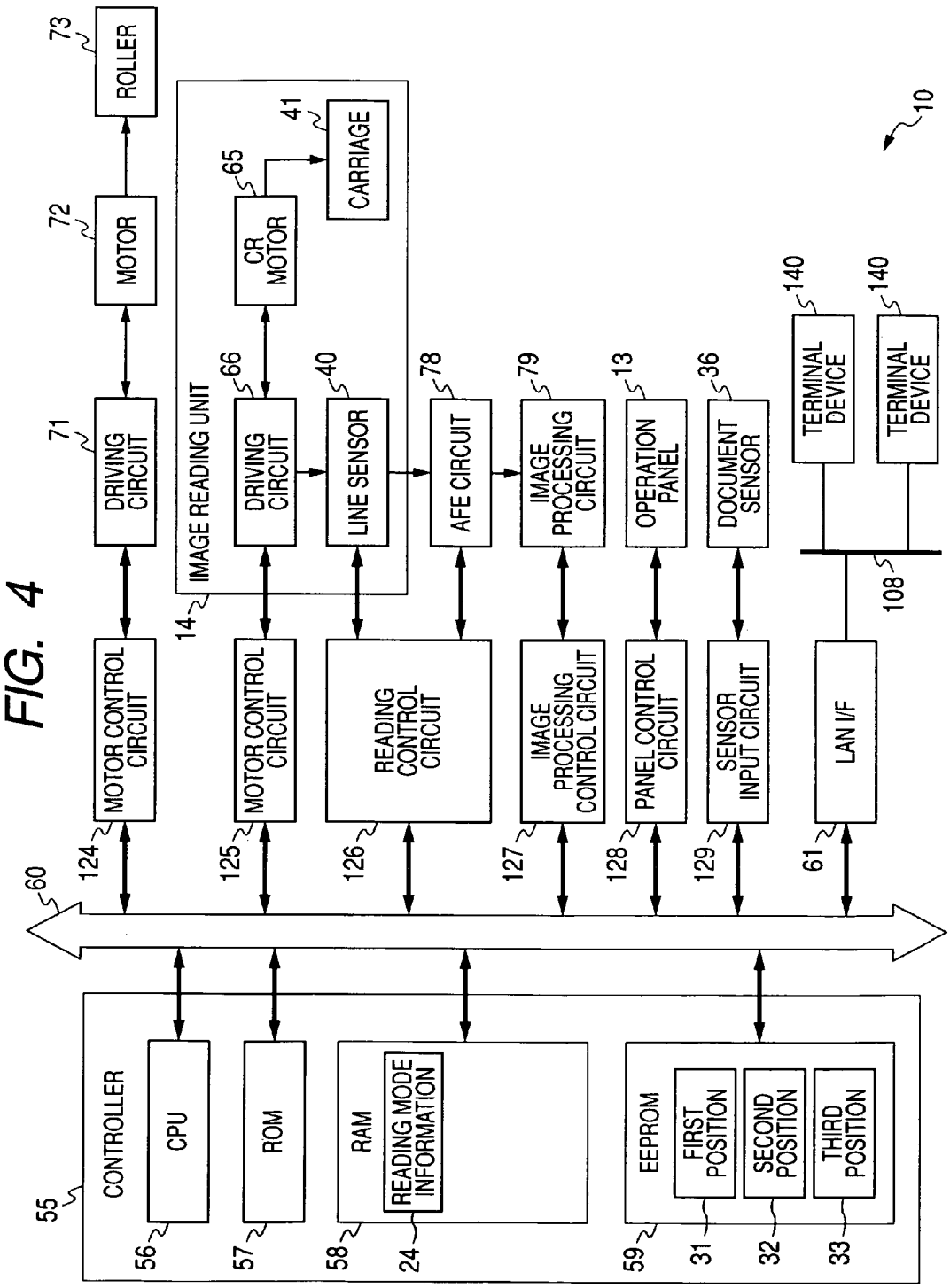
FIG. 4 is a block diagram illustrating a configuration of the scanner of the first embodiment.
Figure 5:
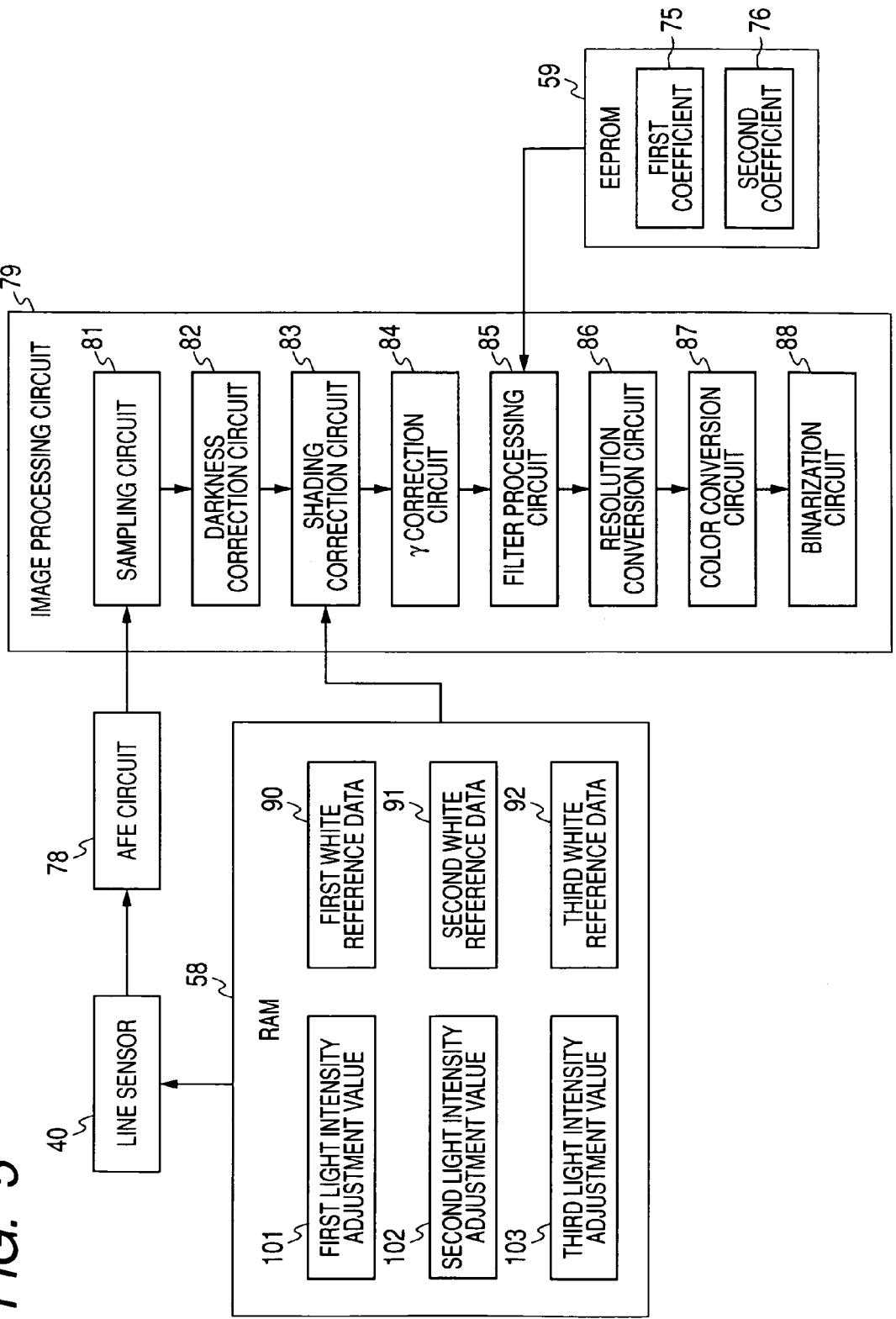
FIG. 5 is a block diagram illustrating a configuration of an image processing circuit of the first embodiment.

FIG. 4 is a block diagram illustrating a configuration of the controller 55 of the scanner 10. FIG. 5 is a block diagram illustrating a configuration of an image processing circuit 79.

The controller 55 controls the entire operations of the scanner 10. As shown in FIG. 4, the controller 55 is formed of a micro computer mainly including a CPU (Central Processing Unit) 56, a ROM (Read Only Memory) 57, a RAM (Random Access Memory) 58, and an EEPROM (Electrically Erasable and Programmable ROM) 59. The controller 55 is connected to a motor control circuit 124, a motor control circuit 125, a reading control circuit 126, an image processing control circuit 127, a panel control circuit 128, a sensor input circuit 129 through a bus 60, and a LAN I/F (Local Area Network Interface) 61.

The ROM 57 stores control programs for allowing the CPU 56 to control a variety of operations of the scanner 10. The RAM 58 is a memory area or an operating area for temporarily storing a variety of data used for the CPU 56 to execute the control programs. As shown in FIG. 5, the RAM 58 stores a first light intensity adjustment value 101, a second light intensity adjustment value 102, a third light intensity adjustment value 103, first white reference data 90, second white reference data 91, and third white reference data 92. These data will be described in detail later.

The RAM 58 stores reading mode information 24 (see FIG. 4). The reading mode information 24 is information indicating a document reading mode that is set by the controller 55 on the basis of the operation input from the operation panel 13. The reading of a document conveyed by the ADF 28 is performed on the basis of the reading mode information 24. In this embodiment, the controller 55 sets one of a normal mode (an example of a first reading mode), a moiré reducing mode (an example of a second reading mode), and a blur mode (an example of a second reading mode). The normal mode is a reading mode in which a document is read through the first glass 18 by the line sensor 40 in a state where the controller 55 makes the first relative distance be substantially equal to the focal distance of the line sensor 40. In other words, the normal mode is a reading mode in which a document is read in a state where the line sensor 40 is focused on the document reading surface 25 of the first glass 18. The moiré reducing mode and the blur mode are reading modes in which a document is read by the line sensor 40 through the first glass 18 in a state where the controller 55 makes the first relative distance be different from the focal distance of the line sensor 40. The moiré reducing mode is greatly different from the blur mode in the first relative distance. The moiré reducing mode is a reading mode in which a document is read in a state where the focus of the line sensor 40 is slightly out of the document reading surface 25 of the first glass 18. The blur mode is a reading mode in which at least an area of a document is read in a state where the focus of the line sensor 40 is slightly out of the reading surface 25 and the other area (a blurred area to be described later) of the document is read in a state where the focus of the line sensor 40 is greatly out of the reading surface 25.

The reading mode information 24 may be set on the basis of an instruction transmitted from the terminal device 140 such as a computer, instead of the operation input from the operation panel 13. Although it is described in this embodiment that includes two reading modes of the moiré reducing mode and the blur mode as the second reading mode, but may include one of these reading modes as the second reading mode. For example, the reading modes of this embodiment may include two modes of the normal mode and the moiré reducing mode or two modes of the normal mode and the blur mode.

The EEPROM 59 stores various settings or flags which should be kept even after it is turned off. In this embodiment, the EEPROM 59 stores a first position 31, a second position 32, and a third position 33. The position information is information indicating a reading position in the sub-scanning direction at which the line sensor 40 is positioned in association with the reading mode information 24 set in the RAM 58. The first position 31 is a reading position at which the line sensor 40 is focused on the reading surface 25. The second position 32 is a reading position at which the focus of the line sensor 40 is slightly out of the reading surface 25. The third position 33 is a reading position at which the focus of the line sensor 40 is more out of the reading surface 25 than that of the second position 32.

Figure 6A:
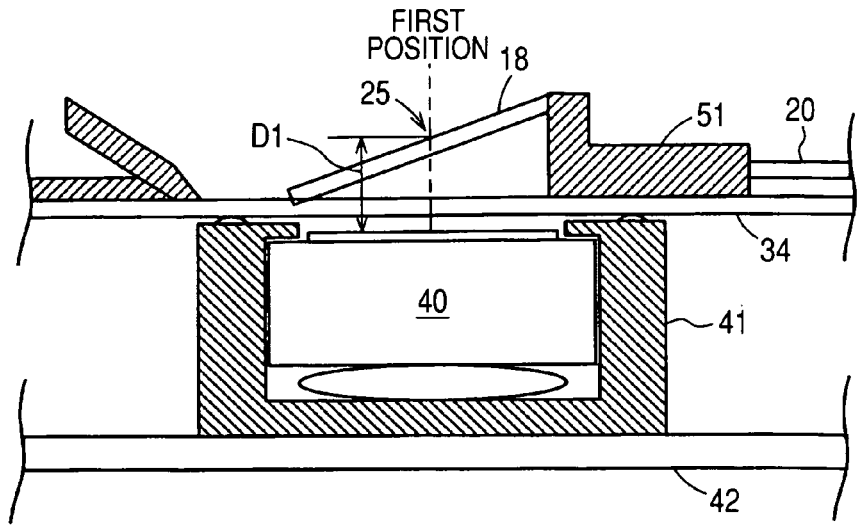
FIGS. 6A to 6C are cross-sectional views schematically illustrating reading positions of a line sensor of the first embodiment, where
Figure 6B:
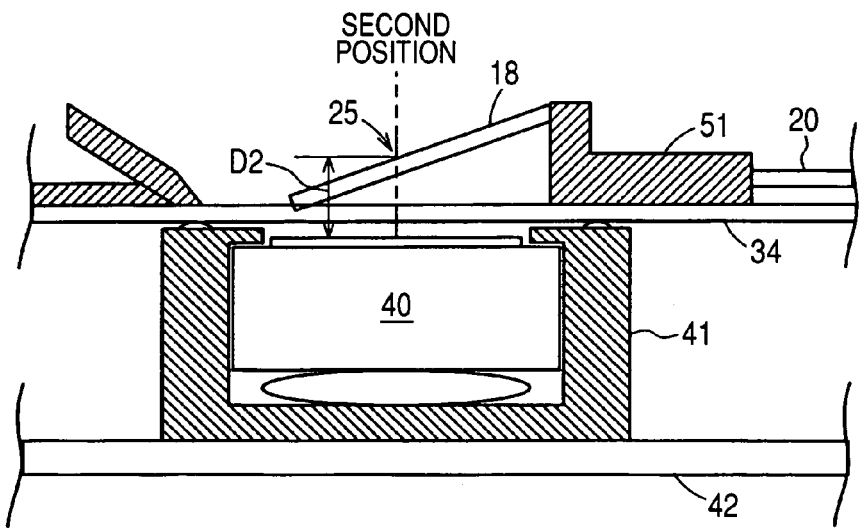
Figure 6C:
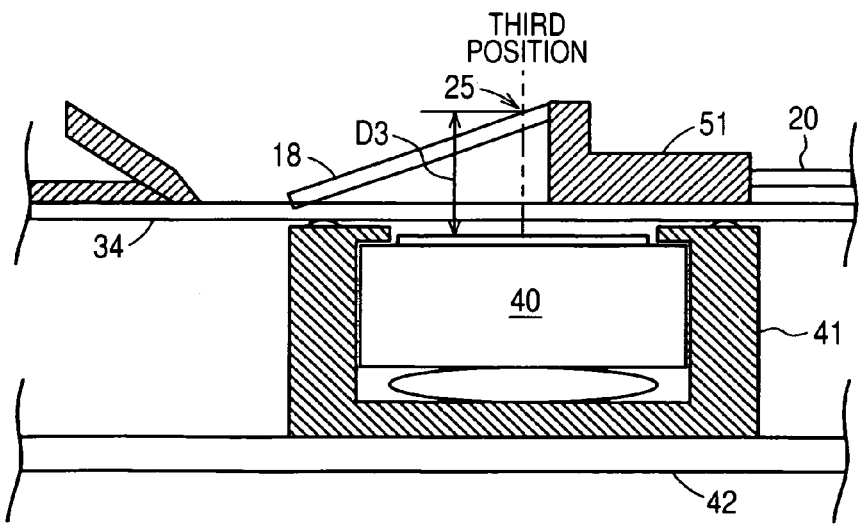
Figure 7:
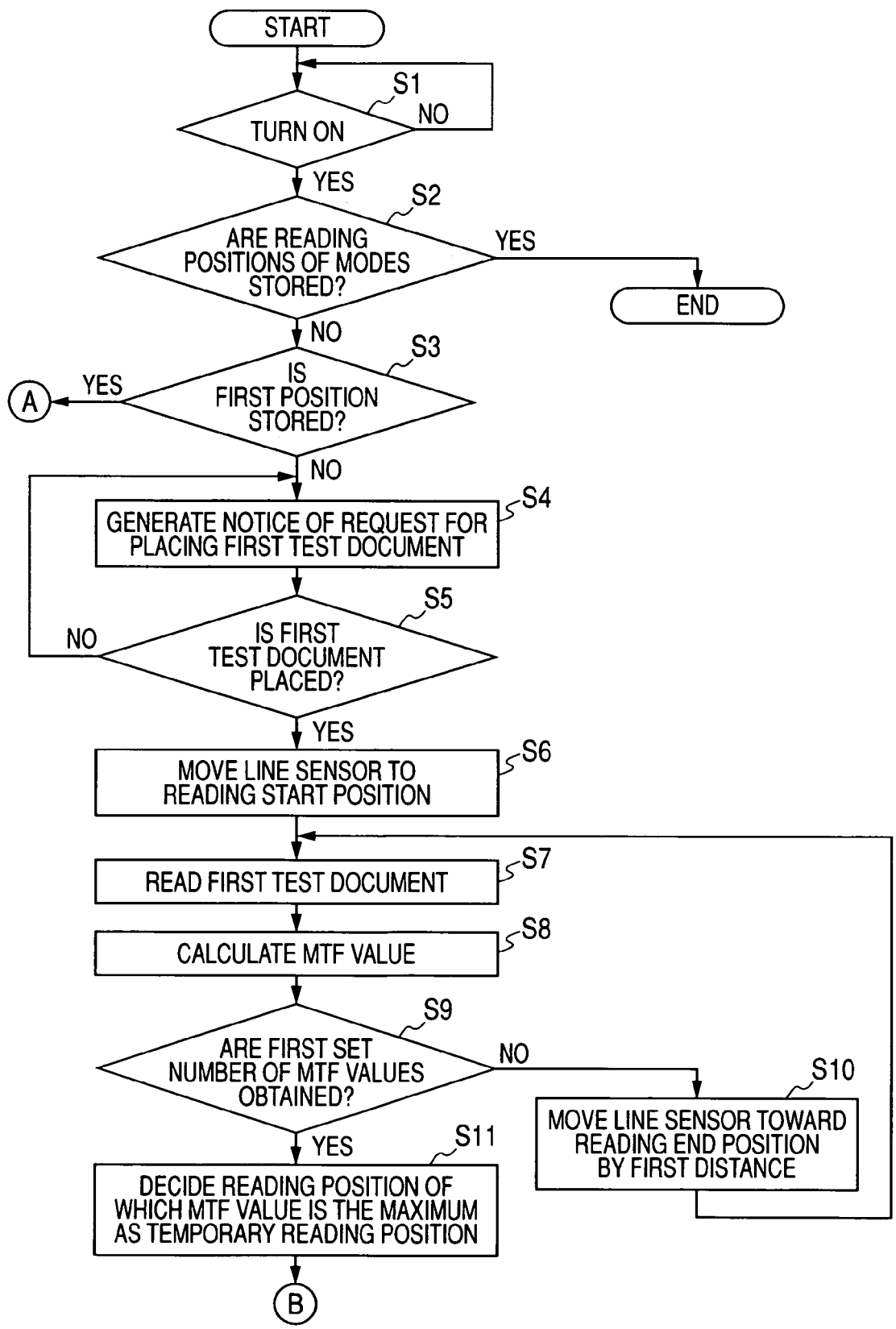
FIG. 7 is a flowchart illustrating a process flow of a reading position setting process performed at the time of turning on the scanner of the first embodiment.

FIGS. 6A to 6C are cross-sectional views schematically illustrating the reading positions of the line sensor 40, where FIG. 6A shows a reading position corresponding to the first position 31, FIG. 6B shows a reading position corresponding to the second position 32, and FIG. 6C shows a reading position corresponding to the third position 33.

The reading mode information 24 of the RAM 58 is set to the normal mode and the document conveyed by the ADF 28 is read. The image of the document is read from the reading surface 25 in a state where the line sensor 40 is located at the reading position (see FIG. 6A) corresponding to the first position 31. Since the first position 31 is a position at which the line sensor 40 is focused on the reading surface 25, a clear document image with a high resolution is obtained. That is, the normal mode is a reading mode suitable for reading a photograph or the like in which the moiré hardly occurs.

The reading mode information 24 of the RAM 58 is set to the moiré reducing mode and the document conveyed by the ADF 28 is read. The image of the document is read from the reading surface 25 in a state where the line sensor 40 is located at a reading position (see FIG. 6B) corresponding to the second position 32. Since the second position 32 is a position at which the focus of the line sensor 40 is slightly out of the reading surface 25, a document image is obtained in which the occurrence of the moiré is suppressed. That is, the moiré reducing mode is a reading mode suitable for reading a dot document in which the moiré may easily occur.

The reading mode information 24 of the RAM 58 is set to the blur mode and the document conveyed by the ADF 28 is read. An image of the extra-dim area to be described later of the document is read in a state where the line sensor 40 is located at the reading position (see FIG. 6B) corresponding to the second position 32. An image of the other area (dim area) of the document is read in a state where the line sensor 40 is located at a reading position (see FIG. 6C) corresponding to the third position 33. Accordingly, a document image is obtained in which the occurrence of the moiré in the extra-dim area is suppressed and the image of the blurred area is too blurred to identify. That is, the blur mode is a reading mode suitable for reading a document of which a partial area is made to be blurred. The method of deciding the first position 31, the second position 32, and the third position 33 and the operations of reading the document in the reading modes will be described in detail later.

The image (image data) of the document read through the first glass 18 by the line sensor 40 is subjected to an emphasis process (sharpening process) by a filter processing circuit 85 (see FIG. 5) to be described later. Coefficients (emphasis coefficients) 75 and 76 used for the emphasis process are stored in the EEPROM 59. The first coefficient 75 (an example of a first emphasis coefficient) and the second coefficient 76 (an example of a second emphasis coefficient) will be described in detail later.

As shown in FIG. 4, the motor control circuit 124 is connected to a driving circuit 71. The motor control circuit 125 is connected to a driving circuit 66. The reading control circuit 126 is connected to the line sensor 40 and an AFE (Analog Front End) circuit 78. The image processing control circuit 127 is connected to an image processing circuit 79. The panel control circuit 128 is connected to the operation panel 13. The sensor input circuit 129 is connected to a document sensor 36. The terminal device 14 is connected to the LAN I/F 61 via the LAN (Local Area Network) 108.

The driving circuit 71 is configured to drive the motor 72. The motor 72 can rotate forward and backward. The driving circuit 71 receives an output signal from the motor control circuit 124 and generates a pulse signal for rotating the motor 72. The motor 72 rotates on the basis of the pulse signal. The motor 72 is configured to apply a driving force to the rollers 73 and serves as a driving source of the ADF 28. The controller 55 counts the number of pulses of the pulse signal generated by the driving circuit 71. Accordingly, the number of steps of the motor 72 is counted. The counted number of steps is temporarily stored in the RAM 58. The position of the document on the conveying path 12 in the ADF 28 is determined based on the counted number of steps.

The image reading unit 14 performs a document reading operation and outputs a document image as an image signal. The image reading unit 14 includes the line sensor 40, the carriage 41, the CR motor 65, and the driving circuit 66. The driving circuit 66 delivers a driving signal to the CR motor 65 on the basis of a phase exciting signal input from the motor control circuit 125. The CR motor 65 is, for example, a stepping motor. The CR motor 65 rotates in response to the driving signal. Accordingly, the carriage 41 reciprocates. The driving circuit 66 is also configured to adjust an operating current for lighting the light source of the line sensor 40. The controller 55 obtains the light intensity adjustment values 101, 102, and 103 or the white reference data 90, 91, and 92, in addition to the document reading operation, by controlling the image reading unit 14 on the basis of the control programs stored in the ROM 57.

The line sensor 40 applies light from the light source to a document set on the second glass 20 or a document conveyed over the first glass 18 by the ADF 28 and reads the document image in the unit of a line. The read image is output as an image signal (image data) from the line sensor 40 to the AFE circuit 78.

The line sensor 40 is made to move by the carriage 41 so as to be opposed to the second glass 20 on which the document is set. In this course, the line sensor 40 repeats the operation of applying light to the document through the second glass 20 from the light source and outputting the reflected light from the document as an image signal of a line. Accordingly, the entire image of the document set on the second glass 20 is obtained.

The line sensor 40 is made to move by the carriage 41 and is located at a position opposed to the first glass 18. In this state, the document placed on the document tray 22 is conveyed along the conveying passage 12 by the ADF 28. In this course, the line sensor 40 repeats the operation of applying light to the document through the first glass 18 from the light source and outputting the reflected light from the document as an image signal of a line. Accordingly, the entire image of the document passing over the first glass 18 is obtained.

The AFE circuit 78 samples and holds analog image signals output from the line sensor 40, converts the sampled and held image signals into digital signals, and serializes the digital signals. The digital conversion is a process of converting the analog image signals output from the line sensor 40 into digital signals having a predetermined number of bits of digital codes. The digital conversion is performed by an analog/digital converter. The analog image signals input to the AFE circuit 78 are output as digital image signals of, for example, 8 bits (256 gray scales 0 to 255) to the image processing circuit 79.

As shown in FIG. 5, the image processing circuit 79 includes a sampling circuit 81, a darkness correction circuit 82, a shading correction circuit 83, a γ correction circuit 84, a filter processing circuit 85, a resolution conversion circuit 86, a color conversion circuit 87, and a binarization circuit 88.

The sampling circuit 81 samples an image signal output from the AFR circuit 78. The darkness correction circuit 82 corrects the image signal output from the sampling circuit 81 so as to correct the differences between the light-receiving elements of the line sensor 40. The correction of the image signal is performed on the basis of the black reference data stored in the RAM 58. The black reference data is data obtained by reading the reference member not shown in a state where the light source of the line sensor 40 is turned off.

The shading correction circuit 83 corrects the shading of the image signal output from the darkness correction circuit 82. By performing the shading correction, the differences between the light-receiving elements of the line sensor 40 and the non-uniformity of the light source are corrected. The shading correction of the shading correction circuit 83 is performed on the basis of any one of the white reference data 90, 91, and 92. The image signal of the document read in the state where the line sensor 40 is located at the reading position corresponding to the first position 31 is corrected in shading on the basis of the first white reference data 90. The image signal of the document read in the state where the line sensor 40 is located at the reading position corresponding to the second position 32 is corrected in shading on the basis of the second white reference data 91. The image signal of the document read in the state where the line sensor 40 is located at the reading position corresponding to the third position 33 is corrected in shading on the basis of the third white reference data 92.

The filter processing circuit 85 performs an emphasis (sharpening) process on the image signal of the document. The emphasis process is a process of emphasize a gray scale variation of the image signal of the document. The emphasis process is performed by subtracting a secondary differential value or the like from a noticed pixel. The filter processing circuit 85 emphasizes the image signal of the document by the use of Formula 1.

$$g(x, y) = \sum_{i=-1}^{1} \sum_{j=-1}^{1} f(x+i, y+j)h(i+1, j+1) \quad \text{[Formula 1]}$$

In Formula 1, g(x,y) is image data having been subjected to the emphasis process. f(x,y) is input image data input to the filter processing circuit 85. Here, h denotes a filter coefficient. The h for subtracting the secondary differential value from the noticed pixel can be expressed by Formula 2.

$$h = \begin{bmatrix} 0 & -k/4 & 0 \\ -k/4 & k+1 & -k/4 \\ 0 & -k/4 & 0 \end{bmatrix} \quad \text{[Formula 2]}$$

In Formula 2, the secondary differential value to be subtracted increases with an increase of k, thereby enhancing the degree of emphasis. Accordingly, k is referred to as an emphasis coefficient. In this embodiment, the emphasis coefficient k varies depending on the reading positions (first to third positions 31 to 33) at which the line sensor 40 is located. When the image signal of the document is obtained in a state where the line sensor 40 is located at the reading position corresponding to the first position 31, the first coefficient 75 is used as the emphasis coefficient k. When the image signal of the document is obtained in a state where the line sensor 40 is located at the reading position corresponding to the second position 32, the second coefficient 76 is used as the emphasis coefficient k. Regarding the coefficients 75 and 76, the second coefficient 76 is set to be larger than the first coefficient 75.

The γ correction circuit 84, the resolution conversion circuit 86, the color conversion circuit 87, and the binarization circuit 88 are known well and thus its description is omitted.

The panel control circuit 128 generates a signal for controlling the liquid crystal display of the operation panel 13 on the basis of the instruction from the controller 55. The panel control circuit 128 includes an interface circuit delivering information input from the operation panel 13 to the controller 55.

The sensor input circuit 129 removes noises from the output signal of the document sensor 36 (see FIG. 4) and outputs the resultant signal to a predetermined output destination. The document sensor 36 is configured to detect a document in the document tray 22 (see FIG. 1) and is disposed at a predetermined position in the document tray 22. The document sensor 36 is a mechanical sensor in this embodiment. The document sensor 36 includes a transmissive optical sensor (photo interrupter) and a shielding member rotatably supported. In the photo interrupter, a light-emitting portion emitting light and a light-receiving portion receiving the light emitted from the light-emitting portion are opposed to each other. The document sensor 36 outputs a sensor signal on the basis of the reception of light in the photo interrupter. When the shielding member is located at a position intercepting the optical path between the light-emitting portion and the light-receiving portion, the light emitted from the light-emitting portion is intercepted by the shielding member and is thus not received by the light-receiving portion. Since the shielding member is detected, the document sensor 36 is in the OFF state. When a document is placed on the document tray 22, the document comes in contact with the shielding member and the shielding member rotates. Accordingly, the shielding member departs from the position intercepting the optical path of the photo interrupter. As a result, the light emitted from the light-emitting portion is received by the light-receiving portion. That is, the document sensor 36 is changed to the ON state. In this way, since the state of the document sensor 36 is changed by placing a document on the document tray 22, the controller 55 can determine the existence of a document on the document tray 22 on the basis of the sensor signal output from the sensor input circuit 129.

The LAN I/F 61 is an interface for connecting the LAN 108 and the scanner 10 to each other in a communicable manner. A terminal device 140 is connected to the LAN 108. The terminal device 140 is, for example, a personal computer. The terminal device 140 includes a keyboard and a mouse for allowing a user to input information and a liquid crystal display for displaying a variety of information. The scanner 10 is connected to the terminal device 140 through the LAN 108 in a communicable manner.

The process of setting the reading position is performed at a predetermined time such as when the device is turned on or when a user performs a predetermined input operation. The process of setting the reading position may be performed when a predetermined time passes after the previous process of setting the reading position or when the device is turned on in a predetermined time. FIGS. 7 to 10 are flowcharts illustrating a process flow of the process of setting a reading position at the time of turning on the scanner 10. The processes of the scanner 10 described with reference to the flowcharts are performed in accordance with commands issued from the controller 55 on the basis of the control programs stored in the ROM 57.

The controller 55 determines whether or not the scanner 10 is turned on (S1), on the basis whether a user has performed a predetermined operation input through the operation panel 13. When the controller 55 determines that the scanner is not turned on (NO in S1), the controller is in a waiting state. When the controller 55 determines that the scanner 10 is turned on (YES in S1), the controller determines whether the reading positions of the modes are stored (S2). Specifically, the controller 55 determines whether or not the first position 31, the second position 32, and the third position 33 are stored in the EEPROM 59. When the controller 55 determines that all the reading positions are stored (YES in S2), the process is ended.

When the controller 55 determines that any one of the first position 31, the second position 32, and the third position 33 is not stored (NO in S2), the controller determines whether or not the first position 31 is stored (S3). When the controller 55 determines that the first position 31 is not stored in the EEPROM 59 (NO in S3), the controller generates a notice of a request for placing the first test document 98 (S4). For example, the controller 55 displays a message such as "Please set a first test document on a document tray" on the operation panel 13.

Figure 11:
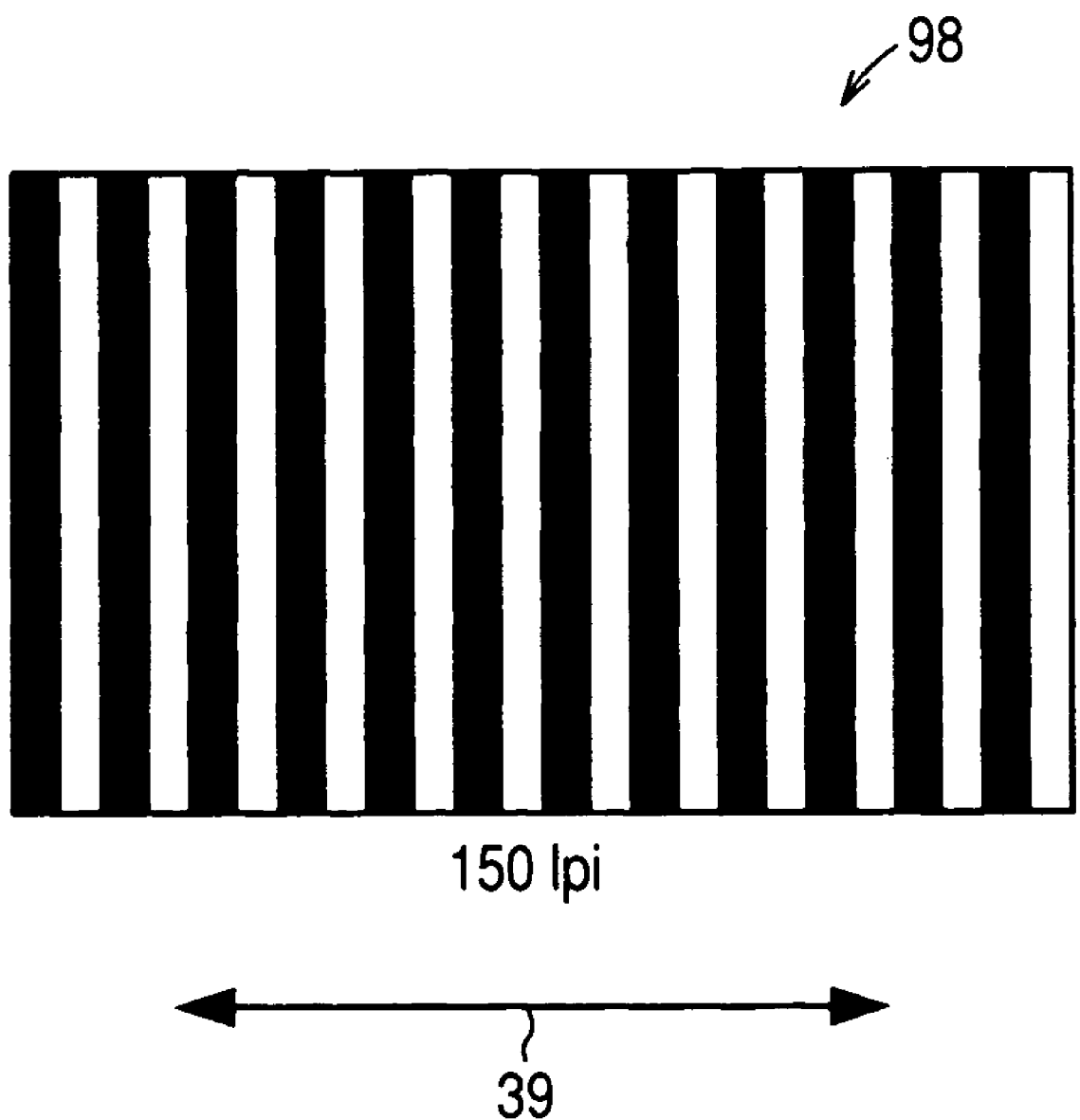
FIG. 11 is a diagram schematically illustrating an example of a first test document of the first embodiment.
Figure 12A:
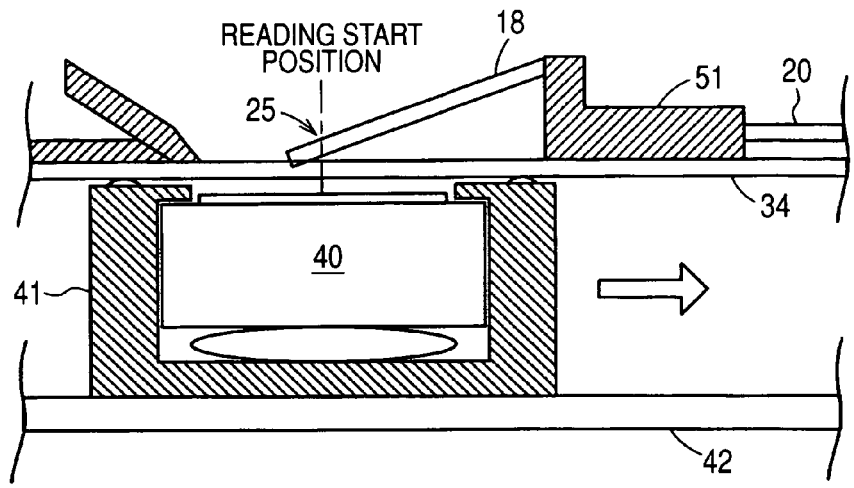
FIGS. 12A to 12C are cross-sectional views schematically illustrating a state where the reading position of the line sensor of the first embodiment is changed.
Figure 12B:
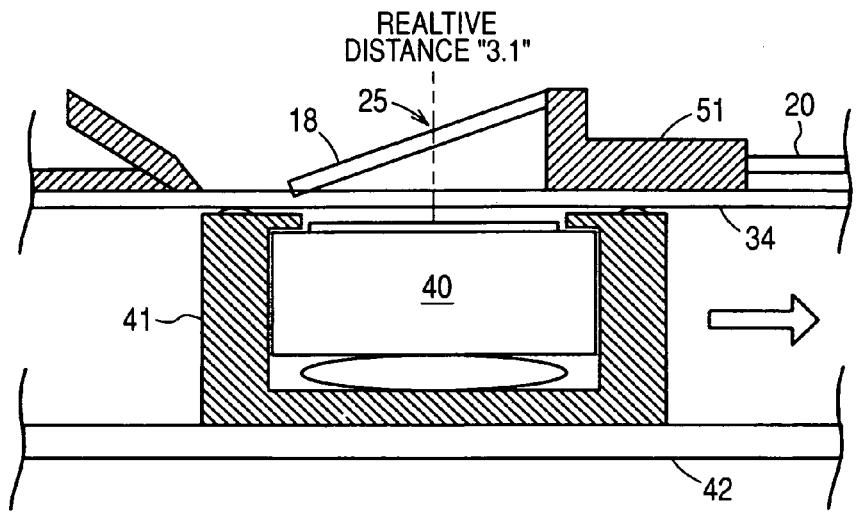
Figure 12C:
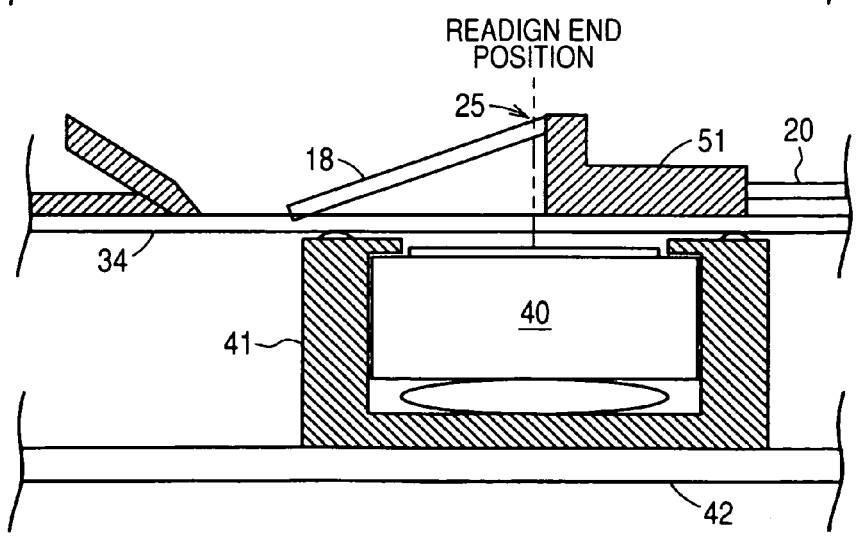

FIG. 11 is a diagram schematically illustrating an example of a first test document 98. FIGS. 12A to 12C are cross-sectional views schematically illustrating a state where the reading position of the line sensor 40 is changed.

As shown in FIG. 11, the first test document 98 has white and black stripes (an example of a predetermined pattern) which are recorded at a pitch of 150 lpi (line per inch). The first test document 98 is placed on the document tray 22 so that the arrangement direction of the pattern (the lateral direction in FIG. 11) is equal to the depth direction (direction indicated by the arrow 39) of the scanner 10. The pitch of the white and black pattern is not limited to 150 lpi, but may be properly changed depending on the performance of the line sensor 40.

The controller 55 determines whether or not the first test document 98 is placed on the document tray 22 (S5), on the basis of the sensor signal output from the document sensor 36 (see FIG. 4). When the controller 55 determines that the first test document 98 is not placed on the document tray 22 (NO in S5), the process of step S4 is performed successively. When the controller 55 determines that the first test document 98 is placed on the document tray 22 (YES in S5), the controller controls the CR motor 65 (see FIG. 4) to allow the line sensor 40 to move to a reading start position (S6). The reading start position is the left end of a readable range (see FIG. 2) of the line sensor 40 on the first glass 18 (see FIG. 12A). The controller controls the motor 72 (see FIG. 4) to convey the first test document 98 along the conveying passage 12 by a predetermined distance. Accordingly, the white and black pattern recorded on the first test document 98 is located above the first glass 18. Then, the controller 55 controls the line sensor 40 to read the first test document 98 through the first glass 18 (S7). In the process of step S7, an image of the first test document 98 is read by one line or several lines. The controller 55 calculates the MTF value on the basis of the image signal of the first test document 98 read in the process of step S7 and Formula 3 (S8).

$$MTF = \frac{(D\max - D\min)/(D\max + D\min)}{(I\max - I\min)/(I\max + I\min)} \quad \text{[Formula 3]}$$

In Formula 3, Imax denotes the maximum concentration of an input image. In other words, Imax denotes a theoretical value of the maximum concentration of the image recorded on the first test document 98. Imin denotes the minimum concentration of the input image. In other words, Imin denotes a theoretical value of the minimum concentration of the image recorded on the first test document 98. Dmax denotes the maximum concentration of an output image. Dmin denotes the minimum concentration of the output image.

The controller 55 determines whether or not the first set number of MTF values (6 values in this embodiment) have been obtained (S9), subsequently to step S8. When the controller 55 determines that 6 MTF values have not been obtained (NO in S9), the controller controls the CR motor 65 to allow the line sensor 40 to move to a reading end position (see FIGS. 12A to 12C) by a first distance (S10). By performing the process of step S10, the reading position of the line sensor 40 is changed. In other words, the first relative distance is changed. The downstream portion of the reading surface 25 of the first glass 18 in the document conveying direction is more apart from the motion plane of the line sensor 40 than the upstream portion. Accordingly, the first relative distance increases with the movement of the line sensor 40. The reading end position is the right end of the readable range (see FIG. 2) of the line sensor 40 on the first glass 18 (see FIG. 12C).

After the reading position of the line sensor 40 is changed in the process of step S10, the processes of steps S7 and S8 are performed in the state where the line sensor 40 is located at the reading position. The controller 55 controls the line sensor 40 to perform the operation of reading the first test document 98 through the first glass 18 at the positions (6 positions in this embodiment) different in the first relative distance from each other, by sequentially repeating the processes of steps S7, S8, and S10. The controller 55 calculates the MTF values at the 6 positions on the basis of the image signal of the first test document 98 obtained in this operation.

Figure 13A:
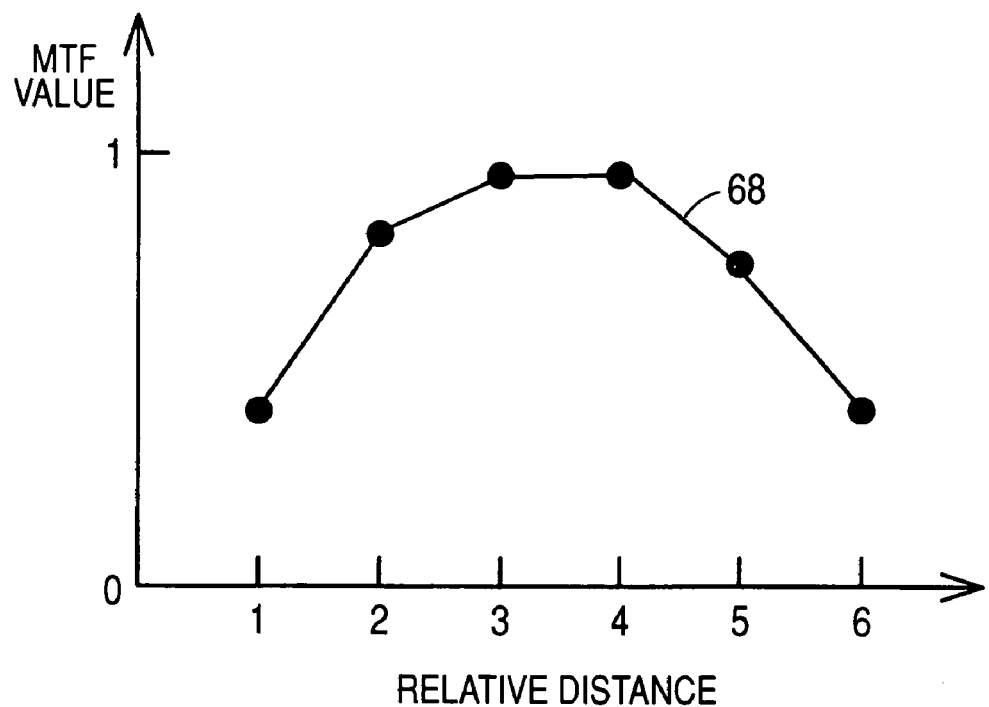
FIGS. 13A and 13B are diagrams illustrating an MTF characteristic obtained by reading the first test document of the first embodiment.
Figure 13B:
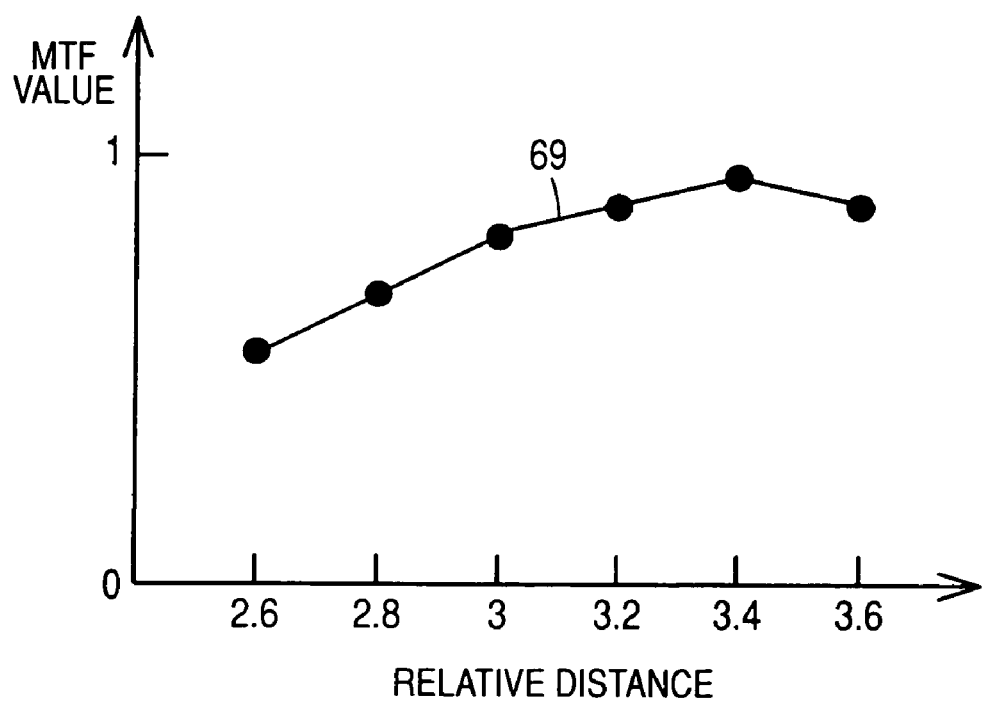

FIGS. 13A and 13B are diagrams illustrating an MTF characteristic obtained by reading the first test document 98.

In FIG. 13A, the horizontal axis represents the relative distance between the line sensor 40 and the reading surface 25 for the first test document 98 on the first glass 18, which is changed by driving the CR motor 65 to move the line sensor 40, that is, the first relative distance. The vertical axis represents the MTF value. In FIG. 13A, the MTF values corresponding to the 6 reading positions different in the first relative distance from each other are shown. "1" of the horizontal axis corresponds to the first relative distance between the line sensor 40 and the first test document 98 in a state where the line sensor 40 is located at the reading start position (see FIG. 12A). "6" of the horizontal axis corresponds to the first relative distance between the line sensor 40 and the first test document 98 in a state where the line sensor 40 is located at the reading end position (see FIG. 12C). As shown in FIG. 13A, the MTF value of the image signal obtained in a state where the line sensor 40 is located at the reading position at which the first relative distance corresponds to "3.1" of the horizontal axis in the MTF curve 68 (see FIG. 12B) is the largest.

In this embodiment, the first distance is set so that the reading position of the line sensor 40 is changed by 6 steps between the reading start position and the reading end position so as to obtain the 6 MTF values. The first distance is set on the basis of a distance from the reading start position to the reading end position and the first set number. The number of obtained MTF values is not limited to 6, but 10 MTF values may be obtained by changing the first distance.

When the controller 55 determines that the 6 MTF values have been obtained (YES in S9), the controller decides as a temporary reading position the reading position at which the MTF value is the maximum (S11). Specifically, the controller 55 calculates the MTF curve 68 (see FIG. 13A) from the 6 MTF values calculated by repeating the processes of steps S8 to S10. Since the method of calculating the MTF curve 68 from the MTF values is well known, its description will be omitted. The controller 55 decides as the temporary reading position the position of the line sensor 40 at which the MTF value is the maximum in the MTF curve 68. Here, the MTF value corresponding to the first relative distance of "3.1" in the horizontal axis in the MTF characteristic shown in FIG. 13A is the maximum. Accordingly, the controller 55 decides as the temporary reading position the reading position (see FIG. 12B) of the line sensor 40 at which the first relative distance is indicated by "3.1" in the horizontal axis. The temporary reading position may be decided without calculating the MTF curve 68. That is, the controller 55 may select the maximum value from the 6 MTF values and decides the reading position of the line sensor 40 corresponding to the MTF value as the temporary reading position. The temporary reading position is temporarily stored in a predetermined area of the RAM 58.

Figure 8:
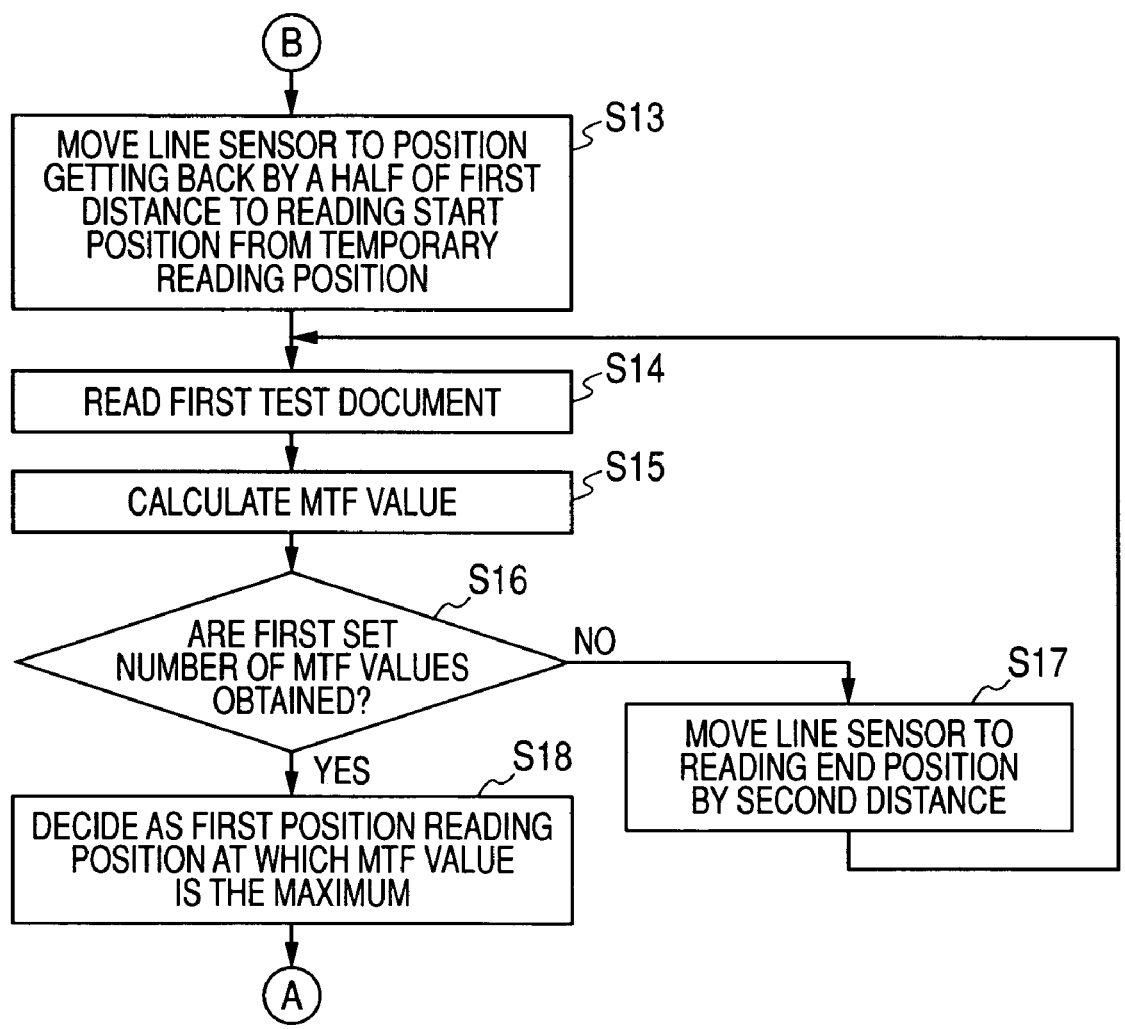
FIG. 8 is a flowchart illustrating a process flow of a reading position setting process performed at the time of turning on the scanner of the first embodiment.
Figure 9:
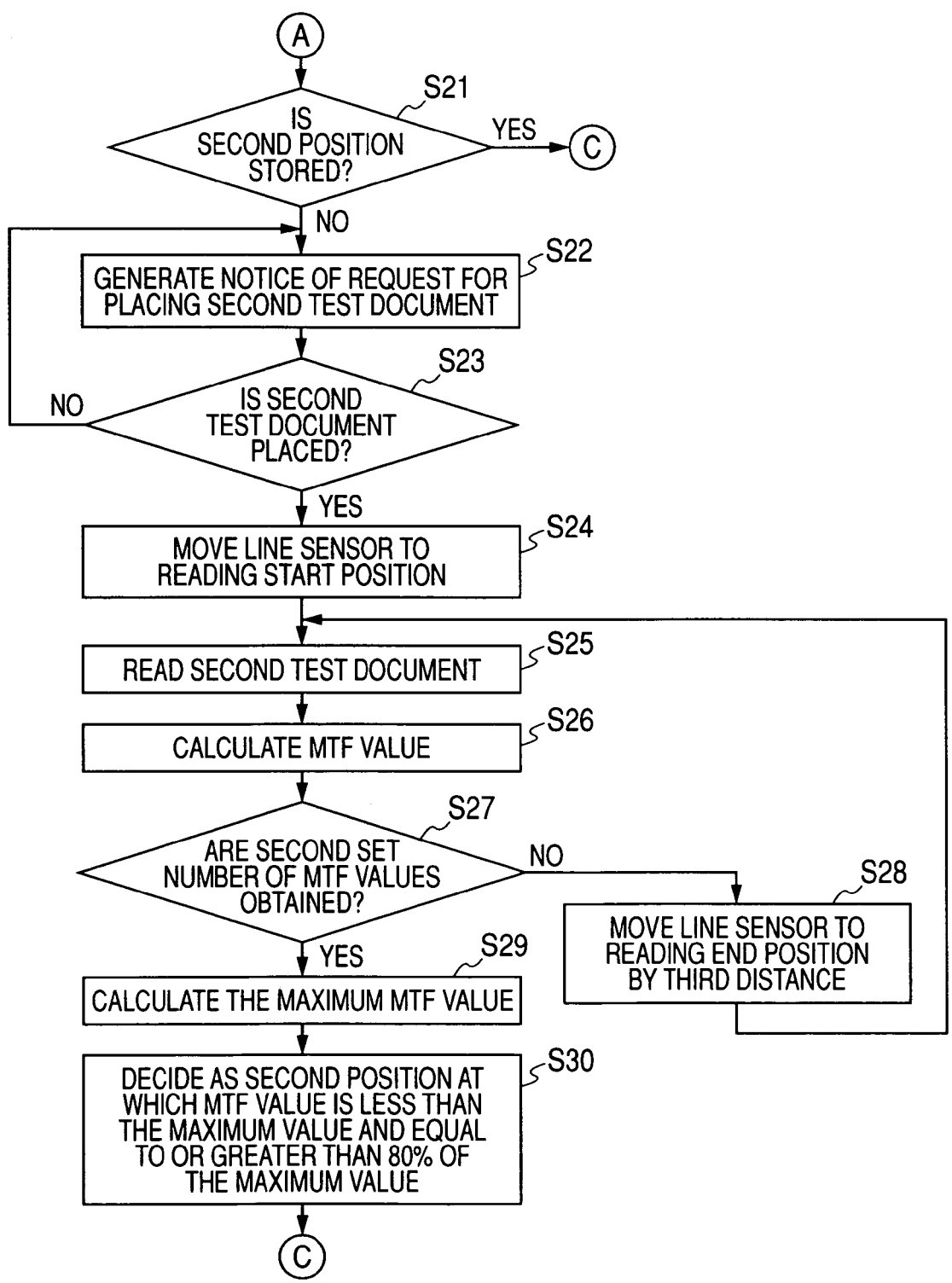
FIG. 9 is a flowchart illustrating a process flow of a reading position setting process performed at the time of turning on the scanner of the first embodiment.
Figure 10:
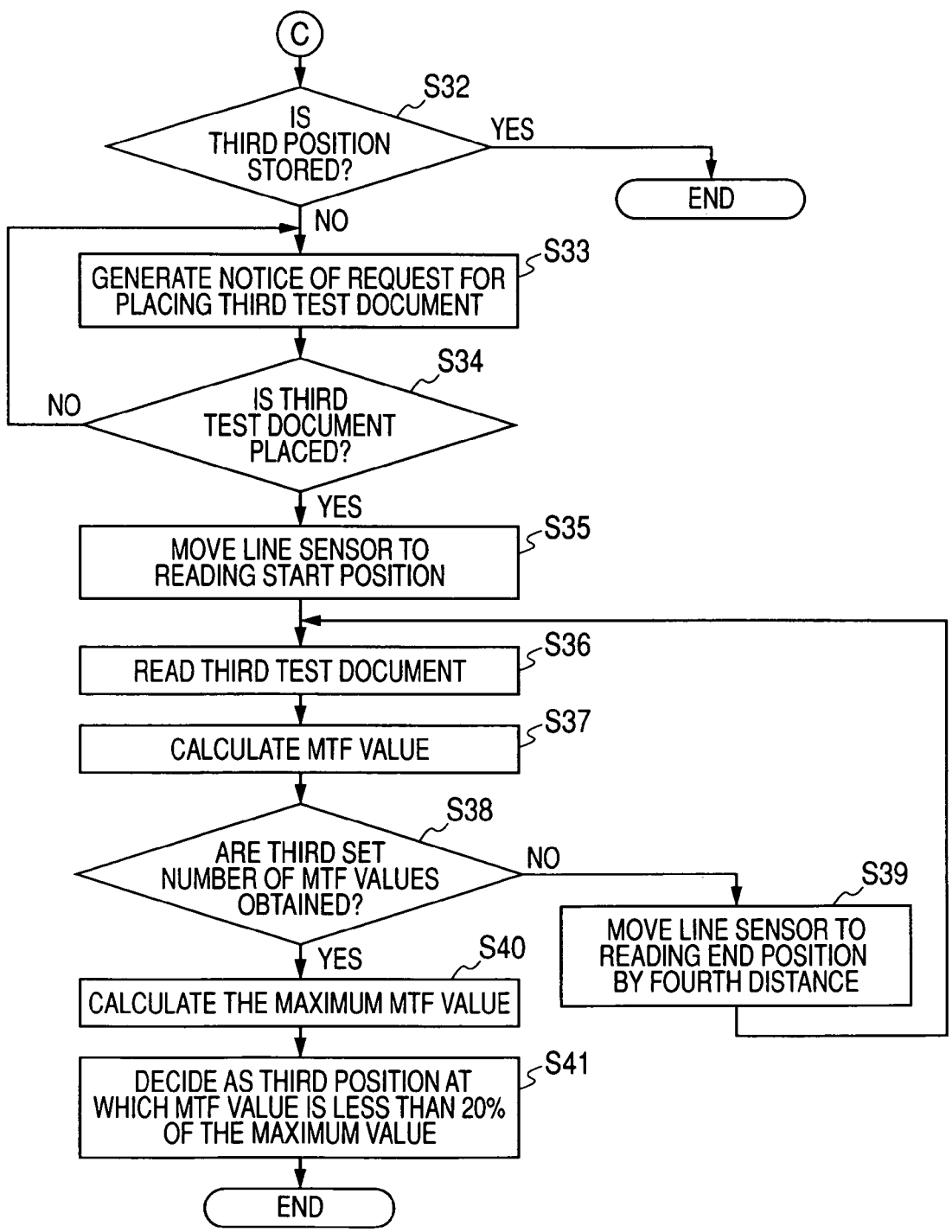
FIG. 10 is a flowchart illustrating a process flow of a reading position setting process performed at the time of turning on the scanner of the first embodiment.

As shown in FIG. 8, the controller 55 moves the line sensor 40 to a position going back by a half of the first distance to the reading start position from the temporary reading position (S13) after performing the process of step S11. Specifically, the controller 55 rotationally drives the CR motor 65 in a direction opposite to that of the process of step S10 to move the line sensor 40 located at the reading end position to the position going back by the half. The controller 55 reads the first test document 98 (S14) in the same way as the process of step S7. The controller 55 calculates the MTF value in the same way as the process of step S8 on the basis of the image signal of the first test document 98 read again in the process of step S14 (S15).

The controller 55 determines whether or not the first set number (6 in this case) of MTF values have been obtained (S16). The process of step S16 is performed in the same way as the process of step S9. when the controller 55 determines that the 6 MTF values have not been obtained (NO in S16), the controller controls the CR motor 65 to move the line sensor 40 to the reading end position by a second distance (S17). The second distance is set to about 20% of the first distance in this embodiment. Accordingly, by performing the process of step S17, the reading position of the line sensor 40 is changed more finely in comparison with the process of step S10.

After the reading position of the line sensor 40 is changed in the process of step S17, the processes of steps S14 and S15 are performed in a state where the line sensor 40 is located at the reading position. The controller 55 controls the line sensor 40 to perform the operation of reading the first test document 98 through the first glass 18 at plural positions (6 positions in this case) which are different from each other in the first relative distance and which are in the front or back of the temporary reading position, by repeating the processes of steps S14, S15, and S17. Then, the controller 55 calculates the MTF value at each of the 6 positions on the basis of the image signal of the first test document 98 obtained in this operation.

In FIG. 13B, the horizontal axis represents the first relative distance between the line sensor 40 and the first test document 98, which is changed by moving the line sensor 40 to the front or back of the temporary reading position of "3.1". The vertical axis represents the MTF value. In FIG. 13B, the MTF values corresponding to the 6 reading positions in the front or back of the temporary reading position different from each other in the first relative distance.

When the controller 55 determines that the 6 MTF values have been obtained (YES in S16), the controller decides as the first position 31 the reading position at which the MTF value is the maximum (S18). Specifically, the controller 55 calculates the MTF curve 69 (see FIG. 13B) from the 6 MTF values calculated by repeating the processes of steps S14 to S17. The controller 55 decides as the first position 31 the position of the line sensor 40 at which the MTF value is the maximum in the MTF curve 69. Here, the MTF value corresponding to the first relative distance of "3.4" in the horizontal axis in the MTF characteristic shown in FIG. 13B. Accordingly, the controller 55 decides as the first position 31 the reading position (see FIG. 6A) of the line sensor 40 at which the first relative distance of "3.4" in the horizontal axis is D1 (see FIG. 6A). The process of step S18 is performed on the condition that the controller 55 determines in step S5 that the first test document 98 is placed on the document tray 22. The first position 31 is information indicating the reading position for the normal mode. The first position 31 is stored in the EEPROM 59.

Accordingly, when the reading mode is set to the normal mode, the line sensor 40 is located at the reading position corresponding to the first position 31 by the CR motor 65 at the time of reading the document through the first glass 18.

When the controller 55 determines that the first position 31 is stored in the EEPROM 59 (YES in S3) or performs the process of step S18, the controller determines whether or not the second position 32 is stored in the EEPROM 59 (S21). When the controller 55 determines that the second position 32 is not stored in the EEPROM 59 (NO in S21), the controller generates a notice of a request for placing the second test document 99 on the document tray 22 (S22). For example, the controller 55 displays a message such as "Please the second test document on the document tray" on the operation panel 13.

Figure 14:
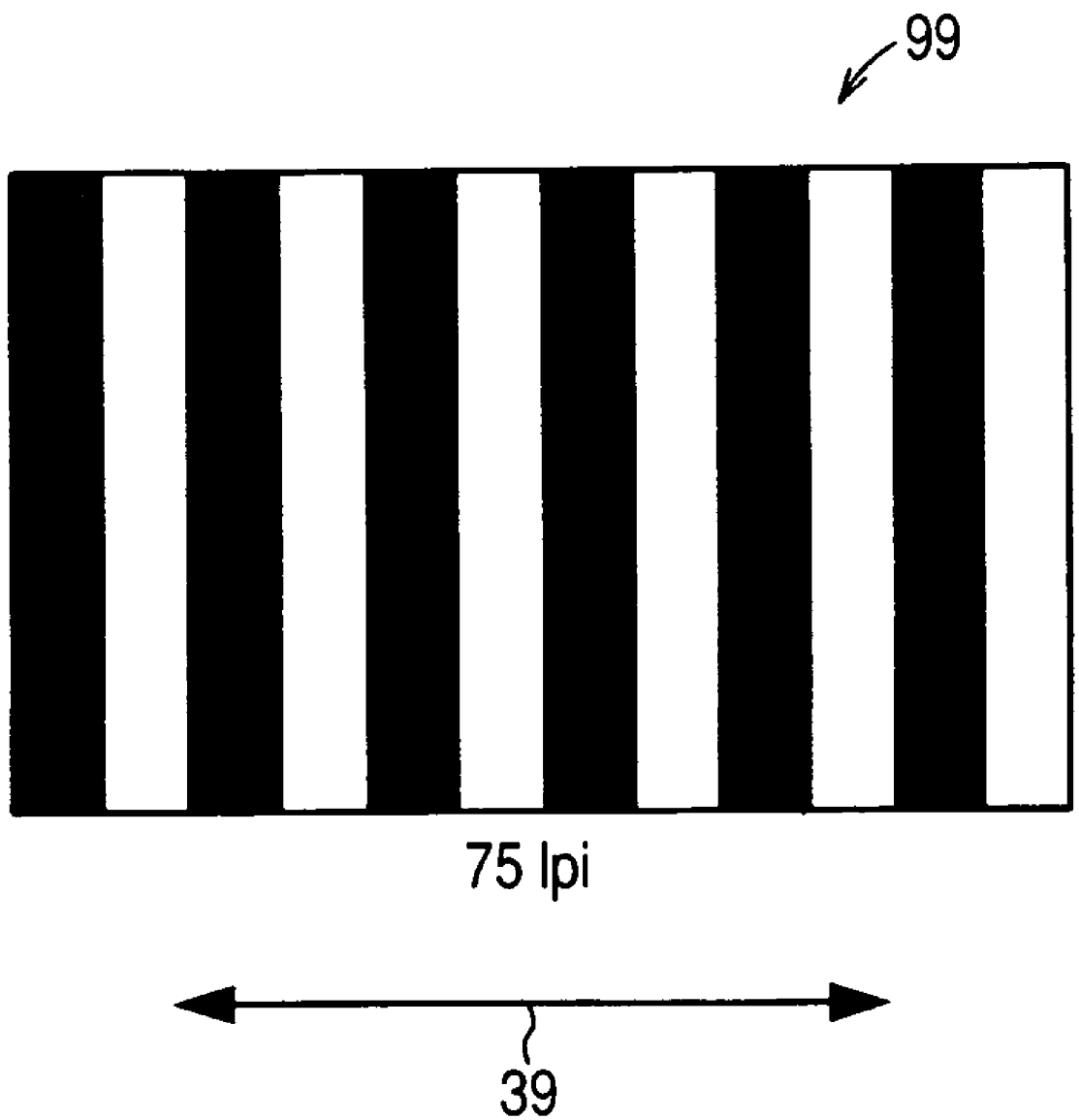
FIG. 14 is a diagram schematically illustrating an example of a second test document of the first embodiment.

FIG. 14 is a diagram schematically illustrating an example of the second test document 99.

As shown in FIG. 14, the second test document 99 has white and black stripes recorded thereon at 75 lpi. The second test document 99 is placed on the document tray 22 so that the arrangement direction (left-right direction in FIG. 14) of the pattern is equal to the depth direction (direction indicated by the arrow 39) of the scanner 10. The pitch of the black and white stripe pattern is not limited to the 75 lpi, but may be properly changed depending on the performance of the line sensor 40.

The controller 55 determines whether or not the second test document 99 is placed on the document tray 22, on the basis of the sensor signal output from the document sensor 36 (see FIG. 4) (S23). When the controller 55 determines that the second test document 99 is not placed on the document tray 22 (NO in S23), the process of step S22 is performed continuously. When the controller 55 determines that the second test document 99 is placed on the document tray 22 (YES in S23), the controller moves the line sensor 40 to the reading start position (S24), similarly to the process of step S6. The controller 55 controls the motor 72 to convey the second test document 99 along the conveying passage 12 by a predetermined distance. Accordingly, the black and white pattern recorded on the second test document 99 is disposed above the first glass 18. The controller 55 controls the line sensor 40 to read the second test document 99 through the first glass 18 (S25). The controller 55 calculates the MTF values on the basis of the image signal of the second test document 99 read in the process of step S25 and Formula 3 (S26).

The controller 55 determines whether or not a second set number (11 in this embodiment) of MTF values have been obtained (S27). When the controller 55 determines that the 11 MTF values have not been obtained (NO in S27), the controller controls the CR motor 65 to move the line sensor 40 to the reading end position (see FIG. 12C) by a third distance (S28). Accordingly, the first relative distance between the line sensor 40 and the second test document 99 is changed. The third distance is a distance from the reading start position to the reading end position and is also a distance set on the basis of the second set number. Therefore, the third distance is changed, for example, with the change of the second set number.

After the reading position of the line sensor 40 is changed in the process of step S28, the processes of steps S25 and S26 are performed in a state where the line sensor 40 is located at the reading position. The controller 55 controls the line sensor 40 to perform the operation of reading the second test document 99 through the first glass 18 at the plural positions (11 positions in this case) different in the first relative distance from each other, by repeating the processes of steps S25, S26, and S28. The controller 55 calculates the MTF value at each of the 11 positions on the basis of the image signal of the second test document 99 obtained in this operation.

Figure 15:
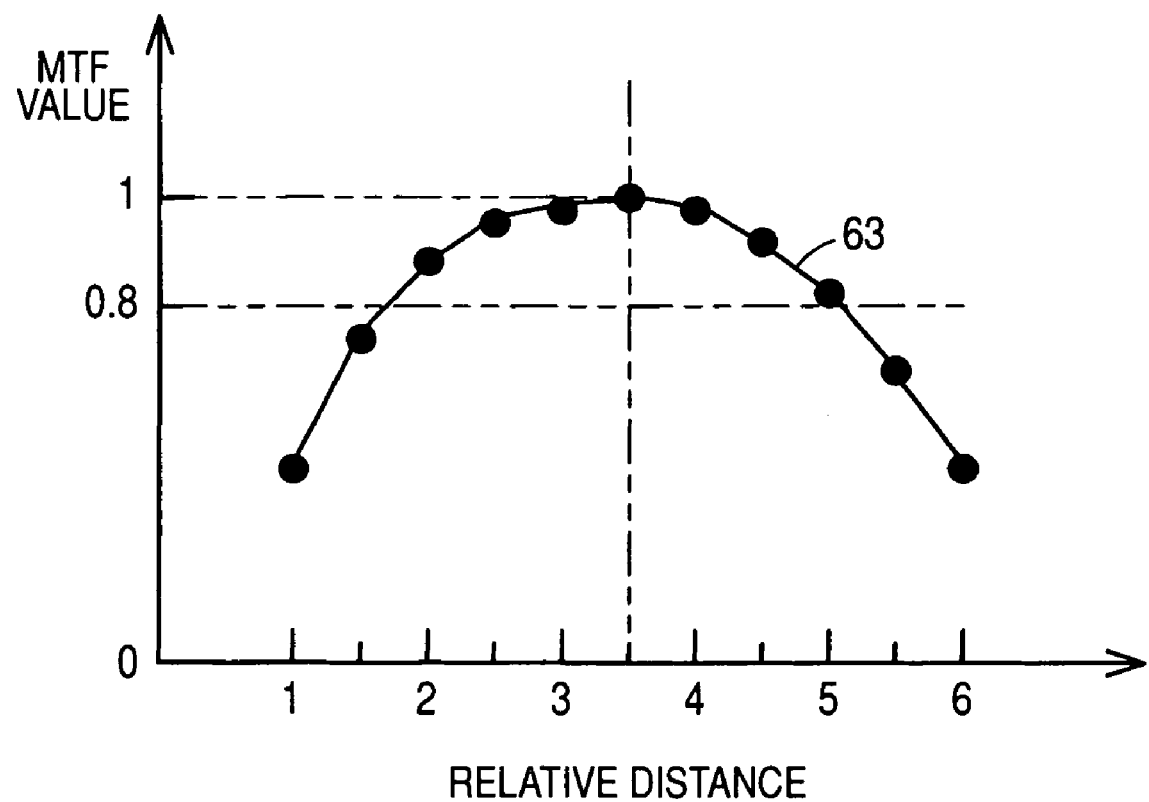
FIG. 15 is a diagram illustrating an MTF characteristic obtained by reading the second test document of the first embodiment.

FIG. 15 is a diagram illustrating the MTF characteristic obtained by reading the second test document 99.

In FIG. 15, the horizontal axis represents the relative distance between the line sensor 40 and the reading surface 25 for the second test document 99 on the first glass 18, which is changed by driving the CR motor 65 to move the line sensor 40, that is, the first relative distance. The vertical axis represents the MTF value. In FIG. 15, the MTF values corresponding to the 11 reading positions different in the first relative distance from each other are shown.

When the controller 55 determines that the 11 MTF values have been obtained (YES in S27), the controller obtains the maximum value of the MTF values (S29). Specifically, the controller 55 obtains an MTF curve 63 (see FIG. 15) from the 11 MTF values calculated by repeating the processes of steps S25 to S28. Then, the controller 55 determines the peak of the MTF curve 63 to obtain the maximum value of the MTF values. Here, as shown in FIG. 15, The MTF value corresponding to the first relative distance of "3.5" in the horizontal axis is the maximum value.

The controller 55 decides as the second position 32 a position at which the MTF value is less than the maximum value obtained in the process of step S29 and equal to or greater than 80% of the maximum value (which is an example of a predetermined threshold value) (S30). Specifically, the controller 55 calculates the MTF value which is 80% of the maximum value obtained in the process of step S29. For example, when the maximum value is 1, the MTF value is 0.8. The controller 55 determines the position of the line sensor 40 corresponding to the calculated MTF value (0.8 in this case). As can be clearly seen from FIG. 15, two positions of the line sensor 40 at which the MTF value is 0.8 exist on both sides of the maximum MTF value. In other words, two MTF values having the same magnitude are obtained. On this condition, the controller 55 decides as the second position 32 the reading position (see FIG. 6B) at which the first relative distance corresponding to the MTF value is the smaller. The process of step S30 is performed on the condition that the controller 55 determines that the second test document 99 is placed on the document tray 22 in step S23. Here, when the reading position at which the first relative distance is the larger is set as the second position 32 and the document is floated from the first glass 18, the intensity of light applied to the document from the light source of the line sensor 40 is greatly reduced. By deciding as the second position 32 the reading position at which the first relative distance is the smaller, it is possible to prevent the read image of the document from being extremely unclear when the document is floated from the first glass 18. The second position 32 is a reading position for the moire reducing mode. The second position 32 is stored in the EEPROM 59. Accordingly, when the reading mode is set to the moire reducing mode, the line sensor 40 is located at the reading position corresponding to the second position 32 by the CR motor 65 at the time of reading the document through the first glass 18. As shown in FIG. 6B, the line sensor 40 is located at the reading position at which the first relative distance is D2. Here, 80% of the maximum MTF value is only an example of the predetermined threshold value and may be properly changed depending on the degree of moire or the like.

When the controller 55 determines that the second position is stored (YES in S21) or when the controller performs the process of step S30, the controller determines whether or not the third position 33 (see FIG. 4) is stored in the EEPROM 59 (S32). When the controller 55 determines that the third position 33 is stored (YES in S32), the process is ended. When the controller 55 determines that the third position 33 is not stored (NO in S32), the controller generates a notice of a request for placing a third test document (not shown) (S33). For example, the controller 55 displays a message such as "please set the third test document on the document tray" on the operation panel 13. The third test document has a black and white stripe pattern recorded thereon, for example, at 50 lpi.

The controller 55 determines whether or not the third test document is placed on the document tray 22 (S34). The process of step S34 is performed in the same way as the process of step S5. When the controller 55 determines that the third test document is not placed on the document tray 22 (NO in S34), the process of step S33 is performed continuously. When the controller 55 determines that the third test document is placed on the document tray 22 (YES in S34), the controller moves the line sensor 40 to the reading start position (S35), similarly to the process of step S6. The controller 55 controls the motor 72 to convey the third test document along the conveying passage 12 by a predetermined distance. Accordingly, the black and white pattern recorded on the third test document is located above the first glass 18. Then, the controller 55 controls the line sensor 40 to read the third test document through the first glass 18 (S36). The controller 55 calculates the MTF value on the basis of the image signal of the third test document read in the process of step S36 and Formula 3 (S37).

The controller 55 determines whether or not a third set number (for example, 8) of MTF values have been obtained (S38). When the controller 55 determines that 8 MTF values have not been obtained (NO in S38), the controller controls the CR motor 65 to move the line sensor 40 to the reading end position (see FIG. 12C) by a fourth distance (S39). Accordingly, the first relative distance between the line sensor 40 and the reading surface 25 for the third test document on the first glass 18 is changed. The fourth distance is set on the basis of the distance from the reading start position to the reading end position and the third set number.

After the reading position of the line sensor 40 is changed in the process of step S39, the processes of steps S36 and S37 are performed in a state where the line sensor 40 is located at the reading position. The controller 55 controls the line sensor 40 to perform the operation of reading the third test document through the first glass 18 at plural positions (8 positions in this case) different from each other in the first relative distance, by repeating the processes of steps S36, S37, and S39. Then, the controller 55 calculates the MTF value at each of the 8 positions on the basis of the image signal of the third test document obtained in this operation.

When the controller 55 determines that the 8 MTF values have been obtained (YES in S38), the controller obtains the maximum value of the MTF values (S40). The process of step S40 is performed in the same way as the process of step S29. That is, the process of step S40 is performed by calculating the MTF curve from the 8 MTF values obtained by repeating the processes of steps S36 to S39 and determining the MTF value corresponding to the pitch.

The controller 55 decides as the third position 33 the position at which the MTF value is less than 20% of the maximum value obtained in the process of step S40 (S41). Specifically, the controller 55 calculates the MTF value which is 20% of the maximum value obtained in the process of step S40. For example, when the maximum value is 1, the MTF value is 0.2. The controller 55 determines the position of the line sensor 40 corresponding to the calculated MTF value (0.2 in this case). The MTF curve resulting from the MTF values calculated in the process of step S37 is a curve a peak at the center thereof, similarly to the MTF curve 68 (see FIG. 13A) or the MTF curve 63 (see FIG. 15). Accordingly, two MTF values having the same magnitude are obtained from the MTF curve. The controller 55 decides as the third position 33 the reading position (see FIG. 6C) at which the first relative distance is the smaller. The third position 33 is a reading position for the blur mode. The third position 33 is stored in the EEPROM 59. Accordingly, when the reading mode is set to the blur mode, the line sensor 40 is located at the reading position corresponding to the third position 33 by the CR motor 65 at the time of reading a blurred area of a document through the first glass 18. As shown in FIG. 6C, the line sensor 40 is located at the reading position at which the first relative distance is D3. In this embodiment, when the reading mode is set to the blur mode, the image of an extra-dim area of the document is read in a state where the line sensor 40 is located at the reading position corresponding to the second position 32. That is, in the blur mode, the document conveyed by the ADF 28 is read while the reading position of the line sensor 40 is changed in the course of reading the document. The reading of a document in the blur mode will be described in detail later.

In this way, the first test document 98 (see FIG. 11) is read by the line sensor 40 through the first glass 18. The line sensor 40 moves relative to the first glass 18 by the CR motor 65. The position of the line sensor 40 relative to the first glass 18 is changed and the first test document 98 is read by the line sensor 40. Accordingly, the image signal of the first test document 98 is obtained every position at which the line sensor 40 is located. The MTF value is calculated every position of the line sensor 40 on the basis of the image signals (see FIGS. 13A and 13B). The first position 31 which is the information indicating the reading position for the normal mode (see FIG. 6A) is decided on the basis of the MTF values. Similarly, the second position 32 which is the information indicating the reading position (see FIG. 6B) for the moire reducing mode is decided by the use of the second test document 99 (see FIG. 14). The third position 33 is decided which is the information indicating the reading position (see FIG. 6C) for the blur mode is decided by the use of the third test document.

In this way, the controller 55 decides the reading positions at which the line sensor 40 is located by the CR motor 65 in the normal mode, the moire reducing mode, and the blur mode on the basis of the MTF values calculated while changing the reading position.

The first to third positions 31 to 33 may be decided using a sheet of test document having three patterns recorded thereon for deciding the first to third positions 31 to 33, instead of three sheets of the first test document 98, the second test document 99, and the third test document. In this case, a test document is used in which three patterns are arranged in the depth direction (direction indicated by the arrow 39) of the scanner 10. The controller 55 individually reads the images of the patterns while changing the reading range in the main scanning direction of the test document. Then, the controller 55 determines the first to third positions 31 to 33 on the basis of the obtained images. In this case, a user's labor for placing the test documents on the document tray 22 is reduced. A test document in which three patterns are arranged in the document conveying direction may be used. In this case, by conveying the test document, the images of the patterns can be individually read by changing the pattern located on the first glass 18.

Although it has been described in this embodiment that three patterns are used to decide the first to third positions 31 to 33, the number of patterns used to decide the reading positions may be 1. For example, without using the second test document 99 and the third test document, the first to third positions 31 to 33 may be decided using only the first test document 98. In this case, the controller 55 decides as the first position 31 the reading position corresponding to the maximum MTF value obtained by reading the pattern of the first test document 98. Then, the controller 55 decides as the second position 32 the reading position corresponding to the MTF value which is 80% of the maximum value and decides as the third position 33 the reading position corresponding to the MTF value which is 50% of the maximum value. That is, the number of patterns used to decide the first to third positions 31 to 33 is arbitrary.

Figure 16:
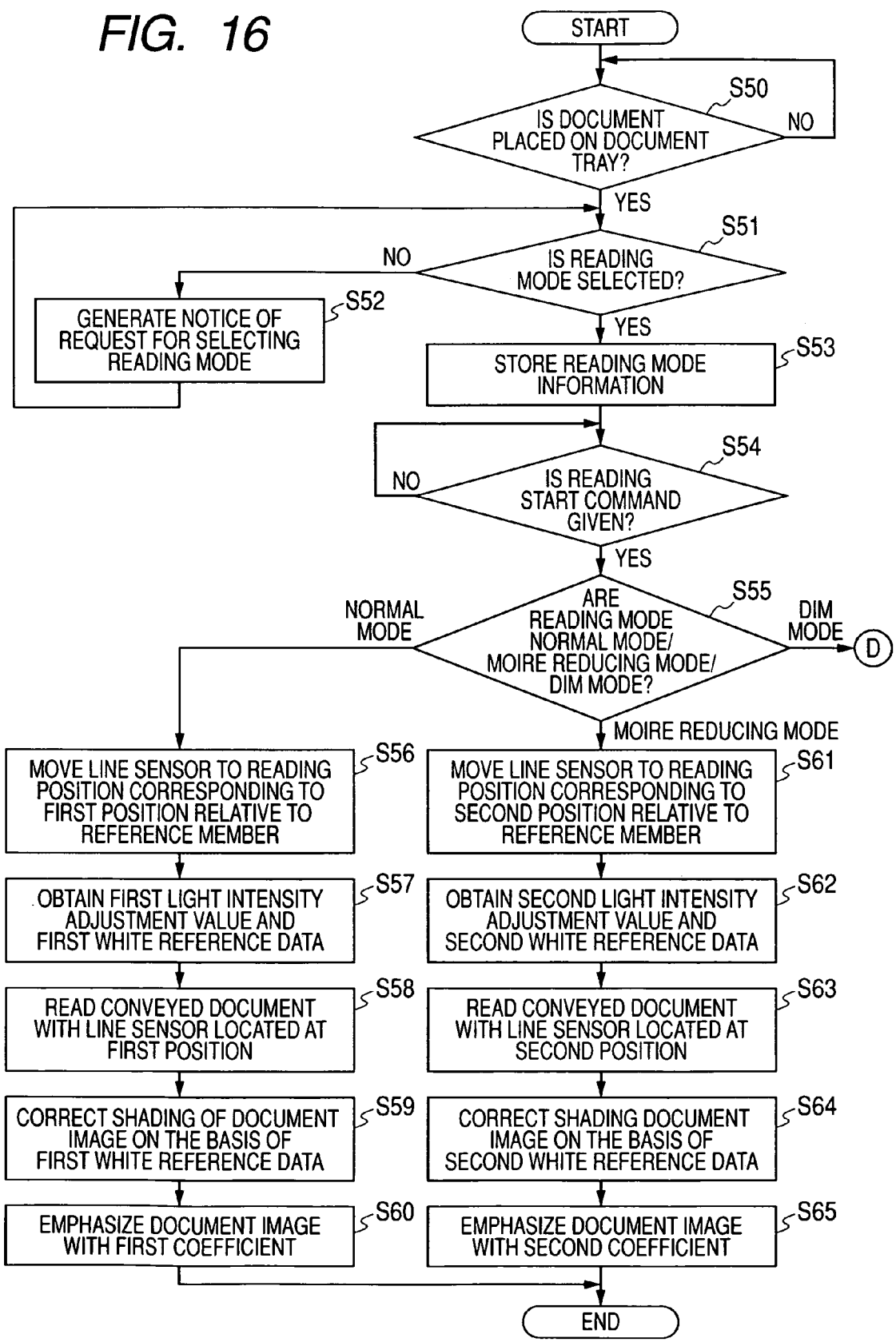
FIG. 16 is a flowchart illustrating a flow of processes performed by the scanner of the first embodiment at the time of reading a document conveyed by an ADF.
Figure 17:
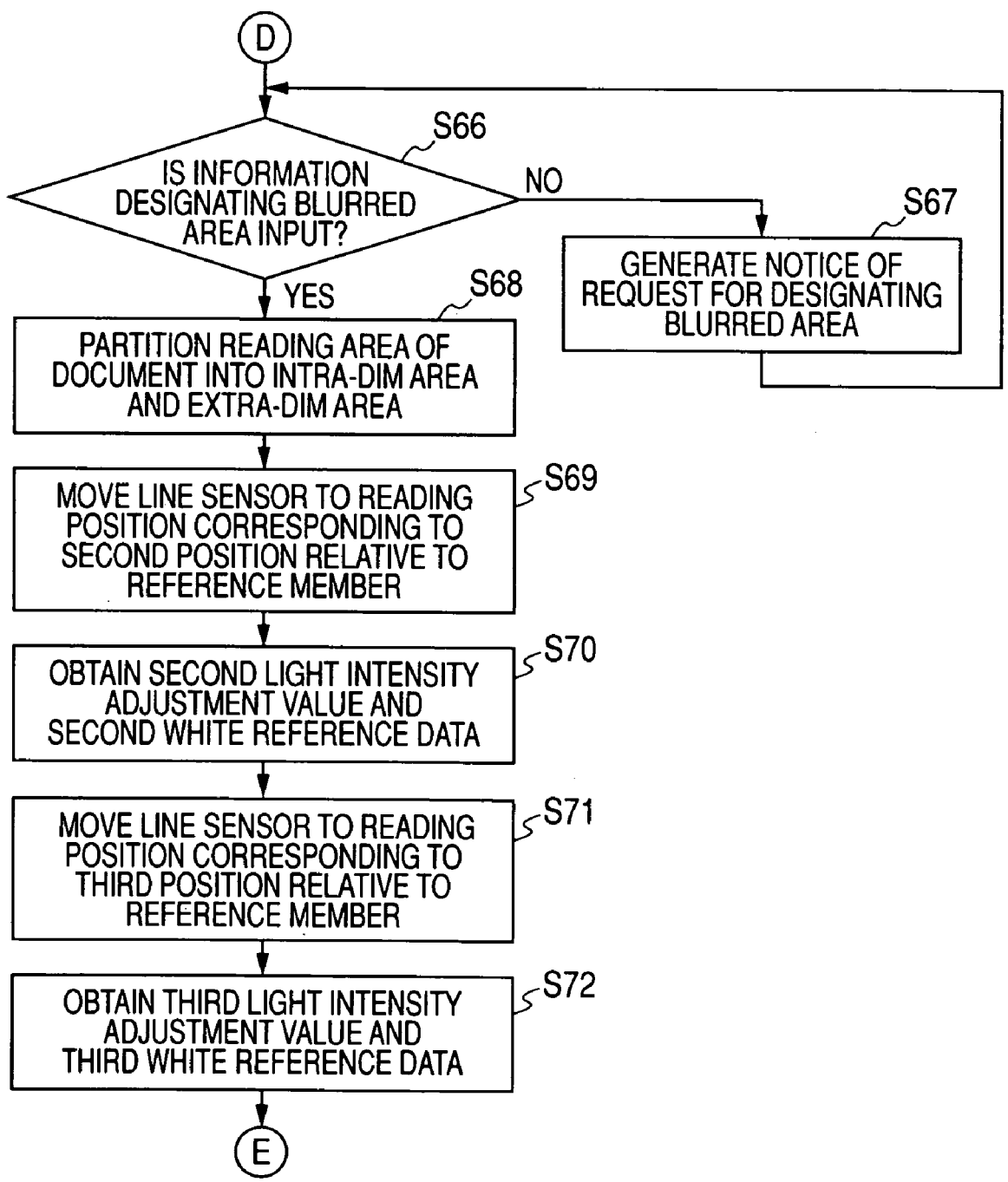
FIG. 17 is a flowchart illustrating a flow of processes performed by the scanner of the first embodiment at the time of reading a document conveyed by the ADF.
Figure 18:
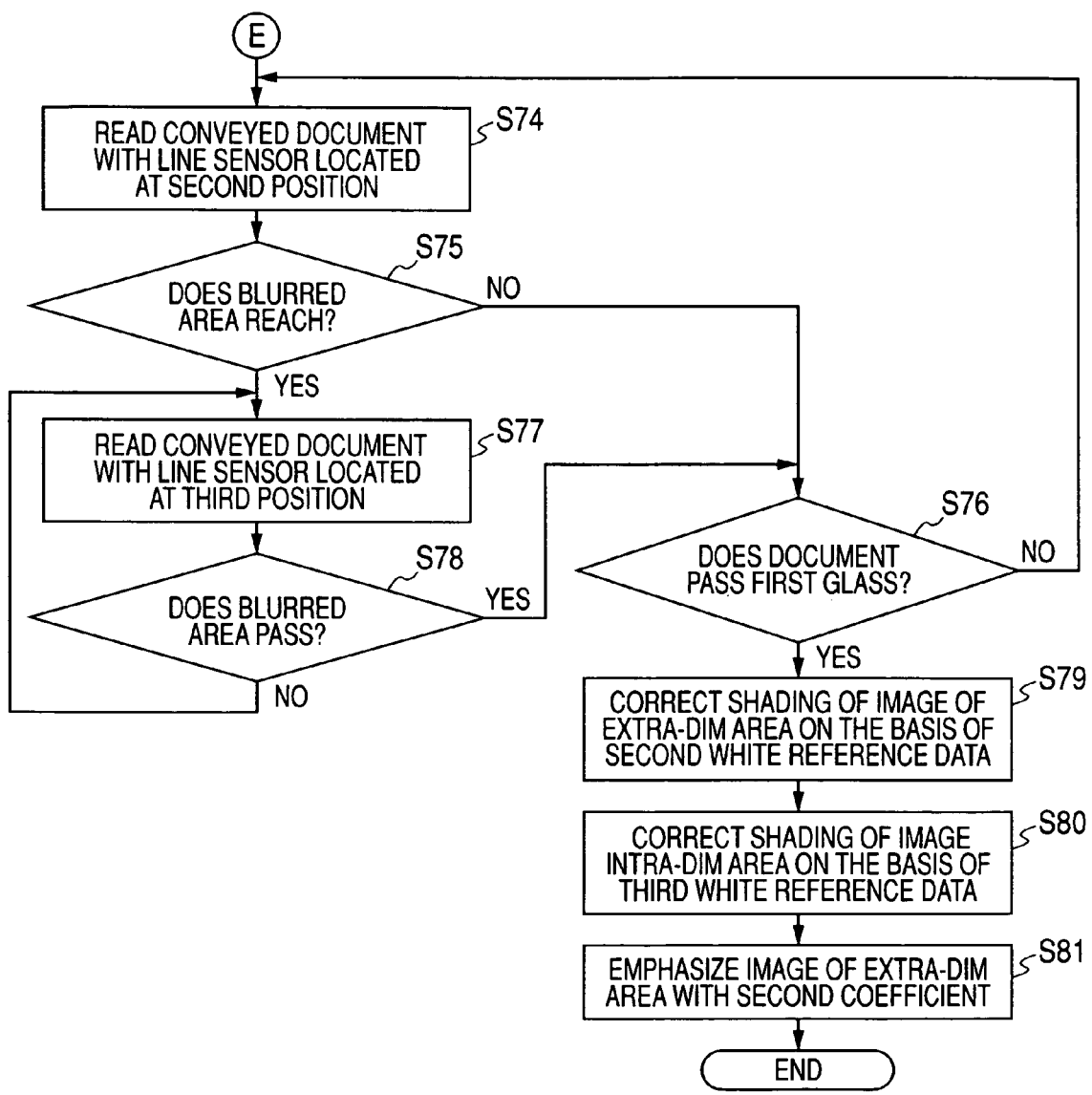
FIG. 18 is a flowchart illustrating a flow of processes performed by the scanner of the first embodiment at the time of reading a document conveyed by the ADF.

FIGS. 16 to 18 are flowcharts illustrating a flow of processes performed by the scanner 10 at the time of reading the document conveyed by the ADF 28.

The controller 55 determines whether or not a document is placed on the document tray 22 on the basis of the sensor signal output from the document sensor 36 (S50). When the controller 55 determines that a document is not placed on the document tray 22 (NO in S50), the controller is in the waiting state. When the controller 55 determines that a document is placed on the document tray 22 (YES in S50), the controller determines whether or not the reading mode is selected on by a predetermined operation from the operation panel 13 (S51). When the controller 55 determines that the reading mode is not selected (NO in S51), the controller generates a notice of a request for selecting a reading mode (S52). Specifically, the controller 55 displays a message such as "please select a reading mode" and selectable reading modes (normal mode, moire reducing mode, and blurred mode in this embodiment) on the display panel 13. The process of step S52 is continuously performed until the controller 55 determines that a reading mode is selected in the process of step S51. When the controller 55 determines that a reading mode is selected (YES in S51), the controller stores the information as the reading mode information 24 (see FIG. 4) in the RAM 58 (S53). In this way, the controller 55 receives the selection of the normal mode, the moire reducing mode, or the blur mode and sets any one mode in the RAM 58. The normal mode may be set as a default of the reading mode so that the normal mode is set when it is instructed to start reading a document without selecting a reading mode.

The controller 55 determines whether or not a document reading start command is input on the basis of a predetermined operation input from the operation panel 13 (S54). When the controller 55 determines that the document reading start command is not input (NO in S54), the controller performs again the process of step S54. When the controller 55 determines that the document reading start command is input (YES in S54), the controller determines what of the normal mode, the moire reducing mode, and the blur mode is set as the reading mode on the basis of the reading mode information 24 stored in the RAM 58 (S55).

When the controller 55 determines that the reading mode is set to the normal mode (normal mode in S55), the controller moves the line sensor 40 to the reading position corresponding to the first position 31 relative to the reference member 37 (see FIG. 2) (S56). This reading position is a position at which the relative distance (the second relative distance) between the line sensor 40 moving below the reference member 37 by the CR motor 65 and the reading surface 27 of the reference member 37 is substantially equal to the relative distance (the first relative distance) between the line sensor 40 located at the first position 31 and the document reading surface 25 on the first glass 18. For example, by correlating and storing in advance the reading position of the line sensor 40 relative to the first glass 18 and the reading position of the line sensor 40 relative to the reference member 37 with each other, it is possible to allow the first relative distance and the second relative distance to be substantially equal to each other. That is, it is possible to allow the distances to the reference member 37 and the reading surface 25 to be equal to each other. Accordingly, it is possible to prevent a difference in intensity between the light applied to the reading surface 25 on the first glass 18 from the light source of the line sensor 40 and the light applied to the reference member 37 from the light source of the line sensor 40.

The controller 55 obtains the first light intensity adjustment value 101 and the first white reference data 90 (see FIG. 5) (S57). The controller 55 applied light to the reading surface 27 on the reference member 37 with the small intensity at first from the light source of the line sensor 40. Then, the controller 55 gradually increases the intensity of the light source until the output from the light-receiving element of the line sensor 40 reaches a predetermined value, and obtains as the first light intensity adjustment value 101 the intensity when the received light intensity reaches the predetermined value. That is, the first light intensity adjustment value 101 is the light intensity of the light source when the light intensity received by the light-receiving element of the line sensor 40 reaches the predetermined value. Subsequently, the controller 55 applies light to the reading surface 27 of the reference member 37 from the light source of the line sensor 40 with the light intensity of the first light intensity adjustment value 101. Then, the controller 55 converts the reflected light from the reading surface 27 into the electrical signal by the use of the light-receiving element of the line sensor 40, thereby obtaining the first white reference data 90. The first light intensity adjustment value 101 and the first white reference data 90 obtained in the process of step S57 are stored in the RAM 58.

The controller 55 controls the line sensor 40 located at the reading position corresponding to the first position 31 to read the document conveyed by the ADF 28 (S58). Specifically, the controller 55 controls the CR motor 65 to move the line sensor 40 opposed to the reference member 37 to the reading position (see FIG. 6A) corresponding to the first position 31. The controller 55 controls the line sensor 40 to perform the operation of reading the document conveyed over the first glass 18 at the reading position corresponding to the first position 31. Accordingly, an image of a document is read in a state where the line sensor 40 is substantially focused on the document reading surface 25 of the first glass 18. For this reason, it is possible to obtain a clearer image of the document in comparison with a case where the document is read by the line sensor 40 located at a different position. The document image (image signal) read in this way is processed by the AFE circuit 78, the sampling circuit 81, and the darkness correction circuit 82.

The shading correction circuit 83 corrects the shading of the document image processed by the darkness correction circuit 82 on the basis of the first white reference data 90 obtained in the process of step S57 (S59). The filter processing circuit 85 emphasizes the document image of which the shading has been corrected on the basis of the first coefficient 75 stored in the EEPROM 59 (S60). In this way, the filter process circuit 85 emphasizes the document image obtained in the normal mode by the use of the first coefficient 75. The emphasized document image is processed by the resolution conversion circuit 86, the color conversion circuit 87, and binarization circuit 88 and then is stored in a predetermined area of the RAM 58.

When the controller 55 determines that the reading mode is set to the moire reducing mode (moire reducing mode in S55), the controller moves the line sensor 40 to the reading position corresponding to the second position 32 relative to the reference member 37 (see FIG. 2) (S61). The reading position is a position at which the second relative position between the line sensor 40 moved below the reference member 37 by the CR motor 65 and the reading surface 27 of the reference member 37 is substantially equal to the first relative distance between the line sensor 40 located at the reading position corresponding to the second position 32 and the document reading surface 25 of the first glass 18.

The controller 55 obtains the second light intensity adjustment value 102 and the second white reference data 91 (see FIG. 5) (S62). The process of step S62 is performed in the same way as the process of step S57, except that the reading position of the line sensor 40 relative to the reference member 37 is different. The second light intensity adjustment value 102 and the second white reference data 91 obtained in the process of step S62 are stored in the RAM 58.

The controller 55 controls the line sensor 40 located at the reading position corresponding to the second position 32 to read the document conveyed by the ADF 28 (S63). Specifically, the controller 55 controls the CR motor 65 to move the line sensor 40 opposed to the reference member 37 to the reading position (see FIG. 6B) corresponding to the second position 32. The controller 55 controls the line sensor 40 to perform the operation of reading the document conveyed over the first glass 18 at the reading position corresponding to the second position 32. Accordingly, an image of a document is read in a state where the focus of the line sensor 40 is slightly out of the document reading surface 25 of the first glass 18. The document image (image signal) read in this way is processed by the AFE circuit 78, the sampling circuit 81, and the darkness correction circuit 82.

The shading correction circuit 83 corrects the shading of the document image processed by the darkness correction circuit 82 on the basis of the second white reference data 91 obtained in the process of step S62 (S64). The filter processing circuit 85 emphasizes the document image of which the shading has been corrected on the basis of the second coefficient 76 stored in the EEPROM 59 (S65). In this way, the filter process circuit 85 emphasizes the document image obtained in the moire reducing mode by the use of the second coefficient 76. The second coefficient 76 is larger than the first coefficient 75. For this reason, the document image read in the process of step S63 is more emphasized than the document image read in the process of step S58. By reading the document in the moire reducing mode, the moire is suppressed from occurring and the image is prevented from being blurred. The emphasized document image is processed by the resolution conversion circuit 86, the color conversion circuit 87, and binarization circuit 88 and then is stored in a predetermined area of the RAM 58.

When the controller 55 determines that the reading mode is set to the blur mode (dim mode in S55), the controller determines whether or not the information designating the blurred area is input on the basis of a predetermined operation from the operation panel 13 (S66). Here, the blurred area is an area which is read in a blurred state among the reading area of the document conveyed by the ADF 28. When the controller 55 determines that the information designating the blurred area is not input (NO in S66), the controller generates a notice of a request for designating the blurred area (S67). For example, the controller 55 displays a message such as "please designate a blurred area" on the operation panel 13. The process of step S67 is repeated until YES is determined in the process of step S66.

When the controller 55 determines that the information designating the blurred area is input (YES in S66), the controller partitions the reading area of the document into an intra-dim area and an extra-dim area (S68). In this way, the controller 55 partitions the reading area for the line sensor 40 in the document conveyed by the ADF 28 into plural areas (two areas in this case) on the basis of information input from the outside.

The controller 55 moves the line sensor 40 to the reading position corresponding to the second position 32 relative to the reference member 37 (S69). The controller 55 obtains the second light intensity adjustment value 102 and the second white reference data 91 (S70), similarly to the process of step S62. The second light intensity adjustment value 102 and the second white reference data 91 are stored in the RAM 58. The controller 55 moves the line sensor 40 to the reading position corresponding to the third position 33 relative to the reference member 37 (S71). This reading position is a position at which the second relative distance between the line sensor 40 moved below the reference member 37 by the CR motor 65 and the reading surface 27 of the reference member 37 is substantially equal to the first relative distance between the line sensor 40 located at the reading position corresponding to the third position 33 and the document reading surface 25 of the first glass 18. The controller 55 obtains the third light intensity adjustment value 103 and the third white reference data 92 (S72), similarly to the process of step S57. The third light intensity adjustment value 103 and the third white reference data 92 are stored in the RAM 58.

As shown in FIG. 18, the controller 55 controls the line sensor 40 located at the reading position corresponding to the second position 32 to read the document conveyed by the ADF 28 (S74). Specifically, the controller 55 controls the CR motor 65 to move the line sensor 40 opposed to the reference member 37 to the reading position (see FIG. 6B) corresponding to the second position 32. Then, the controller 55 controls the line sensor 40 to perform the operation of reading the document conveyed over the first glass 18 at the reading position corresponding to the second position 32. Accordingly, the document image is read in a state where the focus of the line sensor 40 is slightly out of the document reading surface 25 of the first glass 18.

The controller 55 determines whether or not the blurred area of a document conveyed by the ADF 28 reaches the reading surface 25 (see FIG. 6C) of the first glass 18 (S75). The process of step S75 is performed on the basis of the information on the blurred area partitioned in the process of step S68 and the number of steps of the motor 72 (see FIG. 4) after the conveying of the document is started by the ADF 28. When the controller 55 determines that the blurred area does not reach the reading surface (No in S75), the controller determines whether or not the document passes over the first glass 18 (S76). When the controller 55 determines that the document does not pass the first glass 18 (NO in S76), the process of step S74 is performed again.

When the controller 55 determines that the blurred area reaches the reading surface (YES in S75), the controller controls the line sensor 40 located at the reading position (see FIG. 6C) corresponding to the third position 33 to read the document conveyed by the ADF 28 (S77). Specifically, the controller 55 controls the CR motor 65 to move the line sensor 40 located at the second position 32 to the reading position corresponding to the third position 33. The controller 55 controls the line sensor 40 to perform the operation of reading the document conveyed over the first glass 18 at the reading position corresponding to the third position 33. Accordingly, the image of the document is read in a state where the focus of the line sensor 40 is extremely out of the document reading surface 25 of the first glass 18.

In this way, the controller 55 decides the reading position for the blur mode at each of the plural areas (the intra-dim area and the extra-dim area in this embodiment). The controller 55 changes the position of the line sensor 40 at each of the areas (the intra-dim area and the extra-dim area) in the course of reading the document conveyed in the blur mode. Accordingly, the resolution of the line sensor 40 is changed by areas to read the document. As a result, the obtained document image has a blurred image in a partial area.

The controller 55 determines whether or not the blurred area passes the reading surface 25 (see FIG. 6C) of the first glass 18 corresponding to the third position 33 (S78). The process of step S78 is performed on the basis of the information on the blurred area partitioned in the process of step S68 and the number of steps of the motor 72 after the conveying of the document is started by the ADF 28. When the controller 55 determines that the blurred area does not pass the reading surface (NO in S78), the process of step S77 is repeated. When the controller 55 determines that the blurred area passes the reading surface (YES in S78), the process of step S76 is performed. When the controller 55 determines that the document passes over the first glass 18 (YES in S76), the controller determines that the reading of the document is finished.

The document image (image signal) read in the processes of steps S74 and S77 is processed by the AFE circuit 78, the sampling circuit 81, and the darkness correction circuit 82. When the controller 55 determines in step S76 that it is YES, the shading correction circuit 83 corrects the shading of the image of the extra-dim area on the basis of the second white reference data 91 obtained in the process of step S70 (S79). The shading correction circuit 83 corrects the shading of the image of the intra-dim area on the basis of the third white reference data 92 obtained in the process of step S72 (S80).

The filter processing circuit 85 emphasizes the image of the extra-dim area of which the shading is corrected on the basis of the second coefficient 76 (see FIG. 5) stored in the EEPROM 59 (S81). The emphasized images of the intra-dim area and the extra-dim area are processed by the resolution conversion circuit 86, the color conversion circuit 87, and the binarization circuit 88 and then are stored in a predetermined area of the RAM 58.

In the blur mode, the information designating the blurred area is input from the operation panel 13. The reading area of the document conveyed by the ADF 28 is partitioned into the intra-dim area and the extra-dim area on the basis of the information. In the blur mode, the reading position of the line sensor 40 is decided by the partitioned areas. In this embodiment, the reading position of the line sensor 40 for reading the extra-dim area is decided as the second position 32 and the reading position of the line sensor 40 for reading the intra-dim area is decided as the third position 33. Accordingly, the reading position of the line sensor 40 is changed in the course of reading the intra-dim area of the document and reading the extra-dim area. Therefore, the resolution of the line sensor 40 is changed in the intra-dim area and the extra-dim area to read the document. As a result, in the obtained document image, the occurrence of the moire is suppressed as a whole and an image in a partial area is blurred.

As described above, the scanner 10 is set to one of the normal mode, the moire reducing mode, and the blur mode. In the normal mode, the line sensor 40 is located by the controller 55 at the position where the first relative distance is substantially equal to the focal distance of the line sensor 40. Since the document is read in a state where the line sensor 40 is focused, a clear document image is obtained. In the moire reducing mode or the blur mode, the line sensor 40 is located by the controller 55 at a position where the first relative distance is different from the focal distance of the line sensor 40. Since the document is read in a state where the resolution of the line sensor 40 is deteriorated, a document image in which the occurrence of the moire is suppressed or a document image in which a partial image is blurred is obtained. The switching of the reading mode is performed on the basis of the operation input from the operation panel 13. That is, the resolution of the line sensor 40 is easily changed in accordance with a user's selection.

By setting one of the three reading modes, the controller 55 controls the CR motor 65 to change the first relative distance between the document reading surface 25 of the first glass 18 and the line sensor 40. That is, the first relative distance is changed by the use of the driving source of the line sensor 40. Accordingly, without adding a driving mechanism for changing the first relative distance between the line sensor 40 reading the conveyed document and the document reading surface 25, it is possible to read an image with high image quality in which the occurrence of the moire is suppressed.

Although it has been described in this embodiment that the extra-dim area of the document is read by the line sensor 40 located at the reading position corresponding to the second position 32, the extra-dim area of the document may be read by the line sensor 40 located at the reading position corresponding to the first position 31. That is, the image of the extra-dim area of the document may be read in the same way as the normal mode. In this case, the first white reference data 90 instead of the second white reference data 91 is used in the shading correction of the document image. The first coefficient 75 instead of the second coefficient 76 is used in the emphasis process on the document image.

The second glass 20 according to this embodiment may be configured to be vertically movable in the height direction of the scanner 10.

Figure 40:
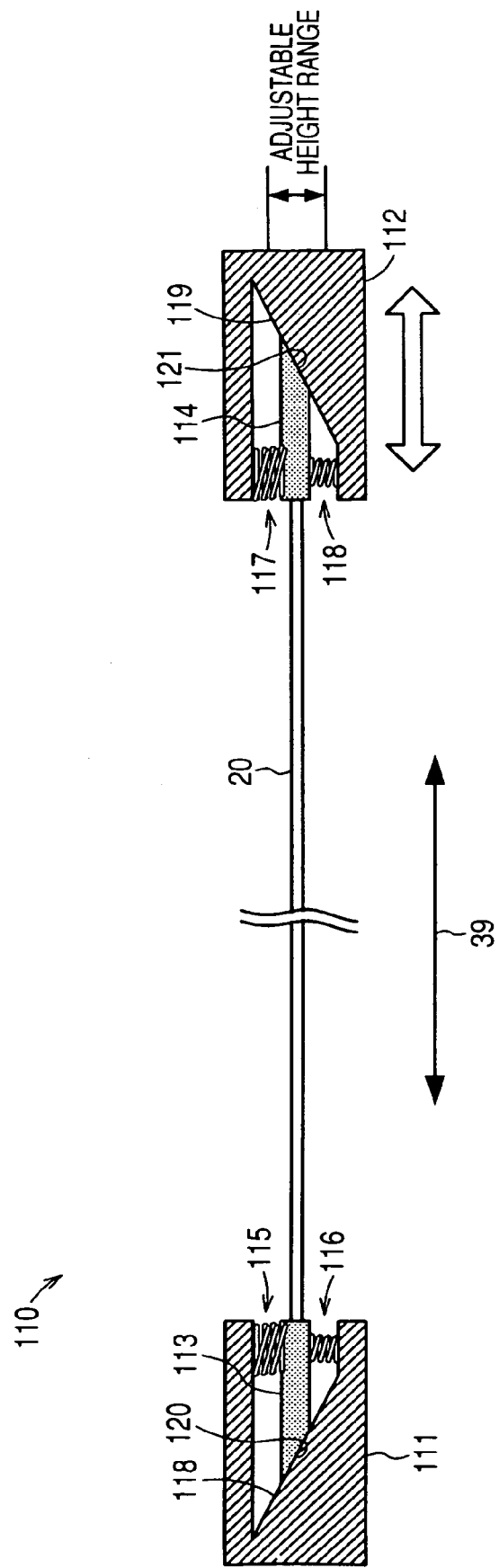
FIG. 40 is a diagram schematically illustrating a lifting mechanism of a second glass.

FIG. 40 is a diagram schematically illustrating a lifting mechanism 110 of the second glass 20.

As shown in FIG. 40, the lifting mechanism 110 includes a fixing member 111, a sliding member 112, supporting members 113 and 114, and coil springs 115, 116, 117, and 118. The supporting members 113 and 114 are fixed to both ends of the second glass 20 in the depth direction (direction indicated by the arrow 39) of the scanner 10. The fixing member 111 supports the supporting member 113 by the use of the coil springs 115 and 116. The fixing member 111 is fixed to the chassis 15. The sliding member 112 supports the supporting member 114 by the use of the coil springs 117 and 118. The sliding member 112 is disposed to be slidable relative to the chassis 15 in the depth direction of the scanner 10. A driving force is delivered to the sliding member 112 from a motor not shown. The sliding member 112 slides with the driving force. The fixing member 111 and the sliding member 112 are provided with tilted surfaces 118 and 119 going down to the second glass 20. A contact surface 120 parallel to the tilted surface 118 is formed in the supporting member 113. A contact surface 121 parallel to the tilted surface 119 is formed in the supporting member 114.

The sliding member 112 slides in a direction in which it gets close to the fixing member 111 (to the left side in FIG. 19) with the driving force from the motor. The supporting member 113 is pushed up on the tilted surface 118 and the supporting member 114 is pushed up on the tilted surface 119, thereby raising the second glass 20. The coil springs 115 and 117 are contracted with the raising of the second glass 20 to accumulate the spring force for pushing down the second glass 20. The coil springs 116 and 118 are expanded with the raising of the second glass 20 to accumulate the spring force for pulling down the second glass 20. The sliding member 112 slides in the direction (to the right side in FIG. 19) in which it gets apart from the fixing member 111 with the inverse rotation of the motor. The supporting members 113 and 114 go down along the tilted surfaces 118 and 119 with the spring force accumulated in the coil springs 115 to 118, thereby lowering the second glass 20.

As described above, the document reading surface 25 of the first glass 18 is tilted about the motion plane of the line sensor 40. Accordingly, the height of the reading surface 25 relative to the line sensor 40 is changed with the movement of the line sensor 40. By vertically moving the second glass 20 to allow the top surface of the second glass 20 and the reading surface 25 to be equal to each other in height, it is possible to change the reading mode in the FBS, thereby reading the document placed on the second glass 20. That is, in the FBS, it is also possible to read a document in the normal mode, the moire reducing mode, and the blur mode.

Second Embodiment

The scanner according to the second embodiment of the invention will be described with reference to the drawings. The physical configuration of the scanner of the second embodiment is similar to the scanner of the first embodiment shown in FIGS. 1 to 5, and the overlapped description will be omitted.

Figure 19A:
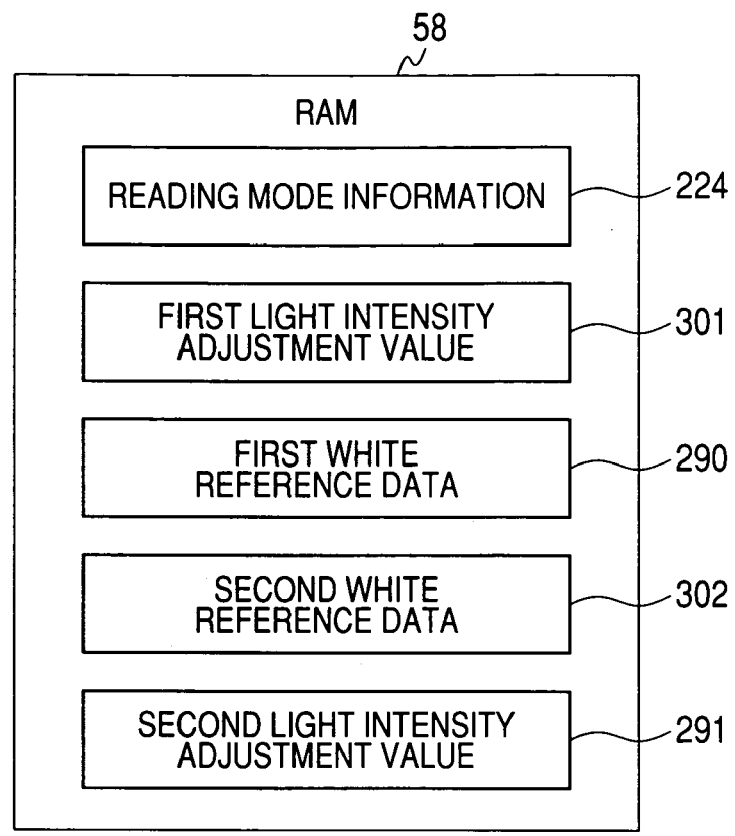
FIGS. 19A and 19B are diagrams illustrating data stored in the RAM and EEPROM, respectively, in a scanner according to a second embodiment.
Figure 19B:
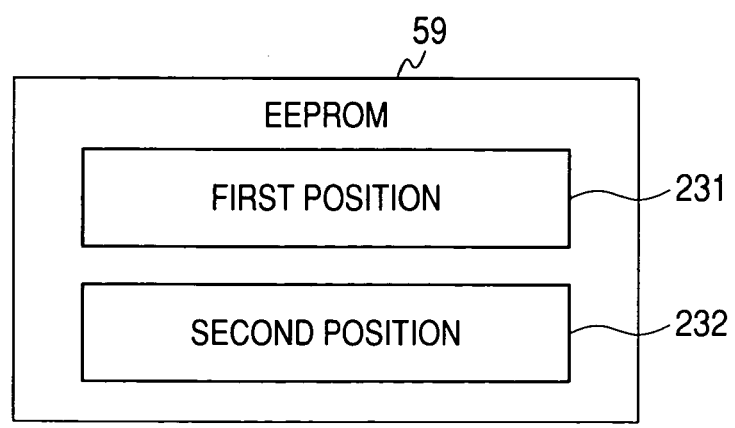

FIGS. 19A and 19B are block diagrams illustrating data stored in the RAM 58 and EEPROM 59, respectively.

As shown in FIG. 19A, as compared with the RAM 58 of the first embodiment, instead of various kinds of data (reading mode information 24, first to third light intensity adjustment values 101 to 103, and first to third white reference data 90 to 92), the RAM 58 of this embodiment stores reading mode information 224, a first light intensity adjustment value 301, a second light intensity adjustment value 302, first white reference data 290, and second white reference data 291. These data will be described in detail later.

The reading mode information 224 is information indicating a document reading mode set by the controller 55 on the basis of the operation input from the operation panel 13 or instruction from the terminal device 140. The reading of a document conveyed by the ADF 28 is performed on the basis of the reading mode information 224. In this embodiment, the controller 55 sets one of a normal mode and a blur mode. The normal mode is a reading mode in which a document is read through the first glass 18 by the line sensor 40 in a state where the controller 55 makes the first relative distance be substantially equal to the focal distance of the line sensor 40. In other words, the normal mode is a reading mode in which a document is read in a state where the line sensor 40 is focused on the document reading surface 25 of the first glass 18. The blur mode is a reading mode in which: at least an area (a first area to be described later) of a document is read in a state where the line sensor 40 is focused on the reading surface 25; and the other area (a second area to be described later) of the document is read in a state where the focus of the line sensor 40 is greatly out of the reading surface 25.

As shown in FIG. 19B, EEPROM 59 stores various settings or flags which should be kept even after it is turned off. In this embodiment, the EEPROM 59 stores a first position 231 and a second position 232. The information is information indicating a reading position in the sub-scanning direction at which the line sensor 40 is positioned in association with the reading mode information 224 set in the RAM 58. The first position 231 is a reading position at which the line sensor 40 is focused on the reading surface 25. The second position 232 is a reading position at which the focus of the line sensor 40 is greatly out of the reading surface 25.

FIGS. 21A and 21B are cross-sectional views schematically illustrating the reading positions of the line sensor 40, where FIG. 21A shows a reading position corresponding to the first position 231, and FIG. 6B shows a reading position corresponding to the second position 232.

Figure 20A:
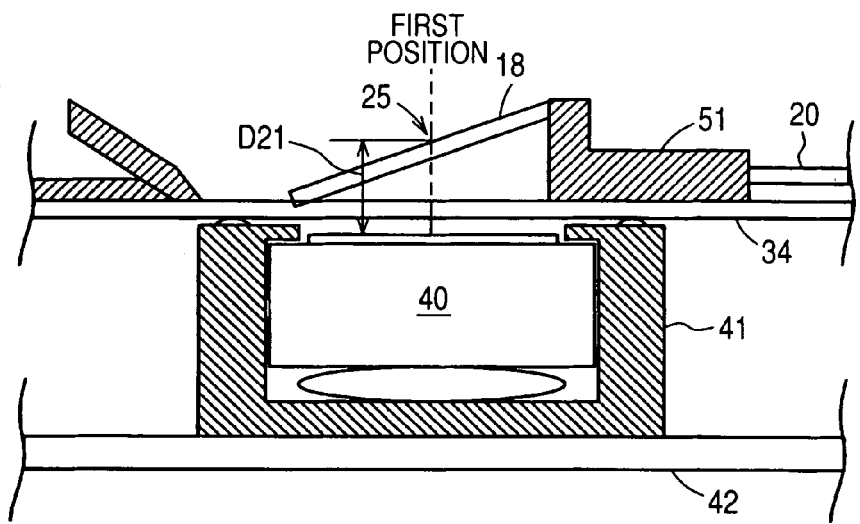
FIGS. 20A and 20B are cross-sectional views schematically illustrating reading positions of a line sensor of the second embodiment, where

The reading mode information 224 of the RAM 58 is set to the normal mode and a document conveyed by the ADF 28 is read. In the normal mode, an image of the conveyed document is read from the reading surface 25 in a state where the line sensor 40 is located at the reading position (see FIG. 20A) corresponding to the first position 231. Since the first position 231 is a position where the line sensor 40 is focused on the reading surface 25, a clear document image with a high resolution is obtained. That is, the normal mode is a reading mode suitable for honestly reproducing a document.

Figure 20B:
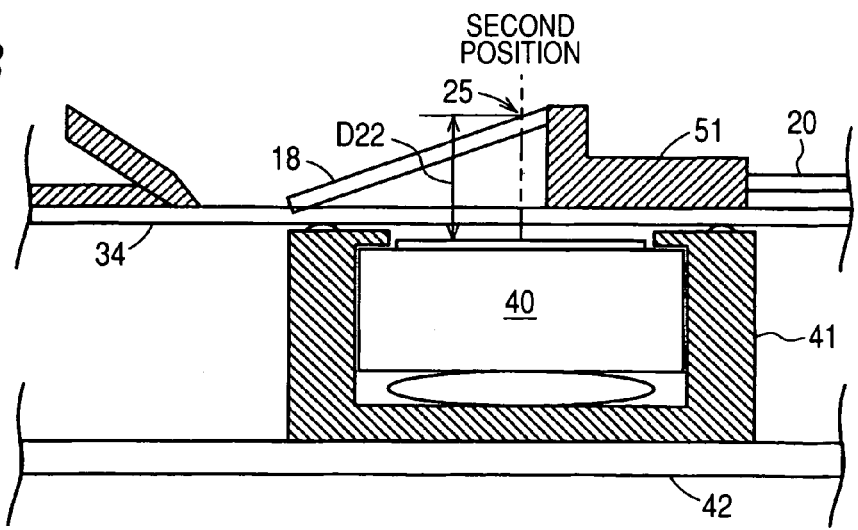

The reading mode information 224 of the RAM 58 is set to the blur mode and a document conveyed by the ADF 28 is read. In the blur mode, an image of the first area in the conveyed document is read in a state where the line sensor 40 is located at the reading position (see FIG. 20A) corresponding to the first position 231. An image of the second area in the document is read in a state where the line sensor 40 is located at the reading position (see FIG. 20B) corresponding to the second position 232. The method of deciding the first position 231 and the second position 232 and the operations of reading a document in the reading modes will be described later.

The controller 55 is operable as, for example, a partitioning unit, a control unit, a first reception unit, a selecting unit, a second reception unit, a first receiving unit, a third reception unit, a first transmitting unit, a second receiving unit, a fourth reception unit, a fifth reception unit, a detection unit, a second transmitting unit, a third receiving unit, a sixth reception unit, a second control unit, a calculation unit, and a decision unit. In addition, the controller 55 obtains the light intensity adjustment values 301 and 302 or the white reference data 290 and 292, in addition to the document reading operation, by controlling the image reading unit 14 on the basis of the control programs stored in the ROM 57. The reference member 37 shown in FIG. 2 is used for obtain the first light intensity adjustment value 301, the second light intensity adjustment value 302, the first white reference data 290, and the second white reference data 291.

The image processing circuit 79 processes the image signal output from the AFE circuit 78. The image processing circuit 79 performs a shading correction process, a sharpening (emphasis) process, a color spatial conversion process, and a binarization process on the image signal output from the AFE circuit 78. That is, the image processing circuit 79 corrects the shading of the document image obtained from the main scanning (an example of a first scanning process) of the document conveyed by the ADF 28. By allowing the image processing circuit 79 to perform the shading correction process, the differences between the light-receiving elements of the line sensor 40 and the non-uniformity of the light source are corrected. The shading correction process is performed on the basis of any one of the first white reference data 290 and the second white reference data 291. The image signal of the document read in the state where the line sensor 40 is located at the reading position corresponding to the first position 231 (see FIG. 20A) is corrected in shading on the basis of the first white reference data 290. The image signal of the document read in the state where the line sensor 40 is located at the reading position corresponding to the second position 232 (see FIG. 20B) is corrected in shading on the basis of the second white reference data 291. Since other image processes performed by the image processing circuit 79 are not directly associated with this embodiment, detailed description thereof is omitted.

The process of setting the reading position (the first position 231 and the second position 232) of the line sensor 40 is performed at a predetermined time such as when the scanner 10 is turned on or when a user performs a predetermined input operation. The process of setting the reading position may be performed when a predetermined time passes after the previous process of setting the reading position or when the device is turned on in a predetermined time.

Figure 21:
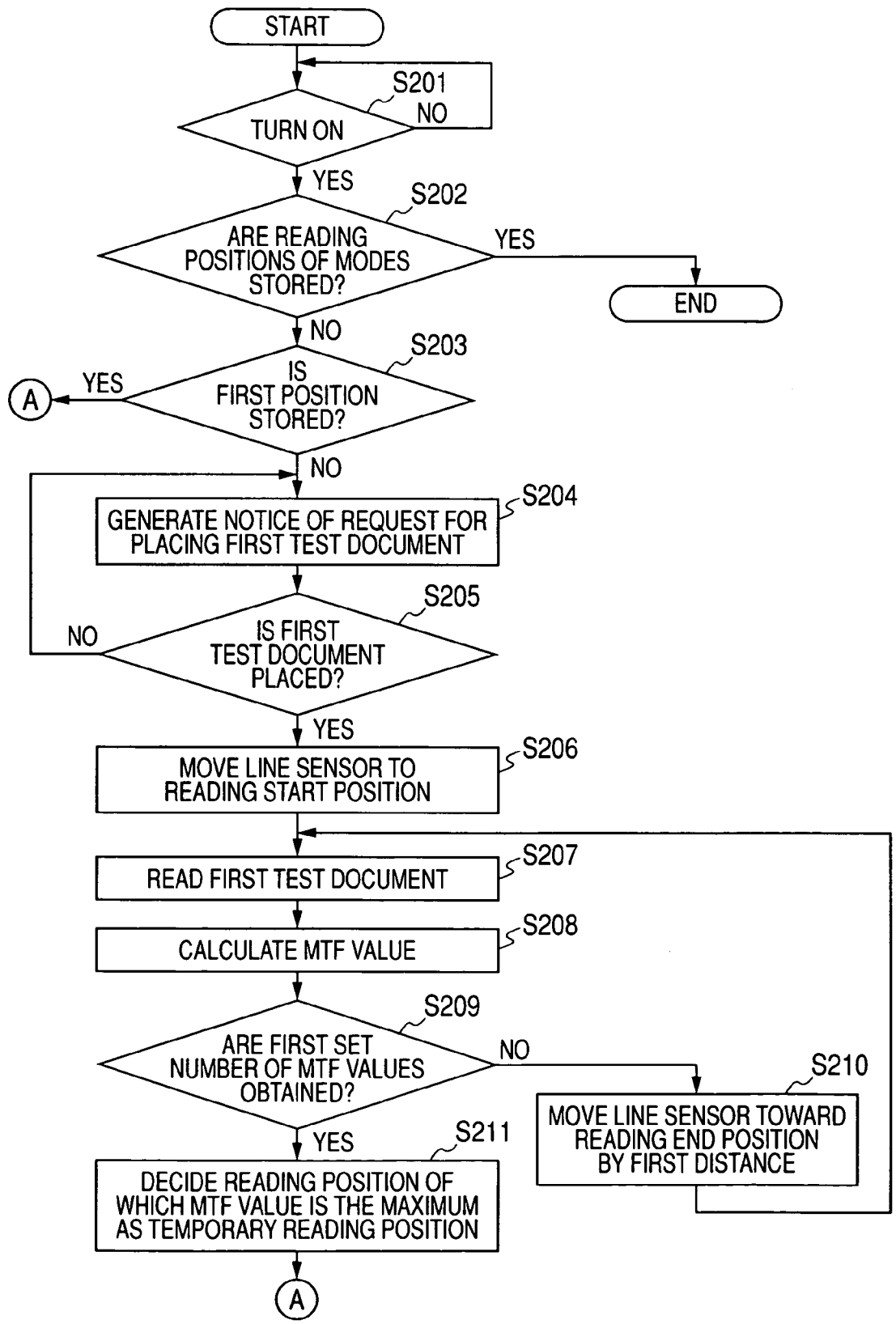
FIG. 21 is a flowchart illustrating a process flow of a reading position setting process performed at the time of turning on the scanner of the second embodiment.
Figure 22:
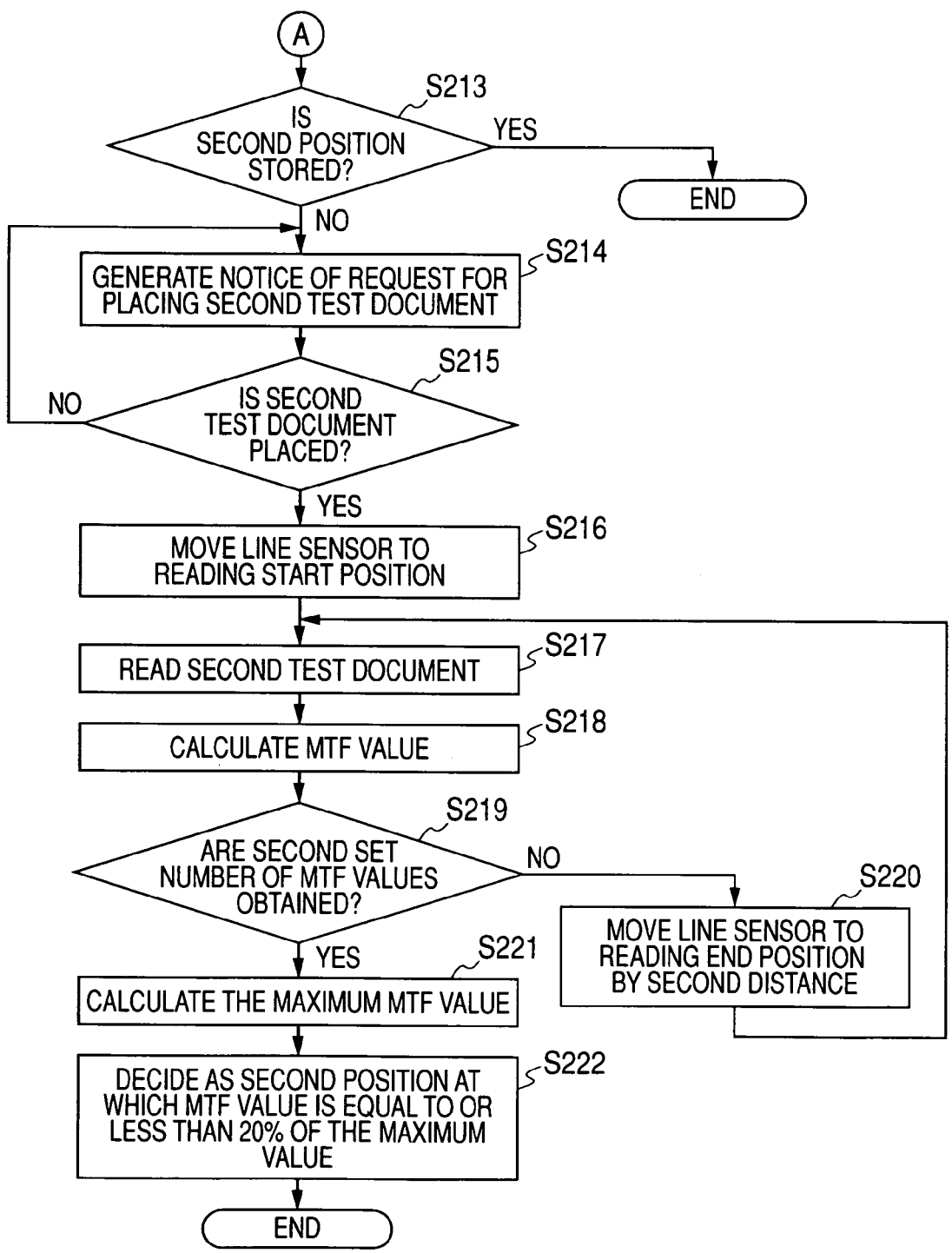
FIG. 22 is a flowchart illustrating a process flow of a reading position setting process performed at the time of turning on the scanner of the second embodiment.

FIGS. 21 and 22 are flowcharts illustrating a process flow of the process of setting a reading position at the time of turning on the scanner 10 according to the second embodiment. The processes of the scanner 10 described with reference to the flowcharts are performed in accordance with commands issued from the controller 55 on the basis of the control programs stored in the ROM 57.

The controller 55 determines whether or not the scanner 10 is turned on (S201), on the basis whether a user has performed a predetermined operation input through the operation panel 13. When the controller 55 determines that the scanner is not turned on (NO in S201), the controller is in a waiting state. When the controller 55 determines that the scanner 10 is turned on (YES in S201), the controller 55 determines whether the first reading position 231 and the second reading position 232 are stored (S202). When the controller 55 determines that the first reading position 231 and the second reading position 232 are stored (YES in S202), the process is ended.

When the controller 55 determines that any one of the first position 231 and the second position 232 is not stored (NO in S202), the controller 55 determines whether or not the first position 231 is stored (S203). When the controller 55 determines that the first position 231 is not stored (NO in S203), the controller generates a notice of a request for placing the first test document 298 (S204). For example, the controller 55 displays a message such as "Please set a first test document on a document tray" on the operation panel 13.

Figure 23:
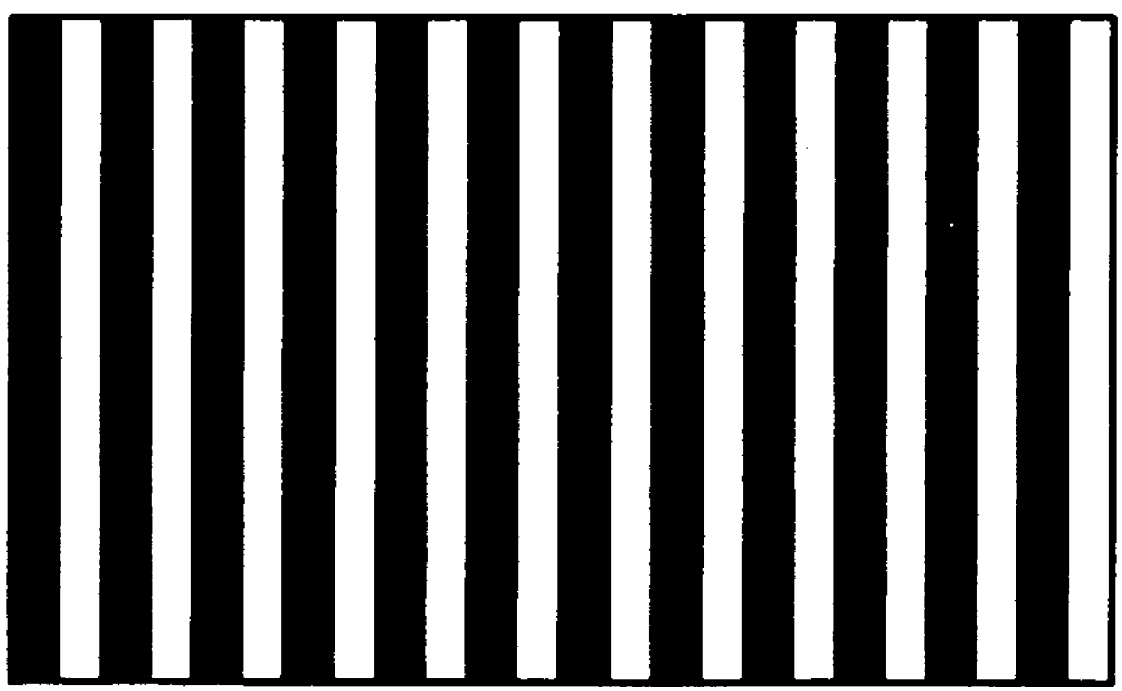
FIG. 23 is a diagram schematically illustrating an example of a first test document of the second embodiment.
Figure 24A:
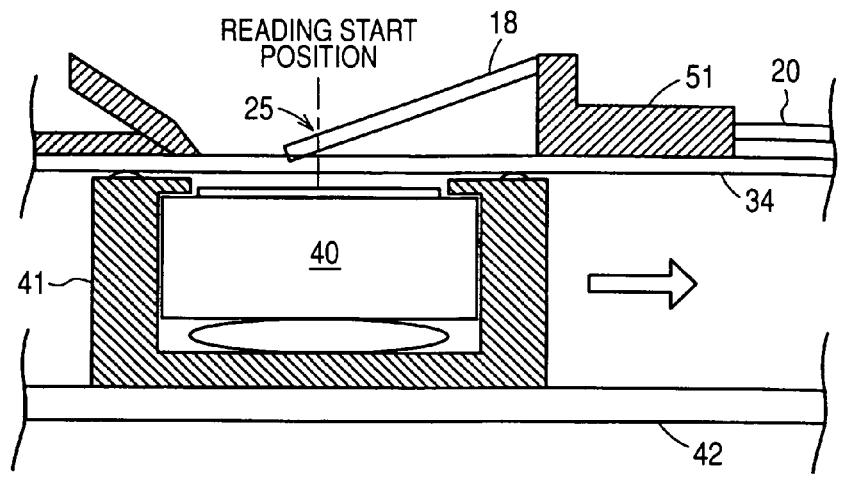
FIG. 24 is a cross-sectional view schematically illustrating a state where the reading position of the line sensor is changed.
Figure 24B:
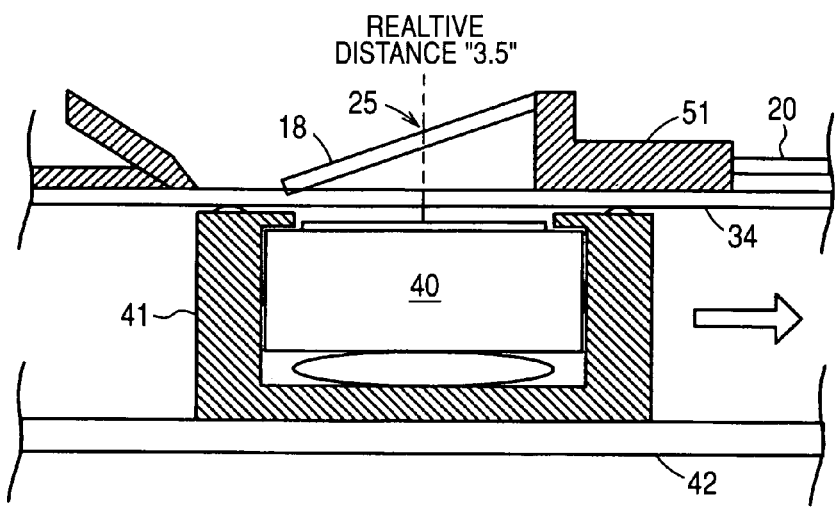
Figure 24C:
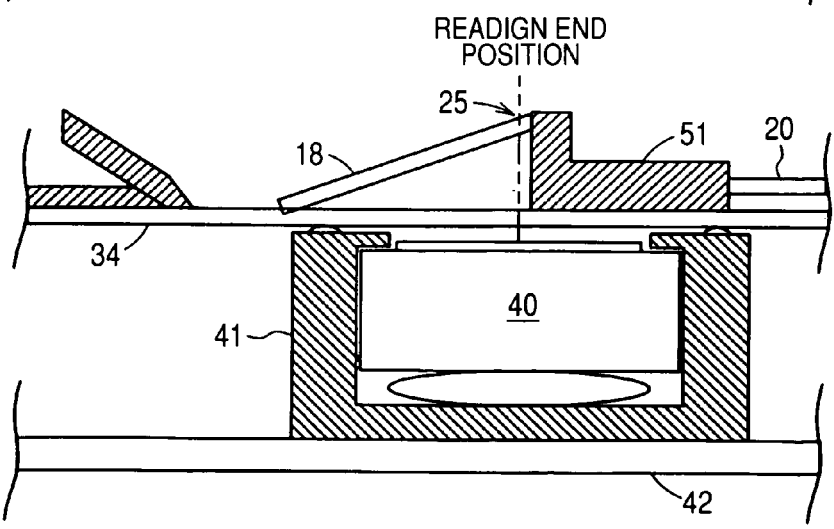

FIG. 23 is a diagram schematically illustrating an example of a first test document 298. FIGS. 24A to 24C are cross-sectional views schematically illustrating a state where the reading position of the line sensor 40 is changed.

As shown in FIG. 23, the first test document 98 has white and black stripes (an example of a predetermined pattern) which are recorded at a pitch of 150 lpi (line per inch). The first test document 98 is placed on the document tray 22 so that the arrangement direction of the pattern (the lateral direction in FIG. 23) is equal to the depth direction (direction indicated by the arrow 39) of the scanner 10. The pitch of the white and black pattern is not limited to 150 lpi, but may be properly changed depending on the performance of the line sensor 40.

The controller 55 determines whether or not the first test document 98 is placed on the document tray 22 (S205), on the basis of the sensor signal output from the document sensor 36 (see FIG. 4). When the controller 55 determines that the first test document 98 is not placed on the document tray 22 (NO in S205), the process of step S204 is performed successively. When the controller 55 determines that the first test document 98 is placed on the document tray 22 (YES in S205), the controller controls the CR motor 65 (see FIG. 4) to allow the line sensor 40 to move to a reading start position (S206). The reading start position is the left end of a readable range (see FIG. 2) of the line sensor 40 on the first glass 18 (see FIG. 24A). The controller controls the motor 72 (see FIG. 4) to convey the first test document 98 along the conveying passage 12 by a predetermined distance. Accordingly, the white and black pattern recorded on the first test document 98 is located above the first glass 18. Then, the controller 55 controls the line sensor 40 to read the first test document 98 through the first glass 18 (S207). In the process of step S207, an image of the first test document 98 is read by one line or several lines. The controller 55 calculates the MTF value on the basis of the image signal of the first test document 98 obtained in the process of step S207 and Formula 3 described in the first embodiment (S208).

The controller 55 determines whether or not the first set number of MTF values (11 values in this embodiment) have been obtained (S209), subsequently to step S208. When the controller 55 determines that 11 MTF values have not been obtained (NO in S209), the controller controls the CR motor 65 to allow the line sensor 40 to move to a reading end position (see FIG. 24C) by a first distance (S210). By performing the process of step S210, the reading position of the line sensor 40 is changed. In other words, the first relative distance between the line sensor 40 and the first test document 298 is changed. The downstream portion of the reading surface 25 of the first glass 18 in the document conveying direction is more apart from the motion plane of the line sensor 40 than the upstream portion. Accordingly, the first relative distance increases with the movement of the line sensor 40. The reading end position is the right end of the readable range (see FIG. 2) of the line sensor 40 on the first glass 18 (see FIG. 24C).

After the reading position of the line sensor 40 is changed in the process of step S210, the processes of steps S207 and S208 are performed in the state where the line sensor 40 is located at the reading position. The controller 55 controls the line sensor 40 to perform the operation of reading the first test document 98 through the first glass 18 at the positions (11 positions in this embodiment) different in the first relative distance from each other, by sequentially repeating the processes of steps S207, S208, and S210. The controller 55 calculates the MTF values at the 11 positions on the basis of the image signal of the first test document 98 obtained in this operation.

Figure 25:
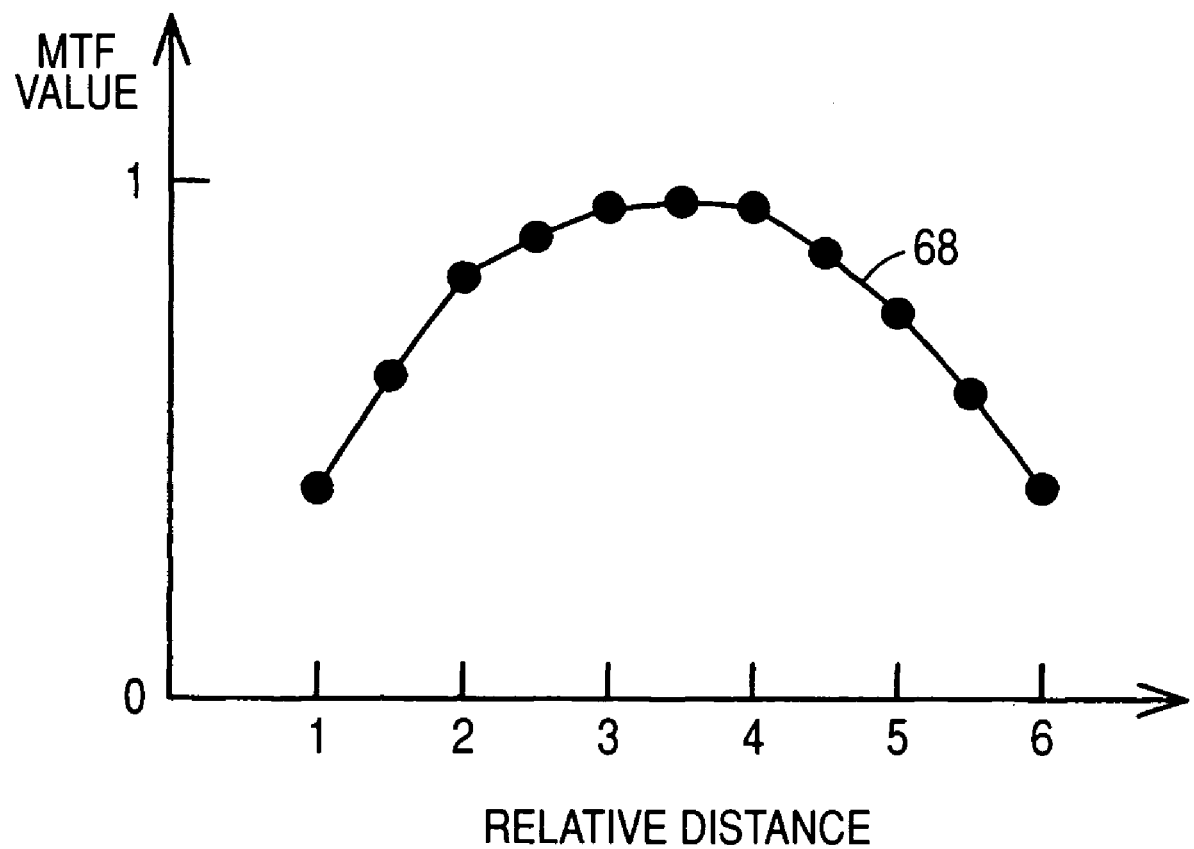
FIG. 25 is a diagram illustrating an MTF characteristic obtained by reading the first test document of the second embodiment.

FIG. 25 is a diagram illustrating an MTF characteristic obtained by reading the first test document 298.

In FIG. 25, the horizontal axis represents the relative distance between the line sensor 40 and the reading surface 25 for the first test document 98 on the first glass 18, which is changed by driving the CR motor 65 to move the line sensor 40, that is, the first relative distance. The vertical axis represents the MTF value. In FIG. 25, the MTF values corresponding to the 11 reading positions different in the first relative distance from each other are shown. "1" of the horizontal axis corresponds to the first relative distance between the line sensor 40 and the first test document 98 in a state where the line sensor 40 is located at the reading start position (see FIG. 24A). "11" of the horizontal axis corresponds to the first relative distance between the line sensor 40 and the first test document 98 in a state where the line sensor 40 is located at the reading end position (see FIG. 24C).

As shown in FIG. 21, when the controller 55 determines that the 11 MTF values have been obtained (YES in S209), the controller decides as the first position 231 (see FIG. 19B) the reading position at which the MTF value is the maximum (S211). Specifically, the controller 55 obtains the MTF curve 68 (see FIG. 25) from the 11 MTF values calculated by repeating the processes of steps S207 to S210. The method of obtaining the MTF curve 68 from the MTF values are known well and thus description thereof is omitted. The controller 55 decides as the first position 231 the position of the line sensor 40 at which the MTF value is the maximum in the MTF curve 68. Here, The MTF value corresponding to the first relative distance indicated by "3.5" in the horizontal axis in the MTF characteristic shown in FIG. 25. Accordingly, the controller 55 decides as the first position 231 the reading position (see FIGS. 20A and 24B) of the line sensor 40 corresponding to the first relative distance D21 (see FIG. 20A) indicated by "3.5" in the horizontal axis. The first position 231 is information indicating the reading position for the normal mode. The first position 231 is also information indicating the reading position at which the line sensor 40 is located by the CR motor 65 at the time of reading the first area of the conveyed document in the main scanning process of the blur mode. The first position 231 is stored in the EEPROM 59. In this way, the controller 55 decides the position having the maximum MTF value as the reading position of the line sensor 40 for reading the first area.

In this embodiment, in order to calculate the 11 MTF values, the first distance is set so that the reading position of the line sensor 40 is changed to 11 positions between the reading start position and the reading end position. The first distance is set on the basis of the distance from the reading start position to the reading end position and the first set number. The number of MTF values calculated is not limited to 11, but the first distance may be changed, for example, to calculate 5 MTF values. In addition, the MTF values may be calculated by setting the first position decided in the process of step S211 as the temporary reading position and moving the line sensor 40 to the front and back of the temporary reading position by a smaller distance than the first distance. Accordingly, it is possible to obtain the first position 231 with higher accuracy. The first position 231 may be decided without obtaining the MTF curve 68. That is, the controller 55 determines the maximum value from the 11 MTF values and may decide as the first position 231 the reading position of the line sensor 40 corresponding to the MTF value.

When the controller 55 determines that the first position 231 is stored in the EEPROM 59 (YES in S203) or performs the process of step S211, the controller determines whether or not the second position 232 is stored in the EEPROM 59 (S213). When the controller 55 determines that the second position 232 is not stored in the EEPROM 59 (NO in S213), the controller generates a notice of a request for placing the second test document 99 (S214). For example, the controller 55 displays a message such as "Please the second test document on the document tray" on the operation panel 13.

Figure 26:
FIG. 26 is a diagram schematically illustrating an example of a second test document of the second embodiment.

FIG. 26 is a diagram schematically illustrating an example of the second test document 299.

As shown in FIG. 26, the second test document 299 has white and black stripes recorded thereon at 50 lpi. The second test document 299 is placed on the document tray 22 so that the arrangement direction (left-right direction in FIG. 26) of the pattern is substantially equal to the depth direction (direction indicated by the arrow 39) of the scanner 10. The pitch of the black and white stripe pattern is not limited to the 50 lpi, but may be properly changed depending on the performance of the line sensor 40.

The controller 55 determines whether or not the second test document 299 is placed on the document tray 22, on the basis of the sensor signal output from the document sensor 36 (see FIG. 4) (S215). When the controller 55 determines that the second test document 299 is not placed on the document tray 22 (NO in S215), the process of step S214 is performed continuously. When the controller 55 determines that the second test document 299 is placed on the document tray 22 (YES in S215), the controller moves the line sensor 40 to the reading start position (S216), similarly to the process of step S206. The controller 55 controls the motor 72 to convey the second test document 299 along the conveying passage 12 by a predetermined distance. Accordingly, the black and white pattern recorded on the second test document 299 is disposed above the first glass 18. The controller 55 controls the line sensor 40 to read the second test document 299 through the first glass 18 (S217). The controller 55 calculates the MTF values on the basis of the image signal of the second test document 299 obtained in the process of step S217 and Formula 3 (S218).

The controller 55 determines whether or not a second set number (11 in this embodiment) of MTF values have been obtained (S219). When the controller 55 determines that the 11 MTF values have not been obtained (NO in S219), the controller controls the CR motor 65 to move the line sensor 40 to the reading end position (see FIG. 24C) by a second distance (S220). Accordingly, the first relative distance between the line sensor 40 and the reading surface of the second test document 299 is changed. The second distance is a distance from the reading start position to the reading end position and is also a distance set on the basis of the second set number. Therefore, the second distance is changed, for example, with the change of the second set number.

After the reading position of the line sensor 40 is changed in the process of step S220, the processes of steps S217 and S218 are performed in a state where the line sensor 40 is located at the reading position. The controller 55 controls the line sensor 40 to perform the operation of reading the second test document 299 through the first glass 18 at the plural positions (11 positions in this case) different in the first relative distance from each other, by repeating the processes of steps S217, S218, and S220. The controller 55 calculates the MTF value at each of the 11 positions on the basis of the image signal of the second test document 299 obtained in this operation.

Figure 27:
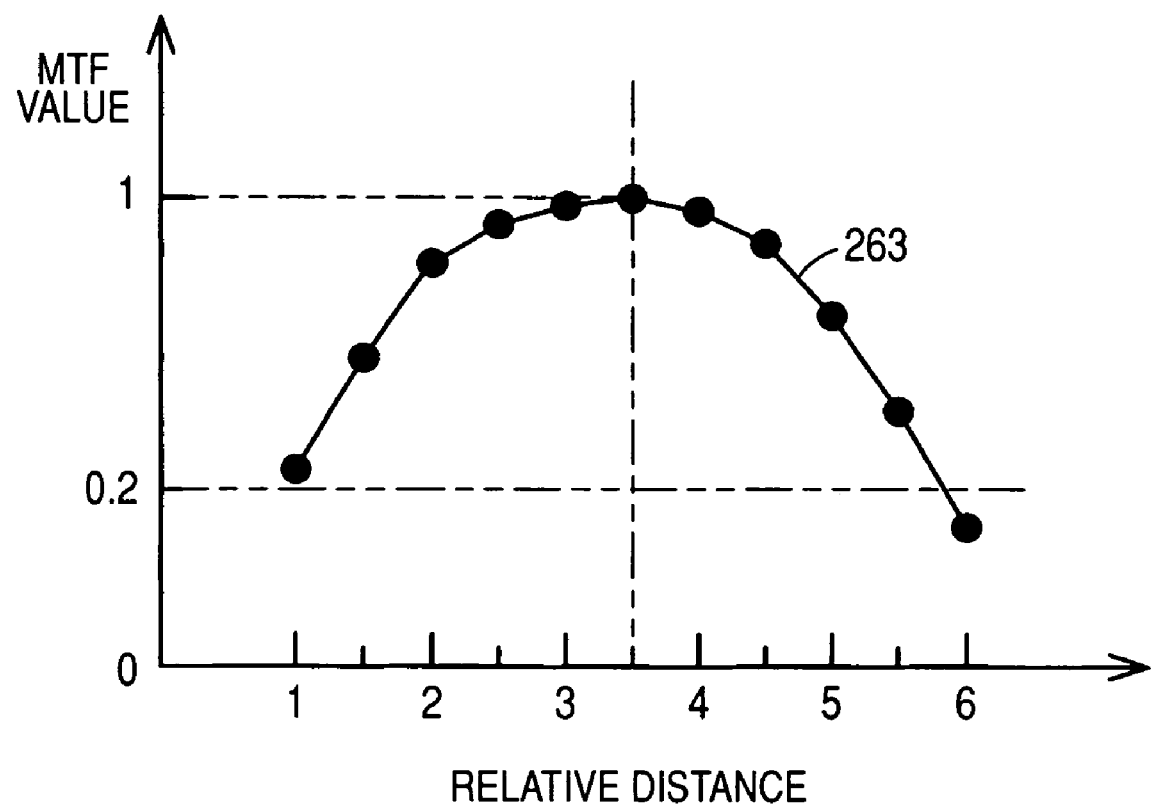
FIG. 27 is a diagram illustrating an MTF characteristic obtained by reading the second test document of the second embodiment.

FIG. 27 is a diagram illustrating the MTF characteristic obtained by reading the second test document 299.

In FIG. 27, the horizontal axis represents the relative distance between the line sensor 40 and the reading surface 25 for the second test document 299 on the first glass 18, which is changed by driving the CR motor 65 to move the line sensor 40, that is, the first relative distance. The vertical axis represents the MTF value. In FIG. 27, the MTF values corresponding to the 11 reading positions different in the first relative distance from each other are shown.

When the controller 55 determines that the 11 MTF values have been obtained (YES in S219), the controller obtains the maximum value of the MTF values (S221). Specifically, the controller 55 obtains an MTF curve 63 (see FIG. 27) from the 11 MTF values calculated by repeating the processes of steps S217 to S220. Then, the controller 55 determines the peak of the MTF curve 63 to obtain the maximum value of the MTF values. Here, as shown in FIG. 27, The MTF value corresponding to the first relative distance of "3.5" in the horizontal axis is the maximum value.

The controller 55 decides as the second position 232 a position at which the MTF value is equal to or less than 20% (corresponding to an example of the predetermined ratio) of the maximum value obtained in the process of step S221 (S222). Specifically, the controller 55 calculates the MTF value which is 20% of the maximum value obtained in the process of step S221. For example, when the maximum value is 1, the MTF value is 0.2. The controller 55 decides the position of the line sensor 40 corresponding to the calculated MTF value (0.2 in this case) as the second position 232. The second position 232 is the information indicating the reading position at which the line sensor 40 is located by the CR motor 65 at the time of reading the second area of the conveyed document in the main scanning process of the blurred mode. The second position 232 is stored in the EEPROM 59. In this way, the controller 55 decides the position at which the MTF value is equal to or less than 20% of the maximum value as the reading position of the line sensor 40 for reading the second area.

The first and second positions 231 and 232 may be decided using a sheet of test document having two patterns recorded thereon for deciding the first and positions 231 and 232, instead of two sheets of the first test document 298 and the second test document 299. In this case, a test document is used in which two patterns are arranged in the depth direction (direction indicated by the arrow 39) of the scanner 10. The controller 55 individually reads the images of the patterns while changing the reading range in the main scanning direction of the test document. Then, the controller 55 determines the first and second positions 231 and 232 on the basis of the obtained images. In this case, a user's labor for placing the test documents on the document tray 22 is reduced. A test document in which two patterns are arranged in the document conveying direction may be used. In this case, by conveying the test document, the images of the patterns can be individually read by changing the pattern located on the first glass 18.

Although it has been described in this embodiment that two patterns are used to decide the first and second positions 231 and 232, the number of patterns used to decide the reading positions may be 1. For example, without using the second test document 299, the first and second positions 231 and 232 may be decided using only the first test document 298. In this case, the controller 55 decides as the first position 231 the reading position corresponding to the maximum MTF value obtained by reading the pattern of the first test document 298. Then, the controller 55 decides as the second position 232 the reading position corresponding to the MTF value which is 20% of the maximum value.

Figure 28:
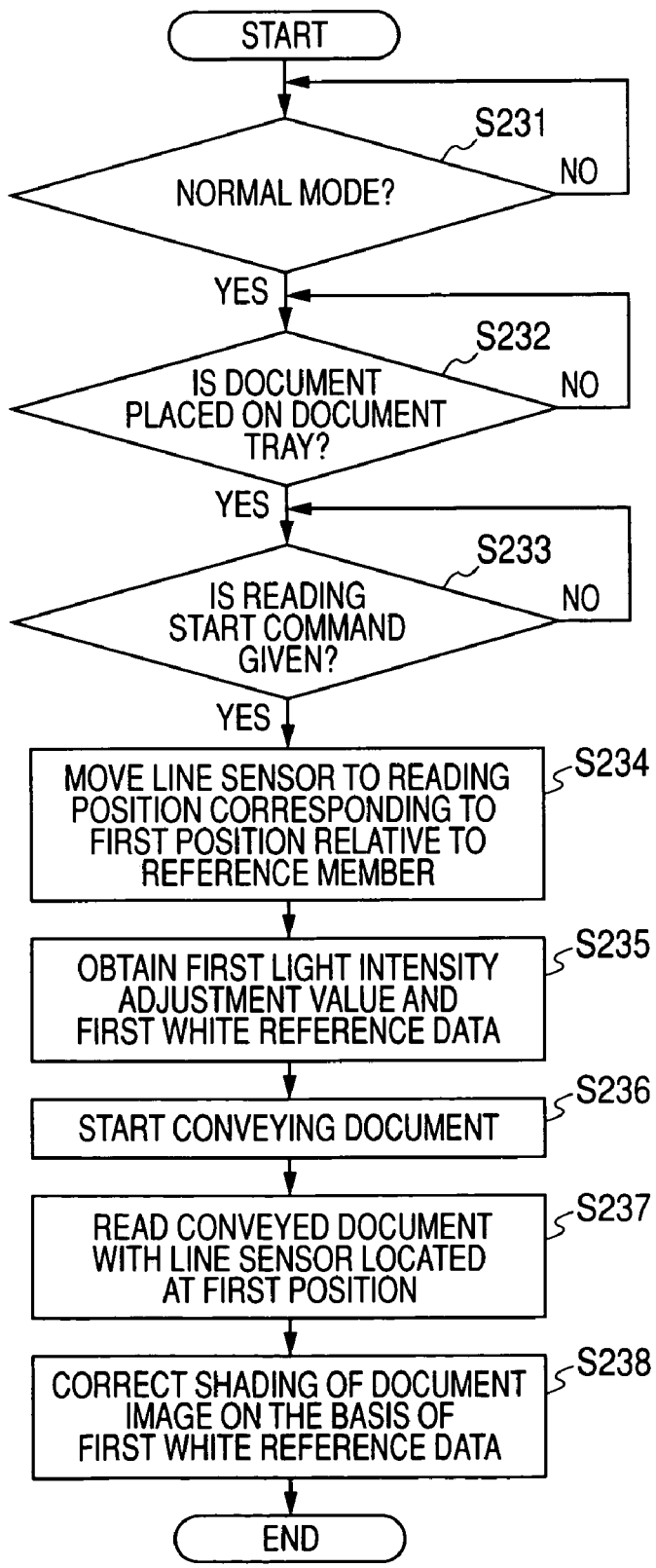
FIG. 28 is a flowchart illustrating a flow of processes performed by the scanner of the second embodiment when it is instructed to read a document in a state where a normal mode is set.

FIG. 28 is a flowchart illustrating a flow of processes performed by the scanner 10 when it is instructed to start reading a document in the normal mode.

The controller 55 determines whether or not the normal mode is set on the basis of the reading mode information 224 stored in the RAM 58 (S231). When the controller 55 determines that the normal mode is not set, that is, that the blur mode is set (NO in S231), the process of step S231 is performed again. When the controller 55 determines that the normal mode is set (YES in S231), the controller determines whether or not a document is placed on the document tray 22 (S232). The process of step S232 is performed on the basis of the sensor signal output from the document sensor 36. When the controller 55 determines that a document is not placed on the document tray 22 (NO in S232), the process of step S232 is performed again.

When the controller 55 determines that a document is placed on the document tray 22 (YES in S232), the controller determines whether or not a document reading start command is given (S233). Specifically, the controller 55 determines whether a predetermined operation input instructing a document reading start is performed through the operation panel 13 or a reading start command instructing the document reading start is received from the terminal device 140. When the controller 55 determines that the document reading start command is not given (NO in S233), the process of step S233 is performed again.

When the controller 55 determines that the reading start command is given (YES in S233), that is, when the predetermined operation input is performed through the operation panel 13 or the reading start command is received from the terminal device 140, the controller controls the CR motor 65 to move the line sensor 40 to the reading position corresponding to the first position 231 relative to the reference member 37 (see FIG. 2) (S234). The reading position is a position where the relative distance (second relative distance) between the line sensor 40 moved below the reference member 37 and the reading surface 27 of the reference member 37 is substantially equal to the relative distance (first relative distance) between the line sensor 40 located at the reading position corresponding to the first position 231 and the document reading surface 25 of the first glass 18. For example, by correlating and storing in advance the reading position of the line sensor 40 relative to the first glass 18 and the reading position of the line sensor 40 relative to the reference member 37 with each other, it is possible to allow the first relative distance and the second relative distance to be substantially equal to each other. That is, it is possible to allow the distances to the reference member 37 and the reading surface 25 to be equal to each other. Accordingly, it is possible to prevent a difference in intensity between the light applied to the reading surface 25 on the first glass 18 from the light source of the line sensor 40 and the light applied to the reference member 37 from the light source of the line sensor 40.

The controller 55 obtains the first light intensity adjustment value 301 and the first white reference data 290 (see FIG. 19A) (S235). The controller 55 applied light to the reading surface 27 on the reference member 37 with the small intensity at first from the light source of the line sensor 40. Then, the controller 55 gradually increases the intensity of the light source until the output from the light-receiving element of the line sensor 40 reaches a predetermined value, and obtains as the first light intensity adjustment value 301 the intensity when the received light intensity reaches the predetermined value. That is, the first light intensity adjustment value 301 is the light intensity of the light source when the light intensity received by the light-receiving element of the line sensor 40 reaches the predetermined value. Subsequently, the controller 55 applies light to the reading surface 27 of the reference member 37 from the light source of the line sensor 40 with the light intensity of the first light intensity adjustment value 301. Then, the controller 55 converts the reflected light from the reading surface 27 into the electrical signal by the use of the light-receiving element of the line sensor 40, thereby obtaining the first white reference data 290. The first light intensity adjustment value 301 and the first white reference data 290 obtained in the process of step S235 are stored in the RAM 58.

The controller 55 controls the rotation of the motor 72 to start conveying the document placed on the document tray 22. The controller 55 controls the line sensor 40 located at the reading position corresponding to the first position 231 to read the conveyed document (S237). Specifically, the controller 55 controls the CR motor 65 to move the line sensor 40 opposed to the reference member 37 in the process of step S234 to the reading position (see FIG. 20A) corresponding to the first position 231. The controller 55 controls the line sensor 40 to perform the operation of reading the document conveyed over the first glass 18 at the reading position corresponding to the first position 231. Accordingly, an image of a document is read in a state where the line sensor 40 is substantially focused on the document reading surface 25 of the first glass 18. For this reason, it is possible to obtain a clearer document image in comparison with a case where the document is read by the line sensor 40 located at a different position. The document image (image signal) read in this way is processed by the AFE circuit 78. The image processing circuit 79 corrects the shading of the document image processed by the AFE circuit 78 on the basis of the first white reference data 290 obtained in the process of step S235 (S238).

In the normal mode, the entire reading area of the document conveyed by the ADF 28 is read through the first glass 18 by the line sensor 40 located at the reading position corresponding to the first position 231. Since the document is read in a state where the line sensor 40 is focused on the reading surface 25 of the first glass 18, a clear document image is obtained.

Figure 29:
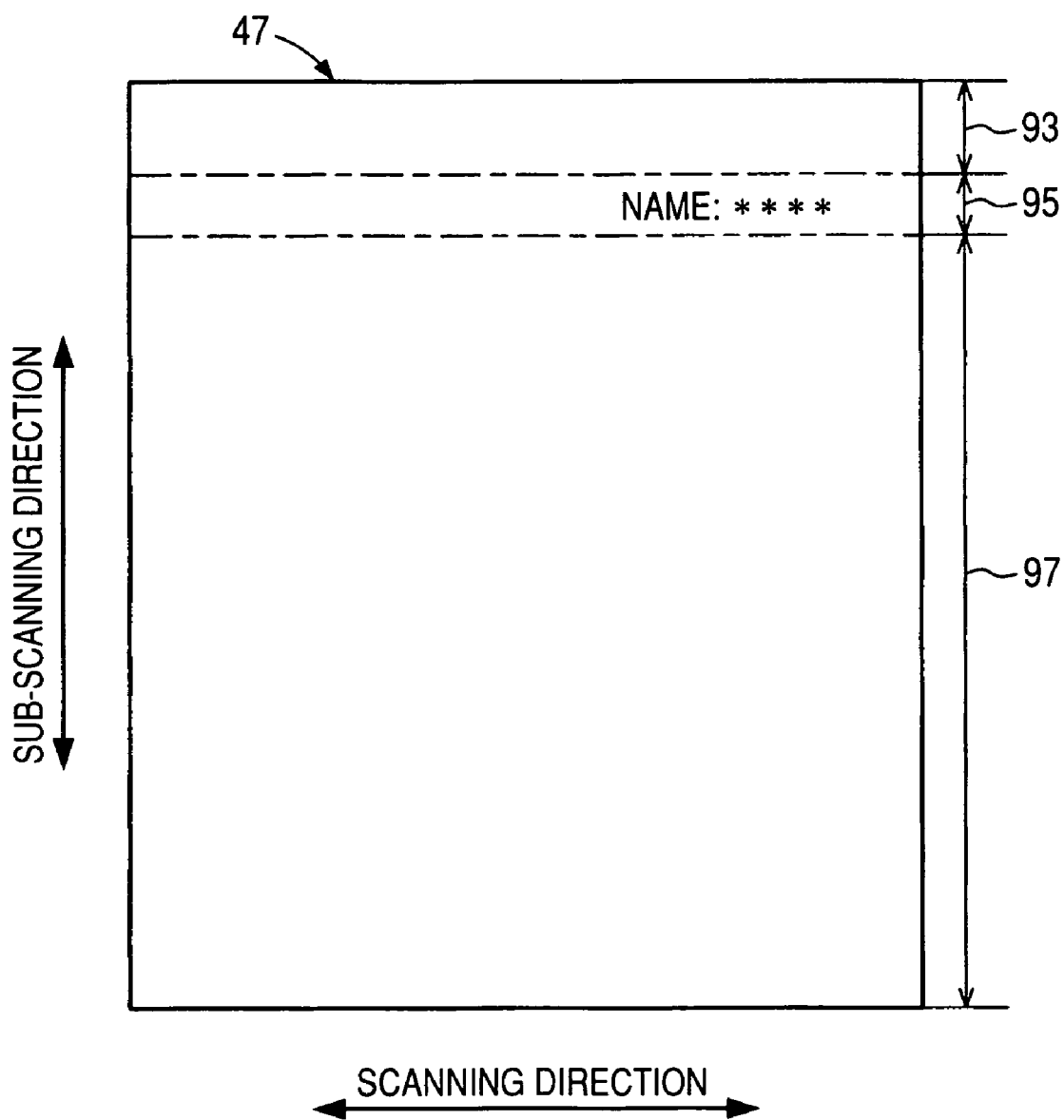
FIG. 29 is a diagram schematically illustrating a reading area of a document in the second embodiment.

FIG. 29 is a diagram schematically illustrating a document reading area 47.

In the blur mode, the controller 55 partitions the reading area of the document conveyed by the ADF 28 into first areas 93 and 97 and a second area 95. The partitioning of the reading area is performed based on a document image obtained by allowing the line sensor 40 opposed to the first glass 18 to pre-scan the conveyed document or based on a user's setting. The controller 55 changes the first relative distance every partitioned area by driving the CR motor 65 in the main scanning process performed on the conveyed document by the line sensor 40. The controller 55 controls the line sensor 40 to read the first areas 93 and 97 in a state where the first relative distance is made to be substantially equal to the focal distance of the line sensor 40. That is, the controller 55 controls the line sensor 40 to read the first areas 93 and 97 of the conveyed document in a state where the line sensor 40 is located to the reading position corresponding to the first position 231. The controller 55 controls the line sensor 40 to read the second area 95 in a state where the first relative distance is made to be different from the focal distance of the line sensor 40. That is, the controller 55 controls the line sensor 40 to read the second area 95 of the conveyed document in a state where the line sensor 40 is located at the reading position corresponding to the second position 232. By reading the document conveyed by the ADF 28 in the blur mode, a document image in which the first areas 93 and 97 are clear and the second area 95 is blurred is obtained. The blur mode is suitable for reading, for example, documents in which personal information or secret information is recorded.

In the example shown in FIG. 29, the reading area 47 of the document is partitioned into two kinds of areas of the first areas 93 and 97 and the second area 95, but the kinds of the reading area 47 may be partitioned into three or more areas. In this case, information on a new reading position may be set in addition to the first position 231 and the second position 232.

FIGS. 30 to 33 are flowcharts illustrating a flow of processes performed by the scanner 10 when a document reading start command is delivered from the operation panel 13 in the blur mode. FIG. 34 is a diagram schematically illustrating an example of a setting screen displayed on the operation panel 13.

Figure 30:
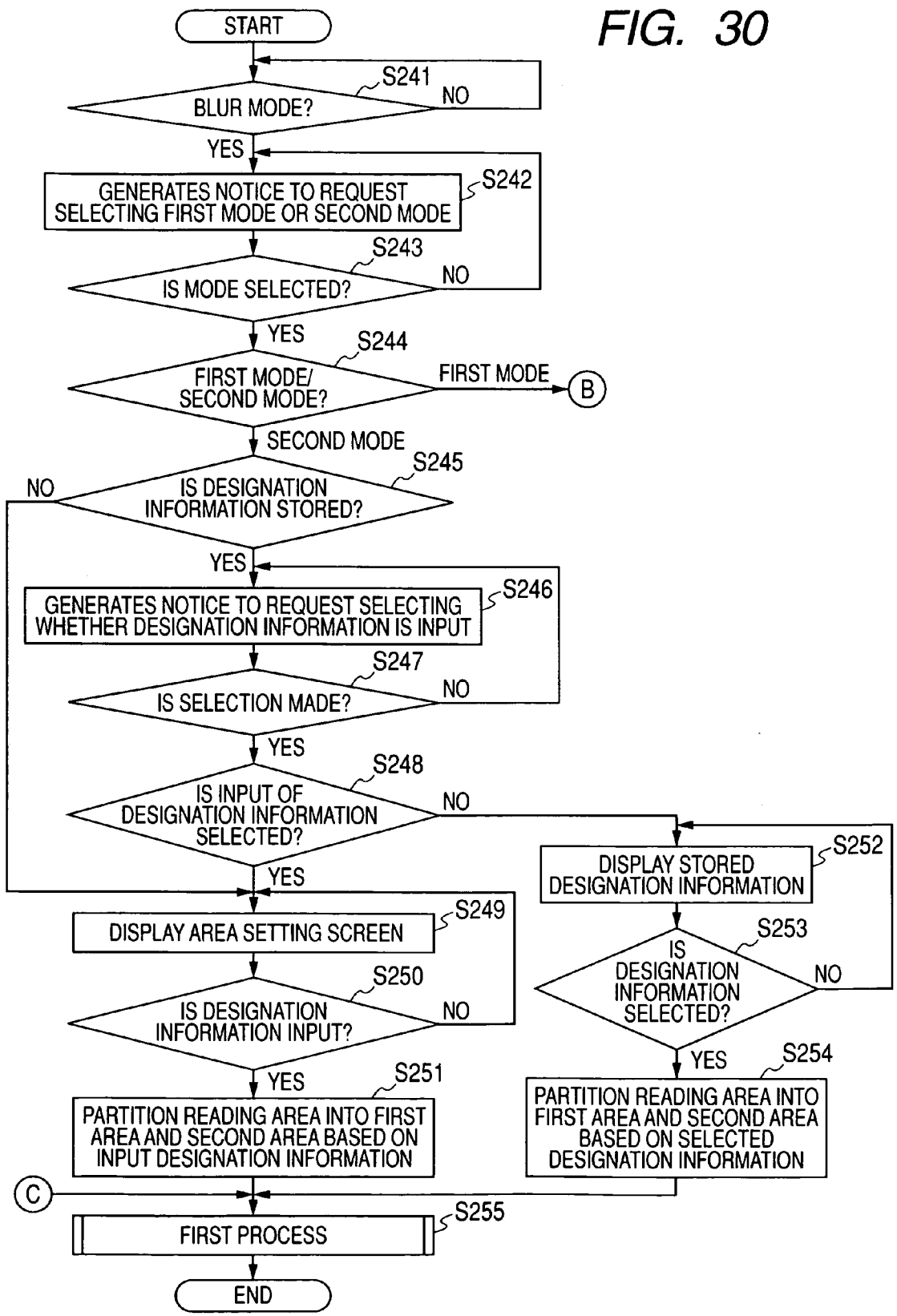
FIG. 30 is a flowchart illustrating a flow of processes performed by the scanner 10 of the second embodiment when it is instructed to start reading a document by an operation panel 13 in a state where a blur mode is set.

As shown in FIG. 30, the controller 55 determines whether or not the blur mode is set on the basis of the reading mode information 224 stored in the RAM 58 (S241). When the controller 55 determines that the blur mode is not set, that is, that the normal mode is set (NO in S241), the controller generates a notice to request selecting the first mode or the second mode (S242). Specifically, the controller 55 displays a message such as "is a pre-scanning process performed?" on the operation panel 13. Here, the first mode is a mode in which the reading area is partitioned into the first area and the second area on the basis of the pre-scanning result and the user's designation. The second mode is a mode in which the reading area is partitioned into the first area and the second area on the basis of the user's designation without performing the pre-scanning process (an example of a second scanning process).

The controller 55 determines whether the first mode or the second mode is selected on the basis of the operation input from the operation panel 13 (S243). When the controller 55 determines that no mode is selected (NO in S243), the process of step S242 is performed repeatedly. When the controller 55 determines that a mode is selected (YES in S243), the controller determines whether the selected mode is the first mode or the second mode (S244).

When the controller 55 determines that the second mode is selected (second mode in S244), the controller receives the selection of the second mode and determines whether or not the designation information is stored in the EEPROM 59 (S245). Here, the designation information is information for designating the first area or the second area. The reading area of the document conveyed by the ADF 28 is partitioned into the first area and the second area on the basis of the designation information. When the controller 55 determines that the designation information is stored (YES in S245), the controller generates a notice to request selecting an input or a non-input of the designation information (S246). For example, the controller 55 displays a message such as "Is the designation information is registered? Is the designation information input?" on the operation panel 13.

The controller 55 determines whether or not the selection in response to the notice of step S246 is made on the basis of a predetermined operation input from the operation panel 13 (S247). When the controller 55 determines that the selection is not made (NO in S247), the process of step S246 is performed again. When the controller 55 determines that the selection is made (YES in S247), the controller determines whether or not the selection is the input of the designation information (S248).

Figure 34A:
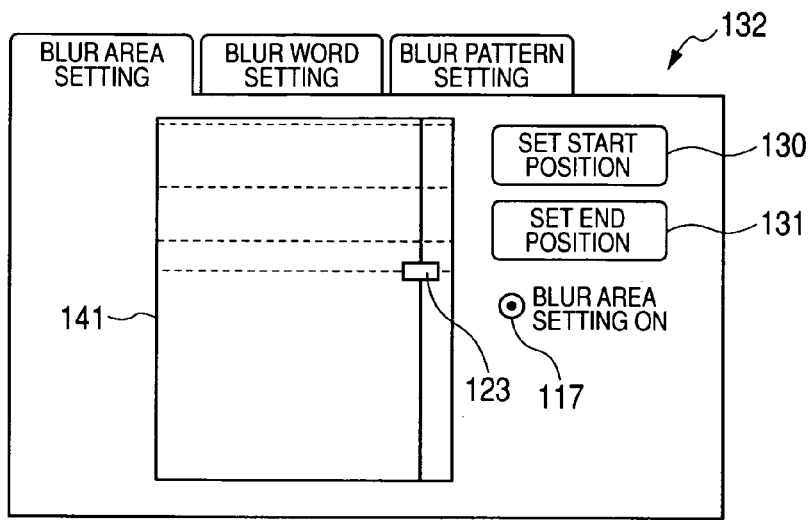
FIG. 34 is a diagram schematically illustrating an example of a setting screen displayed on the operation panel of the second embodiment.

When the controller 55 determines that the selection is the input of the designation information (YES in S248) or that the designation information is not stored in the EEPROM 59 (NO in S245), the controller displays an area setting screen 132 (an example of a first setting screen) shown in FIG. 34A (S249). The area setting screen 132 is a display screen for allowing a user to input the designation information.

The area setting screen 132 includes a reading area 141 of a document, a cursor 123, a start position setting button 130, an end position setting button 131, and a check box 117. The operation panel 13 on which the area setting screen 132 is displayed is of a touch panel type. A user can input the designation information by operating the cursor 123, the start position setting button 130, and the end position setting button 131 displayed in the area setting screen 132.

For example, the input of the designation information for designating the second area 95 (see FIG. 29) is performed as follows. The start position setting button 130 and the end position setting button 131 are input keys for specifying a main scanning line (a dot-chained line in FIG. 29) designated by the cursor 123. By allowing the user to operate the start position setting button 130 and the end position setting button 131, the second area 95 is designated. The designation information for designating the second area 95 is received by marking the check box 117. A reading area 141 in which two second areas are specified is shown in FIG. 29A. The designation information may be input as a numerical value by allowing the user to operate numerical pads of the operation panel 13 instead of operating the cursor 123. In this embodiment, the second area is designated on the basis of the designation information, but the first area may be designated on the basis of the designation information.

The controller 55 determines whether or not the designation information is input through the area setting screen 132 (S250). Specifically, the controller 55 determines whether the designation information is set and the check box 117 is marked by operating the cursor 123, the start position setting button 130, and the end position setting button 131. When the controller 55 determines that the designation information is not input (NO in S250), the process of step S249 is performed again. When the controller 55 determines that the designation information is input (YES in S250), the controller receives the input of the designation information and partitions the reading area of the document into the first area and the second area on the basis of the designation information (S251). The information indicating the partitioned first and second areas is temporarily stored in a predetermined area of the EEPROM 59. The reading area of the document is partitioned into the first area and the second area on the basis of the input designation information. Accordingly, the user can be made to arbitrarily designate the first area or the second area in the scanner 10 and to read a document in a state where a partial area is blurred.

When the controller 55 determines that the selection is not the input of the designation information (NO in S248), the controller displays the designation information stored in the EEPROM 59 on the operation panel 13 (S252). The controller 55 determines whether or not the stored designation information is selected on the basis of a predetermined operation from the operation panel 13 (S253). When the controller 55 determines that the designation information is not selected (NO in S253), the process of step S252 is performed again. When the controller 55 determines that the stored designation information is selected (YES in S253), the controller partitions the reading area of the document into the first area and the second area on the basis of the selected designation information (S254). After the process of step S251 or the process of step S254 is performed, the controller 55 performs a first process (see FIG. 35) (S255).

Figure 35:
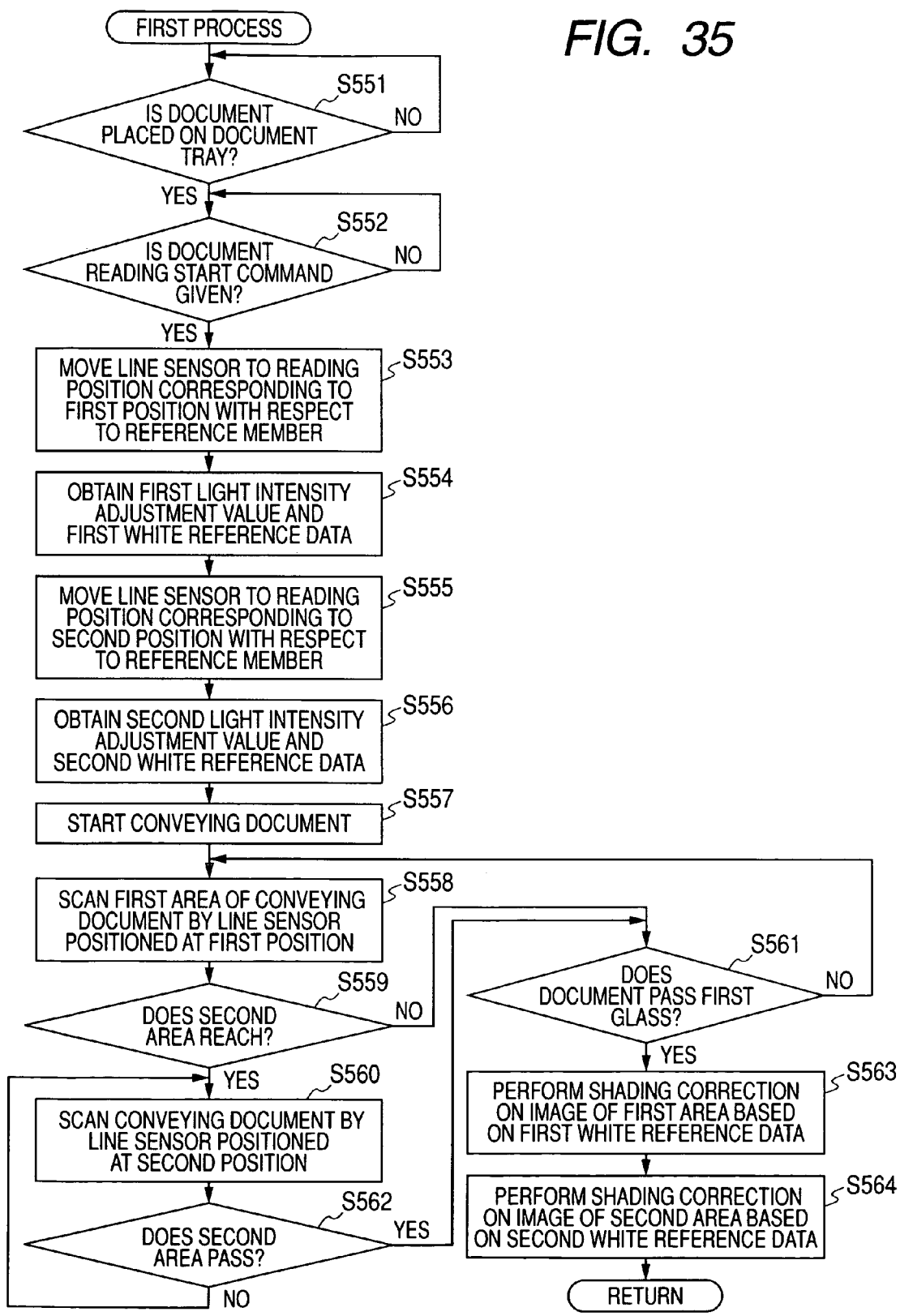
FIG. 35 is a detailed flow chart illustrating a first process of the second embodiment.

FIG. 35 is a detailed flowchart illustrating the first process.

As shown in FIG. 35, the controller 55 determines whether a document is placed on the document tray 22 (S551). The determination of step S551 is performed on the basis of the sensor signal output from the document sensor 36. When the controller 55 determines that the document is not placed on the document tray 22 (NO in S551), the controller is in a waiting state. When the controller 55 determines that a document is placed on the document tray 22 (YES in S551), the controller determines whether a document reading start command is given (S552). When a predetermined operation input instructing the document reading start is given from the operation panel 13, or when a predetermined command instructing the document reading start is received from the terminal device 140, the controller 55 determines YES in step S552. On the contrary, when the predetermined operation input is not given from the operation panel 13 and the predetermined command is not received from the terminal device 140, the controller 55 determines NO in step S552. When the controller 55 determines that the reading start command is not given (NO in S552), the controller is in the waiting state.

When the controller 55 determines that the reading start command is given (YES in S552), the controller controls the CR motor 65 to move the line sensor 40 to the reading position corresponding to the first position 231 relative to the reference member 37 (see FIG. 2) (S553), similarly to the process of step S234. The controller 55 obtains the light intensity adjustment value 301 and the first white reference data 290 (see FIG. 19A) (S554), similarly to the process of step S235. The first light intensity adjustment value 301 and the first white reference data 290 obtained in the process of step S554 are stored in the RAM 58.

The controller 55 allows the line sensor 40 to move to the reading position corresponding to the second position 232 relative to the reference member 37 (see FIG. 2) (S555). The reading position is a position where the second relative distance between the line sensor 40 moved below the reference member 37 and the reading surface 27 of the reference member 37 is substantially equal to the first relative distance between the line sensor 40 located at the reading position corresponding to the second position 232 and the document reading surface 25 of the first glass 18.

The controller 55 obtains the second light intensity adjustment value 302 and the second white reference data 291 (see FIG. 19A) (S556). The process of step S556 is performed in the same way as the process of step S235, except that the reading position of the line sensor 40 relative to the reference member 37 is changed. The second light intensity adjustment value 302 and the second white reference data 291 obtained in the process of step S556 are stored in the RAM 58.

The controller 55 controls the motor 72 of the ADF 28 to start conveying a document placed on the document tray 22 (S557). The controller 55 scans (perform the main scanning process to) the document conveyed by the ADF 28 by the use of the line sensor located at the reading position (see FIG. 20A) corresponding to the first position 231 (S558). Specifically, the controller 55 controls the CR motor 65 to move the line sensor 40 opposed to the reference member 37 to the reading position (see FIG. 20A) corresponding to the first position 231. The controller 55 controls the line sensor 40 to perform an operation of reading the document conveyed over the first glass 18 at the reading position corresponding to the first position 231 in the unit of a line. Accordingly, an image of the first area of the document is read by one line in a state where the line sensor 40 is focused on the document reading surface 25 of the first glass 18. That is, the first area of the document is clearly read.

The controller 55 determines whether the second area of the document conveyed by the ADF 28 reaches the reading surface 25 (see FIG. 20B) of the first glass 18 (S559). The determination of step S559 is made on the basis of the information on the first area and the second area stored in the EEPROM 59 and the number of steps of the motor 72 (see FIG. 4) after the ADF 28 starts conveying the document. When the controller 55 determines that the second area does not reach the reading surface (NO in S559), the controller 55 determines whether or not the document passes over the first glass 18 (S561). When the controller 55 determines that the document does not pass the first glass 18 (NO in S561), the process of step S558 is performed again. Accordingly, the process of step S558 is repeated and thus the entire image of the first area of the document is read.

When the controller 55 determines that the second area of the conveyed document reaches the reading surface (YES in S559), the controller controls the line sensor 40 located at the reading position (see FIG. 20B) corresponding to the second position 232 to scan (perform a main scanning process to) the document conveyed by the ADF 28 (S560). Specifically, the controller 55 controls the CR motor 65 to move the line sensor 40 located at the reading position corresponding to the first position 231 to the reading position corresponding to the second position 232. The controller 55 allows the line sensor 40 to perform the operation of reading the document conveyed over the first glass 18 by a line at the reading position corresponding to the second position 232. Accordingly, the second area of the document is read by a line in a state where the focus of the line sensor 40 is out of the document reading surface 25 of the first glass 18. That is, the second area of the document is read in a state where it is blurred.

The controller 55 determines whether the second area of the conveyed document passes over the reading surface 25 (see FIG. 20B) of the first glass 18 corresponding to the second position 232 (S562). The determination of step S562 is made on the basis of the information on the first area and the second area stored in the EEPROM 59 and the number of steps of the motor 72 after the ADF 28 starts conveying the document. When the controller 55 determines that the second area of the document does not pass the reading surface (NO in S562), the process of step S560 is performed again. Accordingly, the process of step S560 is repeated and thus the entire image of the second area of the document is read. When the controller 55 determines that the second area passes the reading surface, the process of step S561 is performed again. When the controller 55 determines that the document passes over the first glass 18 (YES in S561), the controller determines that the reading of the document is finished and performs the process of step S563.

In this embodiment, the first area is read by several lines in the process of step S558 and then the second area of the document is read in the process of step S560. However, the order of the areas to be read is not limited to it, but the reading may be started from the second area of the document. It may be determined whether the reading start position in the reading area of the document is the first area or the second area and then the process of step S558 or S560 may be performed on the basis of the determination result.

The document images (image signals) read in the processes of steps S558 and S560 are sequentially output to and serially processed by the AFE circuit 78. When the controller 55 determines YES in the process of step S561, the image processing circuit 79 performs a shading correction process on the image of the first area on the basis of the first white reference data 290 obtained in the process of step S554 (S563). The image processing circuit 79 performs a shading correction process on the image of the first area on the basis of the second white reference data 291 obtained in the process of step S556 (S564). In this way, the controller 55 changes the white reference data depending on the reading area of the document image to be corrected in shading by the image processing circuit 79.

The reading area of the line sensor 40 in the document is partitioned into the first area and the second area. In the main scanning process on the conveyed document, the first relative distance between the document reading surface 25 of the first glass 18 and the line sensor 40 is changed by partitioned areas by means of the driving of the CR motor 65 for moving the line sensor 40. Accordingly, it is possible to read the second area of the document in a state where the second area is blurred, without providing a particular driving source other than the CR motor 65. That is, a document image in which the first area is clear and the second area is blurred is obtained.

The document image obtained from the main scanning process is corrected in shading every reading area by the image processing circuit 79. In the main scanning process on the conveyed document, since the first relative distance is changed, the intensity of the reflected light from the document to the line sensor 40 is changed in the course of reading the document. In this embodiment, the first white reference data 290 is used in the shading correction process on the first area of the document and the second white reference data 291 is used in the shading correction process on the second area of the document. In this way, by changing the white reference data depending on the reading areas of the document, a document image with constant image quality is obtained to correspond to the change of the relative distance.

In the main scanning process on the conveyed document, a reading operation may be continuously performed two times and the document images obtained in the reading operations may be synthesized. That is, in the main scanning process on the document conveyed by the ADF 28, the line sensor 40 performs a reading operation of reading the entire image of the conveyed document in a state where the line sensor is located at the reading position corresponding to the first position 231. After the reading operation is finished, the roller 73 is inversely driven to return the conveyed document to a position before reading. The line sensor 40 reads the entire image of the conveyed image in a state where the line sensor is located at the reading position corresponding to the second position 232. The controller 55 synthesizes the image of the first area obtained in the first reading operation and the image of the second area obtained in the second reading operation to generate the entire document image.

Although it has been described here that the first area of the document is read by the line sensor 40 located at the reading position corresponding to the first position 231, the first area of the document may be read in a state where the line sensor 40 is located at a position which slightly departs from the reading position corresponding to the first position 231 so as to suppress the occurrence of the moiré (such as the moiré reducing mode in the first embodiment).

Figure 31:
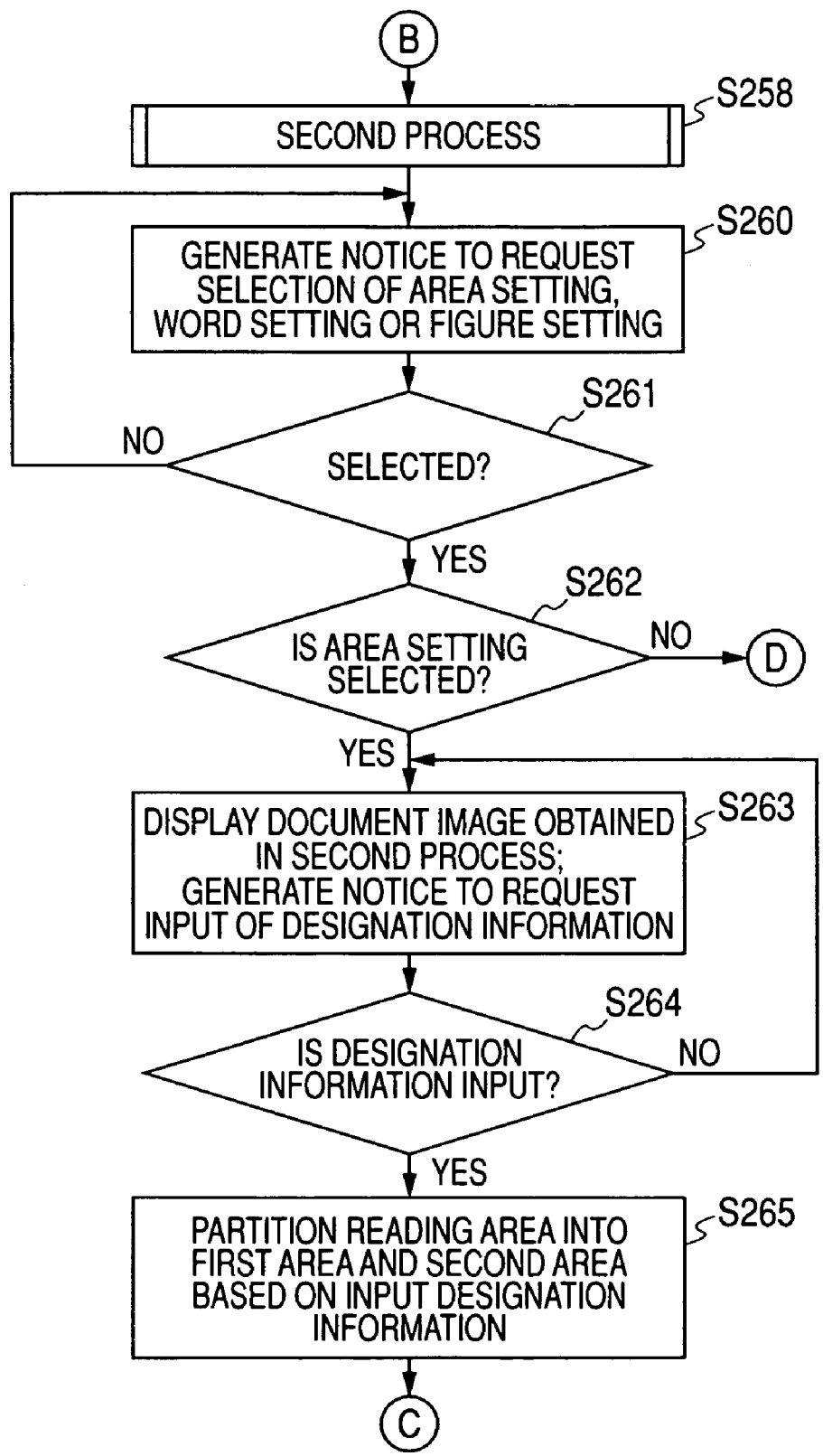
FIG. 31 is a flowchart illustrating a flow of processes performed by the scanner of the second embodiment when it is instructed to start reading a document by the operation panel 13 in a state where the blur mode is set.

As shown in FIGS. 30 and 31, when the controller 55 determines that the first mode is selected (first mode in S244), the controller receives the selection of the first mode and performs a second process (S258).

Figure 36:
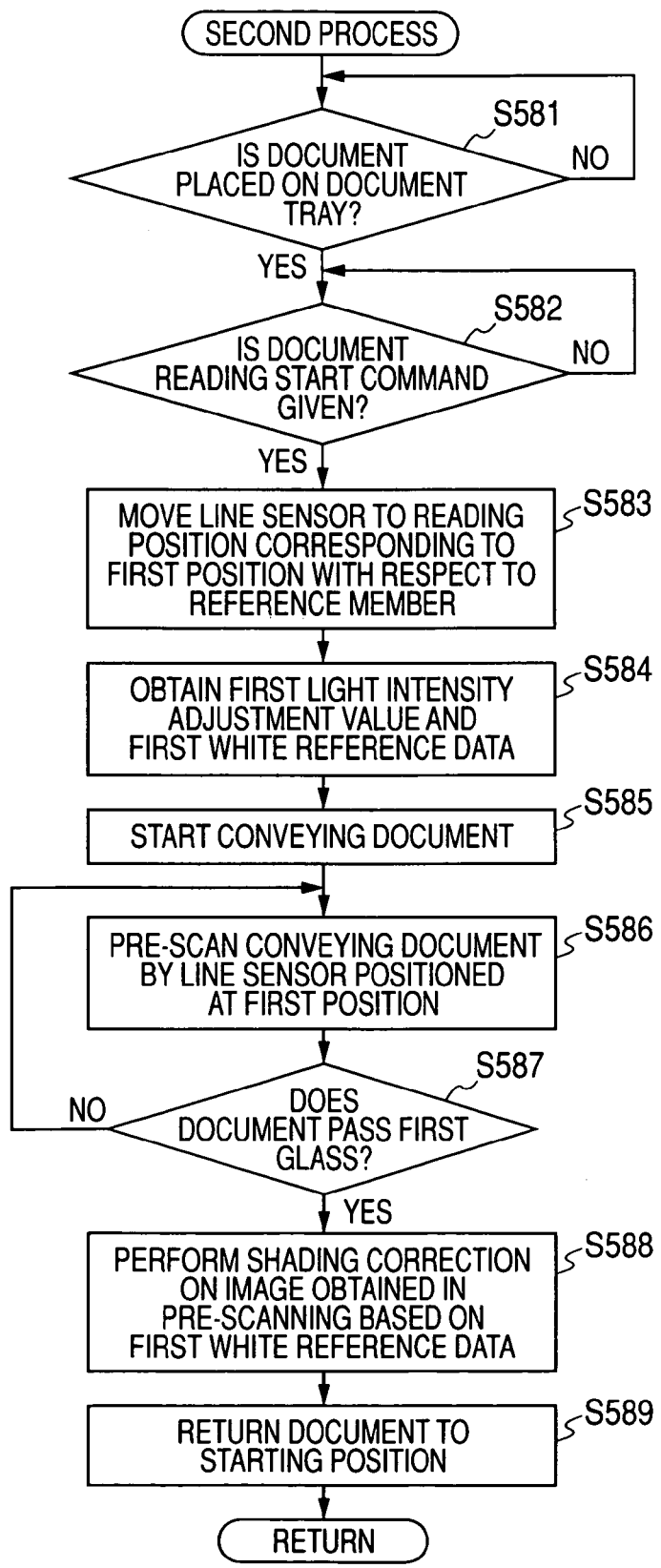
FIG. 36 is a detailed flow chart illustrating a second process of the second embodiment.

FIG. 36 is a flowchart illustrating details of the second process.

Similarly to the process of step S551, the controller 55 determines whether a document is placed on the document tray 22 (S581). When the controller 55 determines that a document is not placed on the document tray 22 (No in S581), the controller is in the waiting state. When the controller 55 determines that a document is placed on the document tray 22 (YES in S581), the controller determines whether a document reading start command is given (S582), similarly to the process of step S552. When the controller determines that the reading start command is not given (NO S582), the controller is in the waiting state.

When the controller 55 determines that the document reading start command is given (YES in S582), the controller moves the line sensor 40 to the reading position corresponding to the first position 231 relative to the reference member 37 (S583), similarly to the process of step S234. Then, the controller 55 obtains the first light intensity adjustment value 301 and the first white reference data 290 (S584), similarly to the process of step S235. The first light intensity adjustment value 301 and the first white reference data 290 are stored in a predetermined area of the RAM 58.

The controller 55 starts conveying a document in the process of step S584 (S585), similarly to the process of step S557. The controller 55 controls the line sensor 40 located at the reading position (see FIG. 20A) corresponding to the first position 231 to pre-scan the document conveyed by the ADF 28 (S586). The controller 55 determines whether or not the document conveyed by the ADF 28 passes over the first glass 18 (S587). When the controller 55 determines that the document does not pass the first glass 18 (NO in S587), the process of step S586 is performed again. When the controller 55 determines that the document passes over the first glass 18 (YES in S587), the controller controls the image processing circuit 79 to correct the shading of the document image obtained in the pre-scanning process of step S586 on the basis of the first white reference data 290 (S588). The controller 55 inversely drives the motor 72 to return the document conveyed by the ADF 28 to a position before starting the conveying in step S585 (S589).

In this way, by performing the second process, the image of the document conveyed by the ADF 28 is pre-scanned in a state where the line sensor 40 is located at the reading position corresponding to the first position 231. The document image obtained in the pre-scanning process is stored in a predetermined area of the RAM 58 and is used to partition the reading area.

As shown in FIG. 31, after performing the second process (S258), the controller 55 generates a notice to select the area setting, the word setting, or the figure setting after performing the second process (S260). For example, the controller 55 displays a message such as "Please select area setting, word setting, or figure setting" on the operation panel 13. The area setting is a setting operation of allowing a user to input the designation information for the document image obtained in the pre-scanning process and allowing the reading area to be partitioned into the first area and the second area on the basis of the input designation information. The word setting is a setting operation of detecting a word designated by the user from the document image obtained in the pre-scanning process and setting an area including the detected word as the second area and the other area as the first area. In the word setting, character(s) (such as letter, numeral, mark, etc.) may be designated to be detected, even if the designated character(s) does not form word(s). The figure setting is a setting operation of detecting a figure designated by the user from the document image obtained in the pre-scanning process and setting an area including the detected figure as the second area and the other area as the first area. The controller 55 determines whether one of the area setting, the word setting, and the figure setting is selected on the basis of a predetermined operation input from the operation panel 13 (S261). When the controller 55 determines that any setting is not selected (NO in S261), the process of step S260 is performed again.

When the controller 55 determines that any one setting is selected (YES in S261), the controller determines whether or not the area setting is selected (S262). When the controller 55 determines that the area setting is selected (YES in S262), the controller displays the document image from the second process on the operation panel 13 and generates a notice to request inputting the designation information (S263). Specifically, the controller 55 displays the document image obtained in the pre-scanning process and the same display screen as the area setting screen 132 on the operation panel 13. For example, the controller 55 displays on the operation panel 13 the area setting screen 132 having the image obtained in the pre-scanning process arranged in the reading area 141 (see FIG. 34A).

The controller 55 determines whether the designation information for the document image obtained in the pre-scanning process is input on the basis of the predetermined operation input from the operation panel 13 (S264). When the controller 55 determines that the designation information is not input (NO in S264), the process of step S263 is performed again. When the controller 55 determines that the designation information is input (YES in S264), the controller receives the input of the designation information and partitions the reading area into the first area and the second area on the basis of the designation information (S265). The information of the first area and the second area is stored in a predetermined area of the RAM 58. After the process of step S265, the first process which is the main scanning process is performed on the basis of the information on the first area and the second area set in the process.

In the scanner 10, the pre-scanned document image is displayed on the operation panel 13. The input of the designation information for designating an area of the displayed document image is received by the controller 55 through the operation panel 13. The reading area of the document in the main scanning process is partitioned into the first area and the second area on the basis of the designation information. Accordingly, a user can view the pre-scanned image displayed in the scanner 10 and then easily designate an area of the document to be blurred.

Figure 32:
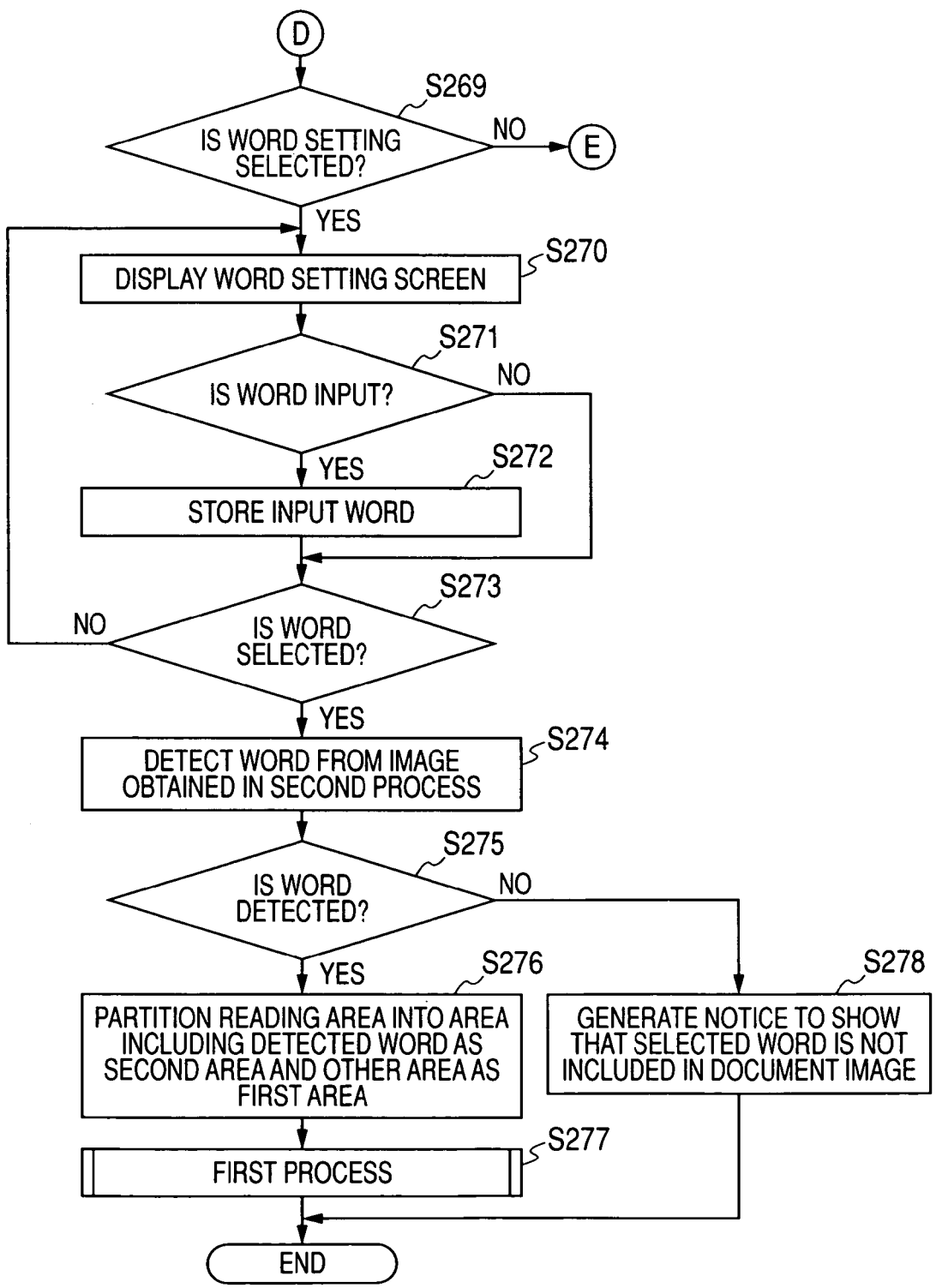
FIG. 32 is a flowchart illustrating a flow of processes performed by the scanner of the second embodiment when it is instructed to start reading a document by the operation panel in a state where the blur mode is set.

As shown in FIGS. 31 and 32, when the controller 55 determines that the area setting is not selected (NO in S262), the controller determines whether or not the word setting is selected (S269). That is, the controller 55 determines whether the word setting or the figure setting is selected. When the controller 55 determines that the word setting is selected (YES in S269), the controller displays a word setting screen 134 (an example of the second setting screen) shown in FIG. 34B (S270). The word setting screen 134 is a display screen for allowing a user to input a word.

The word setting screen 134 includes a table 122, a reference button 137, an edition button 138, a save button 139, and a check box 133. Settable words are displayed in the table 122. By pressing the reference button 137, a word stored in the EEPROM 59 is read out and displayed in the table 122. By pressing the edition button 138, a user can operate the operation panel 13 to input a word. By pressing the save button 139, the input word is stored in the EEPROM 59. A user operates the reference button 137, the edition button 138, and the save button 139 to display a word to be blurred and read in the table 122. The setting of the word displayed in the table 122 is received by marking the check box 133.

The controller 55 determines whether a word is input on the basis of the operation of the save button 139 (S271). When the controller 55 determines that a word is input to the word setting screen 134 (YES in S271), the controller stores the input word in the EEPROM 59 (S272). When the controller 55 performs the process of step S272 or determines that a word is not input (NO in S271), the controller determines whether or not a word is selected (S273). Specifically, the controller determines whether or not the check box 133 is marked in a state where the word is displayed in the table 122. When the controller 55 determines that the word is not selected (NO in S273), the process of step S270 is performed again.

When the controller 55 determines that the word is selected (YES in S273), the controller receives the selection of the word and detects the word from the document image obtained in the second process (S274). Specifically, the controller 55 processes the document image obtained by the pre-scanning process of the second process in an OCR (Optical Word Recognition) manner. That is, the controller 55 analyzes the document image obtained in the pre-scanning process and converts the document image into word data. Then, the controller 55 detects the word selected in the process of step S273 from the word data.

The controller 55 determines whether the word is detected (S275). When the controller 55 determines that the word is detected (YES in S275), the controller partitions an area including the detected word into the second area and partitions the other area into the first area (S276). For example, when a word "name" is detected from the document image obtained in the pre-scanning process, the controller partitions a main scanning line including the word "name" in the reading area 47 of the document into the second area 95 (see FIG. 29). Accordingly, the personal information described beside the name is blurred and read. The information on the first area and the second area is stored in the EEPROM 59.

The controller 55 performs the first process on the basis of the information on the first area and the second area partitioned in the process of step S276 (S277). When the controller 55 determines that the selected word is not detected from the document image obtained in the pre-scanning process of the second process (No in S275), the controller generates a notice to indicate that the selected word is not included in the document image (S278). Specifically, the controller 55 displays a message such as "The selected word is not detected" on the operation panel 13.

In the second process (S258), since the pre-scanning process on a document is performed in a state where the line sensor 40 is focused, some of the series of processes may be modified as follows. The controller 55 stores the document image obtained in the second process in the RAM 58. In the first process, the controller 55 allows the line sensor 40 to read the entire image of the conveyed document in a state where the line sensor 40 is located at the reading position corresponding to the second position 232. Then, the controller 55 synthesizes the image of the second area obtained in the first process and the image of the first area obtained in the second process to generate the entire document image. As a result, the reading operation of changing the reading position of the line sensor 40 in the first process or reading the entire document two times is not required. Therefore, the time for the first process can be reduced and the load of the image reading unit 14 can be reduced, thereby simplifying the configuration of the scanner 10.

Figure 33:
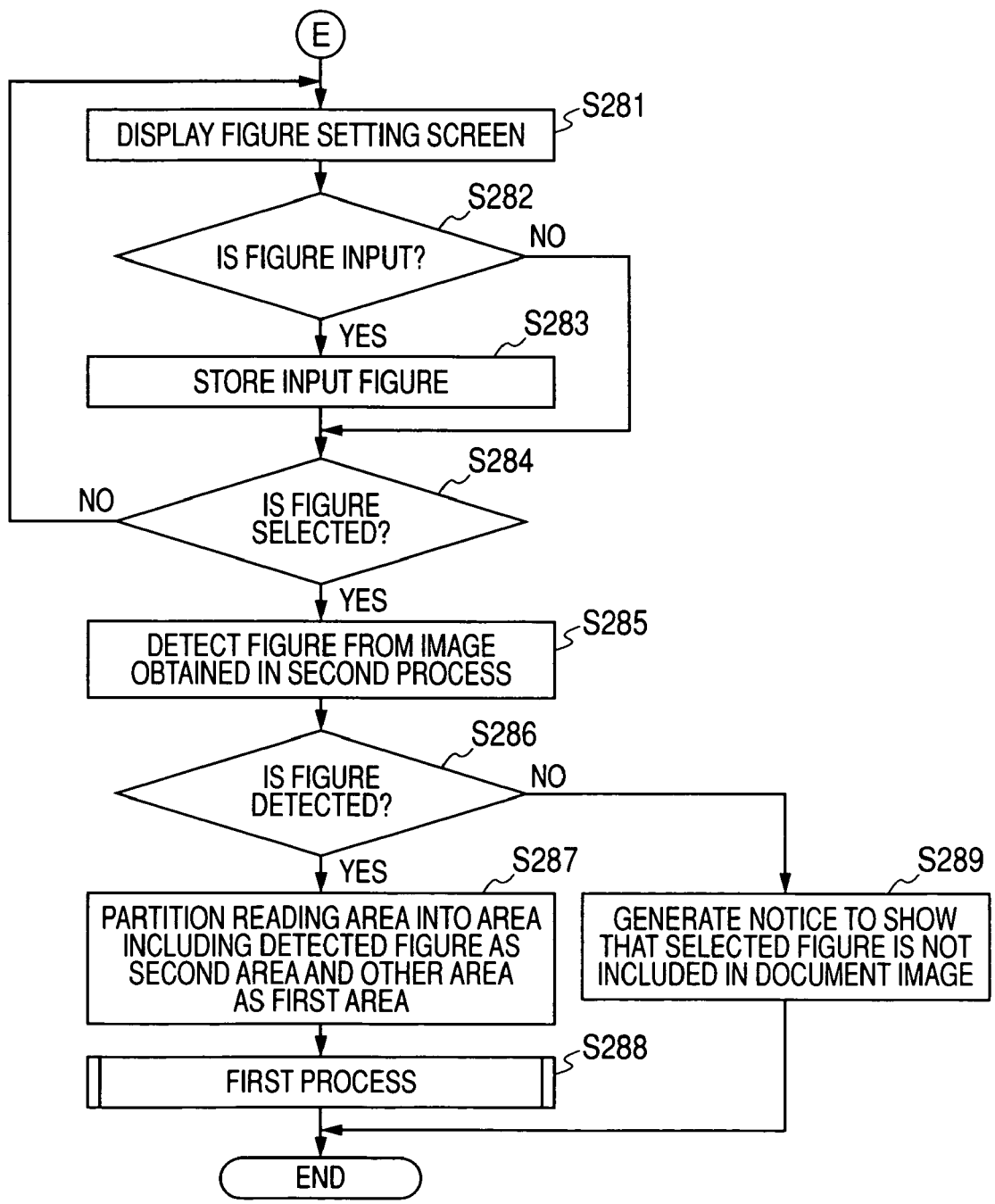
FIG. 33 is a flowchart illustrating a flow of processes performed by the scanner of the second embodiment when it is instructed to start reading a document by the operation panel in a state where the blur mode is set.
Figure 34B:
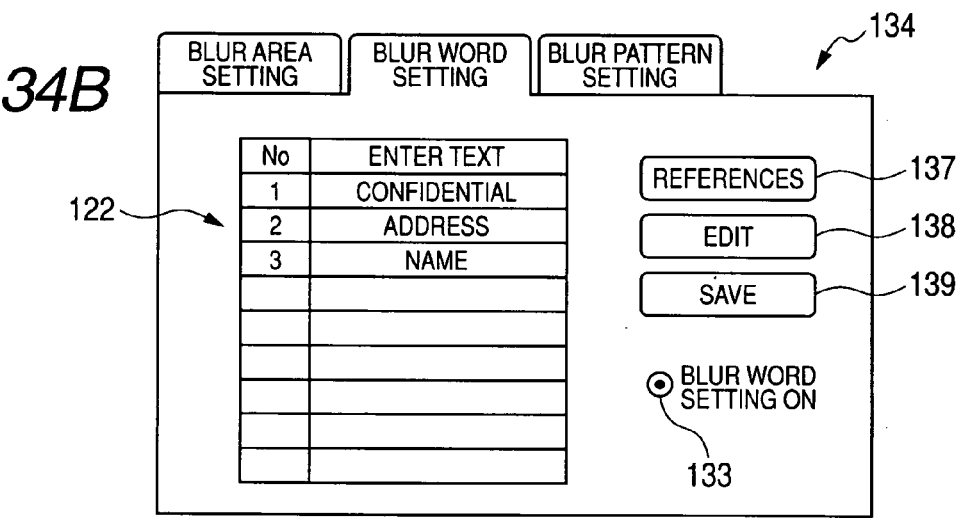
Figure 34C:
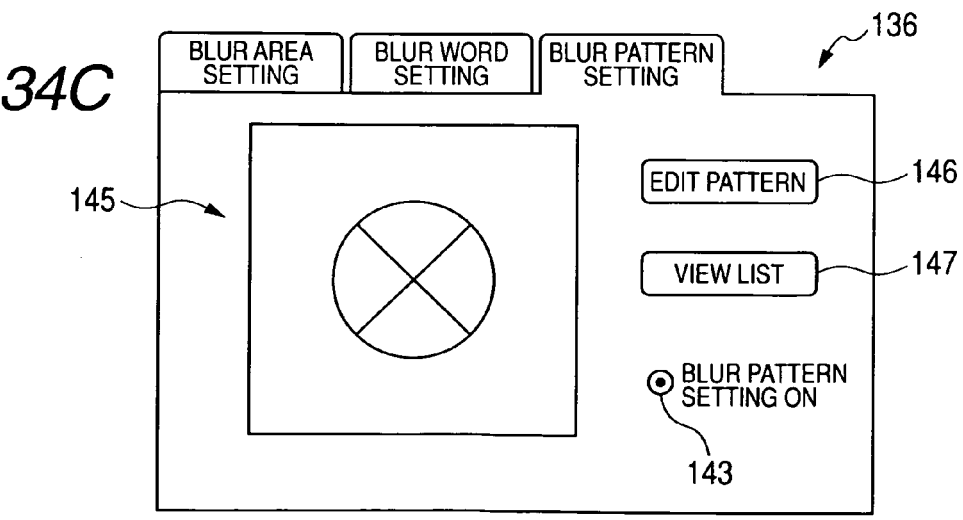

As shown in FIGS. 32 and 33, when the controller 55 determines that the word setting is not selected (NO in S269), that is, that the figure setting is selected, the controller displays a figure setting screen 136 shown in FIG. 34C on the operation panel (S281). The figure setting screen 136 is a display screen for allowing a user to input a figure.

The figure setting screen 136 includes a FIG. 145, a pattern editing button 146, a view list button 147, and a checkbox 143. A user can input a figure by pressing the pattern editing button 146 to perform a predetermined operation. The input figure or the figures stored in the EEPROM 59 are displayed as the FIG. 145 on the figure setting screen 136. The view list button 147 is a key for reading out stored figure(s) and displaying the read figure(s) as the FIG. 145. The setting of the FIG. 145 displayed in the figure setting screen 136 is received by marking the check box 143.

The controller 55 determines whether a figure is input or not on the basis of a predetermined operation input from the operation panel 13 (S282). When the controller 55 determines that a figure is input (YES in S282), the controller stores the input figure in the EEPROM 59 (S283). After the controller 55 performs the process of step S283 or when the controller determines that a figures is not input (NO in S282), the controller determines whether a figure is selected or not (S284). Specifically, the controller 55 determines whether the check box 143 is marked in a state where the FIG. 145 is displayed in the figure setting screen 136. When the controller 55 determines that the figure is not selected (No in S284), the process of step S281 is performed again. When the controller 55 determines that the figure is selected (YES in S284), the controller detects the selected figure from the document image obtained in the second process (S285). The controller 55 determines whether the figure is detected from the document image obtained in the second process (S286).

When the controller 55 determines that the figure is detected from the document image obtained in the second process (YES in S286), the controller partitions an area including the detected figure into the second area and partitions the other area into the first area (S287). The process of step S287 is performed in the same way as the process of step S276. The controller 55 performs the first process on the basis of the information on the first area and the second area partitioned in the process of step S287 (S288).

In the second process (step S258), since the document is pre-scanned in a state where the line sensor 40 is focused, some of the series of processes may be modified as follows. The controller 55 stores the document image obtained in the second process in the RAM 58. In the first process, the controller 55 allows the line sensor 40 to read the entire image of the conveyed document in a state where the line sensor 40 is located at the reading position corresponding to the second position 232. Then, the controller 55 synthesizes the image of the second area obtained in the first process and the image of the first area obtained in the second process to generate the entire document image. As a result, the reading operation of changing the reading position of the line sensor 40 in the first process or reading the entire document two times is not required. Therefore, the time for the first process can be reduced and the load of the image reading unit 14 can be reduced, thereby simplifying the configuration of the scanner 10.

When the controller 55 determines that the figure is not detected from the document image obtained in the second process (No in S286), the controller generates a notice to indicate that the selected figure is not included in the document image (S289). Specifically, the controller 55 displays a message such as "The selected figure is not detected" on the operation panel 13.

Figure 37:
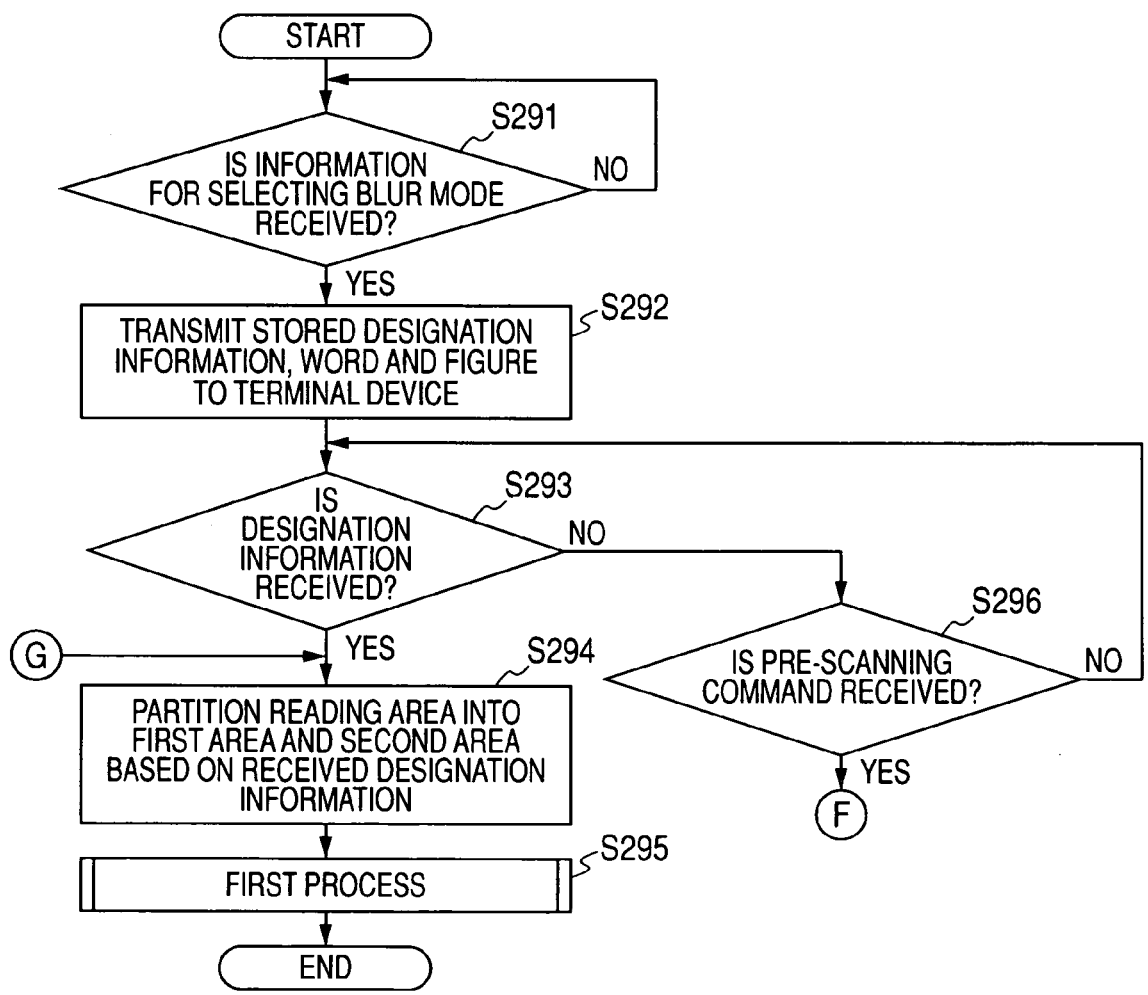
FIG. 37 is a flowchart illustrating a flow of processes performed by the scanner of the second embodiment when information for selecting the blur mode is received from a terminal device.
Figure 38:
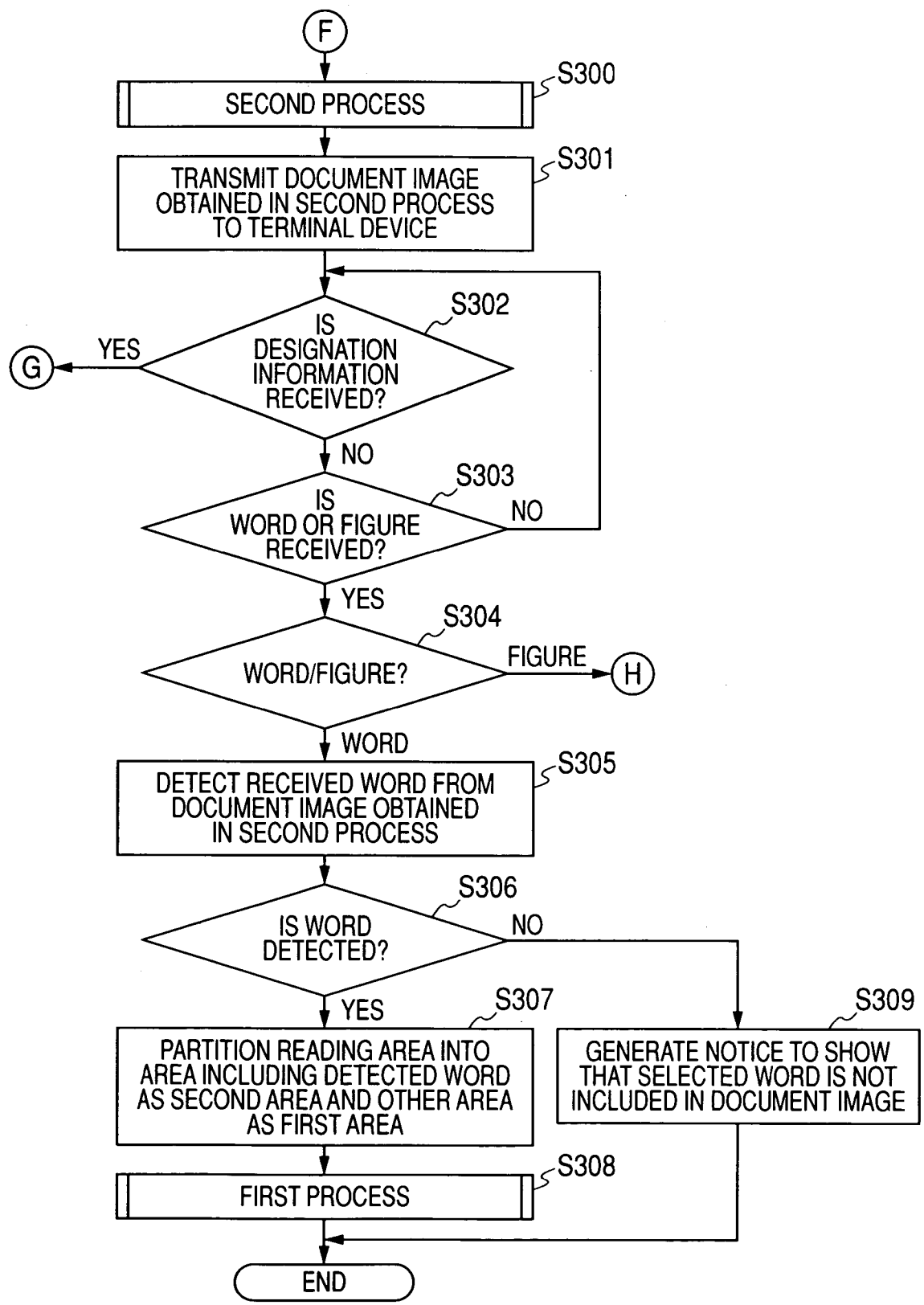
FIG. 38 is a flowchart illustrating a flow of processes performed by the scanner of the second embodiment when information for selecting the blur mode is received from the terminal device.
Figure 39:
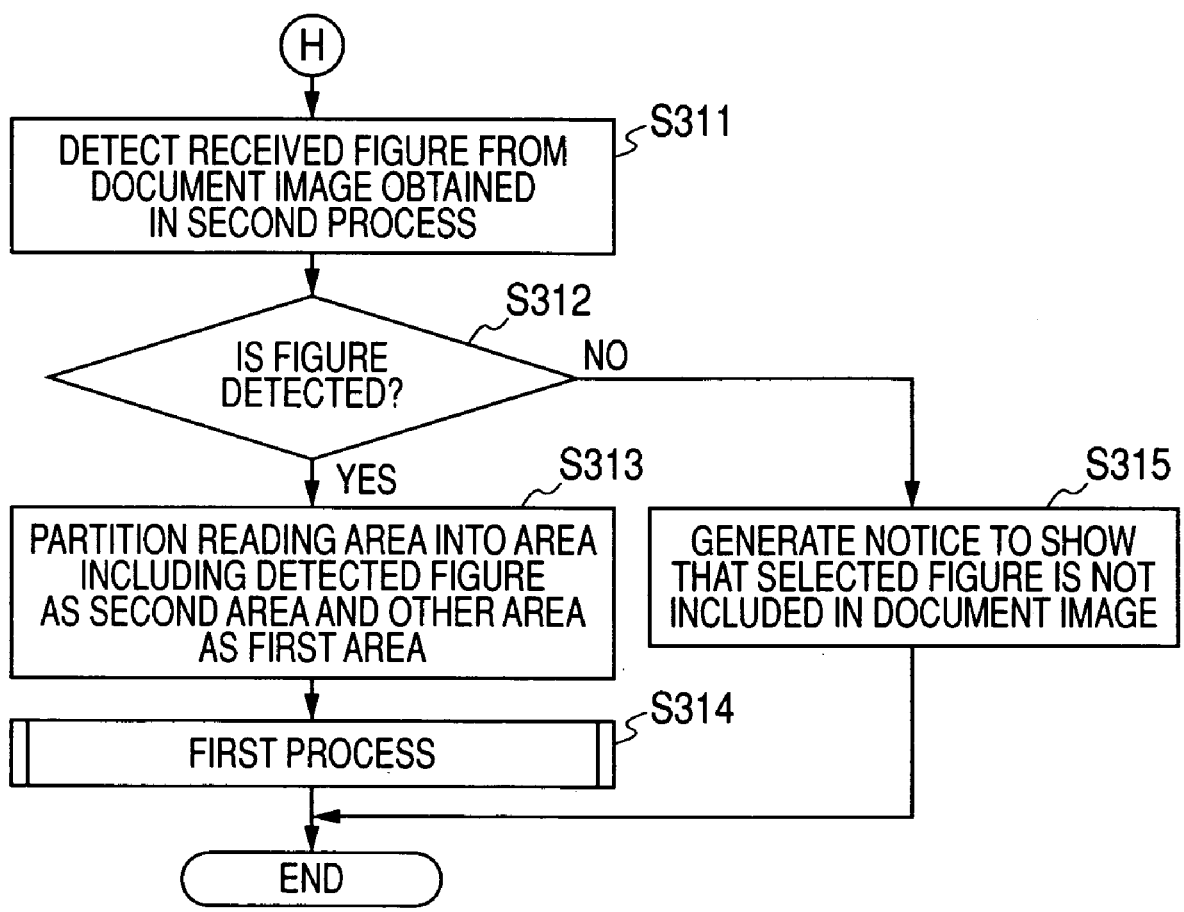
FIG. 39 is a flowchart illustrating a flow of processes performed by the scanner of the second embodiment when information for selecting the blur mode is received from the terminal device.

FIGS. 37 to 39 are flowcharts illustrating a flow of processes performed by the scanner 10 when receiving information for selecting the blur mode from the terminal device 140.

The controller 55 determines whether the information for selecting the blur mode is received from the terminal device 140 (S291). When the controller 55 determines that the information for selecting the blur mode is not received (NO in S291), the controller is in the waiting state. When the controller 55 determines that the information for selecting the blur mode is received (YES in S291), the controller transmits the designation information, the words, and the figures stored in the EEPROM 59 to the terminal device 140 (S292).

The terminal device 140 receives the designation information, the words, and the figures transmitted from the scanner 10. The terminal device 140 displays the received information on a monitor and receives the selection of the first mode or the second mode. When the second mode is designated by an operation of a keyboard or a mouse, the terminal device 140 generates designation information on the basis of the user's operation input and transmits the generated designation information to the scanner 10. When the first mode is designated by the operation of the keyboard or the mouse, the terminal device 140 transmits a pre-scanning command to the scanner 10.

The controller 55 of the scanner 10 determines whether the designation information is received from the terminal device 140 (S293). When the controller 55 determines that the designation information is received from the terminal device 140 (YES in S293), the controller partitions the reading area of the document into the first area and the second area on the basis of the received designation information (S294). The process of step S294 is performed in the same way as the process of step S251. The controller 55 performs the first process on the basis of the information on the first area and the second area partitioned in the process of step S294 (S295).

The designation information transmitted from the terminal device 140 is received by the scanner 10. The reading area of the document in the main scanning process is partitioned into the first area and the second area on the basis of the received designation information. Accordingly, a user can arbitrarily designate the first area and the second area in the terminal device 140 and can read the document in a state where a partial area of the document is blurred.

When the controller 55 determines that the designation information is not received (NO in S293), the controller determines whether the pre-scanning command is received from the terminal device 140 or not (S296). When the controller determines that the pre-scanning command is not received (NO in S296), the process of step S293 is performed again. When the controller 55 determines that the pre-scanning command is received (YES in S296), the controller performs the second process (S300). The controller 55 transmits the document image obtained in the second process to the terminal device 140 (S301).

For example, the document image is displayed on a monitor of the terminal device 140. The terminal device 140 generates designation information, words, or figures on the basis of the user's operation input at the document image displayed on the monitor. The designation information, the words, or the figures are transmitted to the scanner 10.

The controller 55 of the scanner 10 determines whether the designation information transmitted from the terminal device 140 is received (S302). When the controller 55 determines that the designation information is received (YES in S302), the process of step S294 is performed. When the controller 55 determines that the designation information is not received (NO in S302), the controller determines whether the word or the figure is received from the terminal device 140 (S303). When the controller 55 determines that the word or figure is not received (NO in S303), the process of step S302 is performed again.

When the controller 55 determines that the word or figure is received (YES in S303), the controller determines whether the received information is a word or a figure (S304). When the controller 55 determines that the received information is the word (word in S304), the controller detects the received word from the document image obtained in the second process (S305). The process of step S305 is performed in the same way as the process of step S274. As a result of the process of step S305, the controller 55 determines whether the received word is detected from the document image obtained in the pre-scanning process (S306). When the controller 55 determine that the word is detected (YES in S306), the controller partitions the area including the detected word into the second area and partitions the other area into the first area (S307). The process of step S307 is performed in the same way as the process of step S276. The controller 55 performs the first process on the basis of the information on the first area and the second area partitioned in the process of step S307 (S308).

When the controller 55 determines that the word is not detected (NO in S306), the controller transmits, to the terminal device 140, information showing that the received word is not included in the document image (S309). Accordingly, a message such as "The designated word is not included in the document" is displayed on the monitor of the terminal device 140.

When the controller 55 determines that the received information is a figure (figure in S304), the controller detects the received figure from the document image obtained in the second process (S311). The process of step S311 is performed in the same way as the process of step S285. As a result of the process of step S311, the controller 55 determines whether the received figure is detected from the document image obtained in the second process (S312). When the controller 55 determine that the figure is detected (YES in S312), the controller partitions the area including the detected figure into the second area and partitions the other area into the first area (S313). The process of step S313 is performed in the same way as the process of step S287. The controller 55 performs the first process on the basis of the information on the first area and the second area partitioned in the process of step S313 (S314).

When the controller 55 determines that the figure is not detected (NO in S312), the controller transmits, to the terminal device 140, information showing that the received figure is not included in the document image (S315). Accordingly, a message such as "The designated figure is not included in the document" is displayed on the monitor of the terminal device 140.

The reading area of the line sensor 40 in the document conveyed by the ADF 28 is partitioned into the first area and the second area. The reading area is partitioned on the basis of the document image obtained in the pre-scanning process (second process) on a document or a user's setting. In the main scanning process on the conveyed document, the first relative distance between the document reading surface 25 of the first glass 18 and the line sensor 40 is changed in the partitioned areas by driving the CR motor 65 for moving the line sensor 40. That is, when the first area of the document is read, the line sensor 40 is located at the reading position corresponding to the first position 231. When the second area of the document is read, the line sensor 40 is located at the reading position corresponding to the second position 232. Accordingly, it is possible to read a conveyed document in a state where a partial area of the document is blurred, without providing a driving source other than the CR motor 65.

In the blur mode, the scanner 10 is set to the first mode or the second mode. In the first mode, the reading area is partitioned on the basis of the result of the pre-scanning process. In the second mode, the reading area is partitioned on the basis of the user's setting. When the selection of the first mode is received, the conveyed document is pre-scanned by the line sensor 40. The reading area of the document to be read in the main scanning process is partitioned on the basis of the document image obtained in the pre-scanning process. Accordingly, for example, the document image obtained in the pre-scanning process may be analyzed to partition the reading area, or the document image obtained in the pre-scanning process may be displayed to partition the reading area on the basis of the user's operation. When the selection of the second mode is received, the reading area of the document to be read in the main scanning process is partitioned on the basis of the user's setting. For example, by setting the same reading area for plural documents, the plural documents can be read under the same condition. The pre-scanning process on a document is not performed in the second mode.

In the scanner 10 according to this embodiment, the designation information, the word, or the figure input from the operation panel 13 or received from the terminal device 140 is stored in the EEPROM 59. Accordingly, the user can designate the second area without inputting the information by registering the designation information, the word, or the figure. That is, when the first area and the second area are designated in plural documents in the same way and the documents are read, it is not necessary to input the word or figure every document. For example, the designation information, the word, and the figure stored in the EEPROM 59 may be recorded in the ROM 57 in advance before shipping the scanner 10.

Similar to the first embodiment, the second glass 20 according to this embodiment may be configured to be vertically movable in the height direction of the scanner 10 as shown in FIG. 40.

As described above, the document reading surface 25 of the first glass 18 is tilted about the motion plane of the line sensor 40. Accordingly, the height of the reading surface 25 relative to the line sensor 40 is changed with the movement of the line sensor 40. By vertically moving the second glass 20 to allow the top surface of the second glass 20 and the reading surface 25 to be equal to each other in height, it is possible to change the reading mode in the FBS, thereby reading the document placed on the second glass 20. That is, in the FBS, it is also possible to read a document in the normal mode and the blur mode.

Third Embodiment

Hereinafter, a third embodiment of the invention will be described. The third embodiment is similar to the first and embodiments in configuration, except for configurations of the first glass 18 and peripheries thereof and configurations of the reference member 37 and peripheries thereof, and thus description of the other configurations will be omitted.

Figure 41:
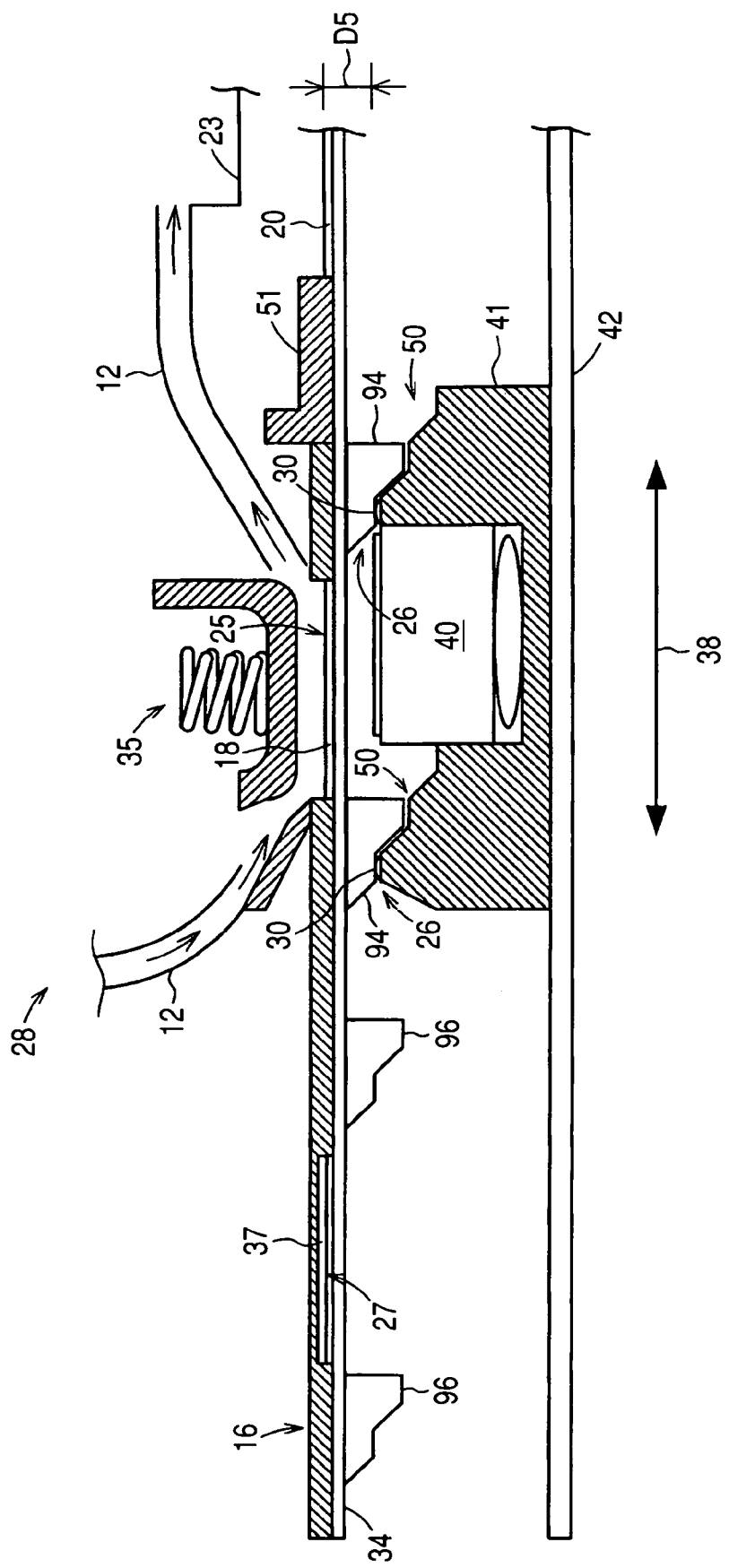
FIG. 41 is a cross-sectional view schematically illustrating a part of a conveying passage in a scanner according to a third embodiment of the invention.
Figure 42:
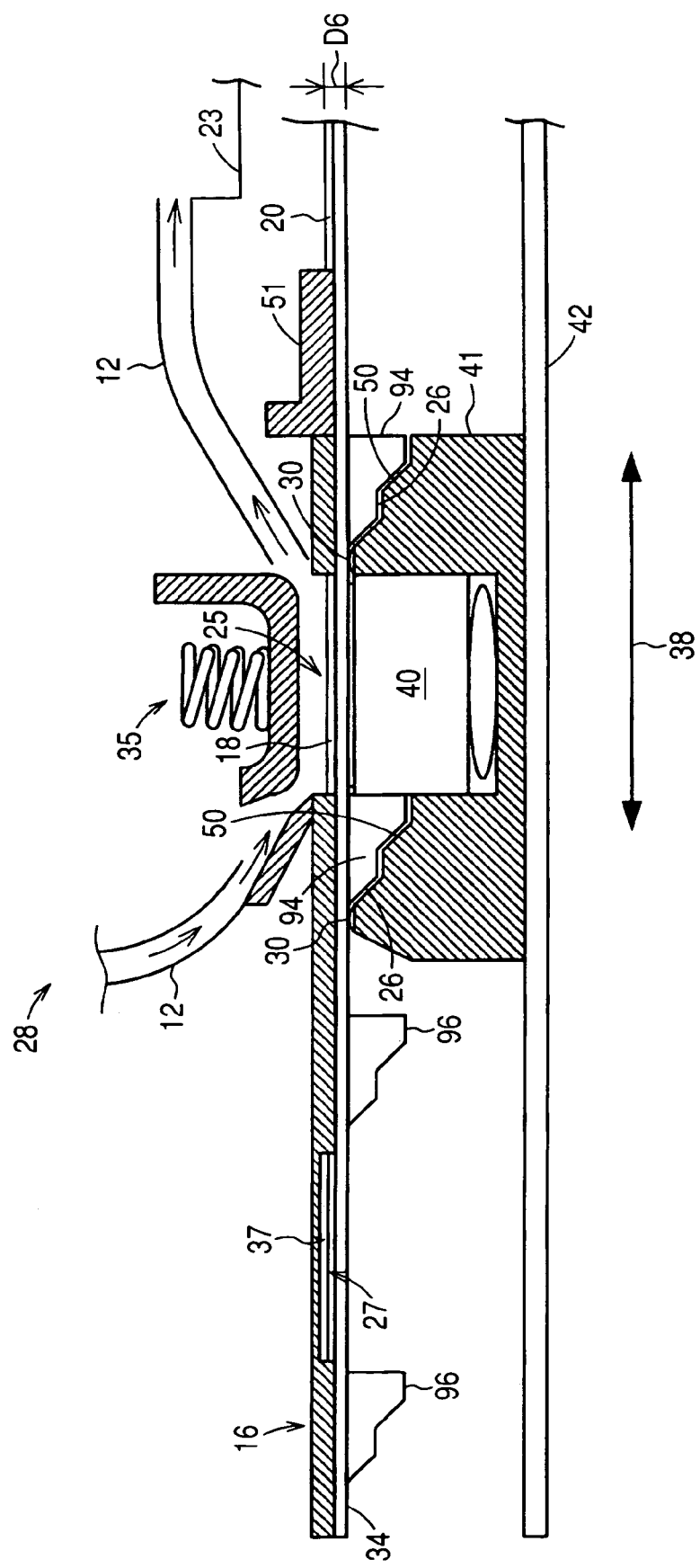
FIG. 42 is a cross-sectional view schematically illustrating a part of the conveying passage in the scanner according to the third embodiment of the invention.

FIGS. 41 and 42 are sectional diagrams schematically illustrating a part of the conveying passage 12 in the scanner 10 according to the third embodiment of the invention.

In the scanner 10 according to the third embodiment of the invention, the first glass 18 and the reference member 37 are parallel to the motion plane of the line sensor 40. On the rear surface of the guide member 34, first spacers 94 are disposed upstream and downstream in the document conveying direction of the first glass 18. The first spacers 94 are interposed between the carriage 41 and the first glass 18 in a state where the line sensor 40 is opposed to the first glass 18. The first spacers 94 are changed in thickness like a step in the moving direction (direction indicated by the arrow 38 in FIG. 41) of the line sensor 40. The first spacers 94 have a stepped portion 26 which increases in thickness from the upstream portion to the downstream portion in the conveying direction of the document conveyed by the ADF 28. On the other hand, the carriage 41 has stepped portions 50 at both ends in the longitudinal direction at which the rollers 30 are disposed. The stepped portions 50 are formed to gradually get higher from the downstream to the upstream in the conveying direction of the document conveyed by the ADF 28 so as to correspond to the stepped portions 26.

The guide shaft 42 is supported by the chassis 15 so as to be vertically movable in an upward biased state. The carriage 41 moves in the direction indicated by the arrow 38 so that the stepped portions 50 of the carriage 41 go down and up along the stepped portions 26. For example, the carriage 41 moves from the downstream to the upstream in the document conveying direction (see FIGS. 41 and 42). Accordingly, the height of the line sensor 40 mounted on the carriage 41 is changed. As a result, the first relative distance which is a relative distance between the line sensor 40 and the document reading surface 25 of the first glass 18 is changed from D5 to D6. Although a two-stepped portion 26 is formed in the first spacers 94 so as to change the first relative distance in two steps in FIGS. 41 and 42, the number of steps of the stepped portion 26 may be increased so that the first relative distance is changed in three or more steps.

Second spacers 96 are disposed at both ends of the reference member 37 in the width direction (direction indicated by the arrow 38) of the scanner 10. The second spacers 96 are interposed between the carriage 41 and the reference member 37 in a state where the line sensor 40 is opposed to the reference member 37. The second spacers 96 have the same shape as the first spacers 94. That is, the second spacer 96 is changed in thickness like a step in the moving direction (direction indicated by the arrow 38) of the line sensor 40. By allowing the line sensor 40 to move opposed to the reference member 37, the second relative distance between the line sensor 40 and the reading surface of the reference member 37 is gradually changed.

Figure 43:
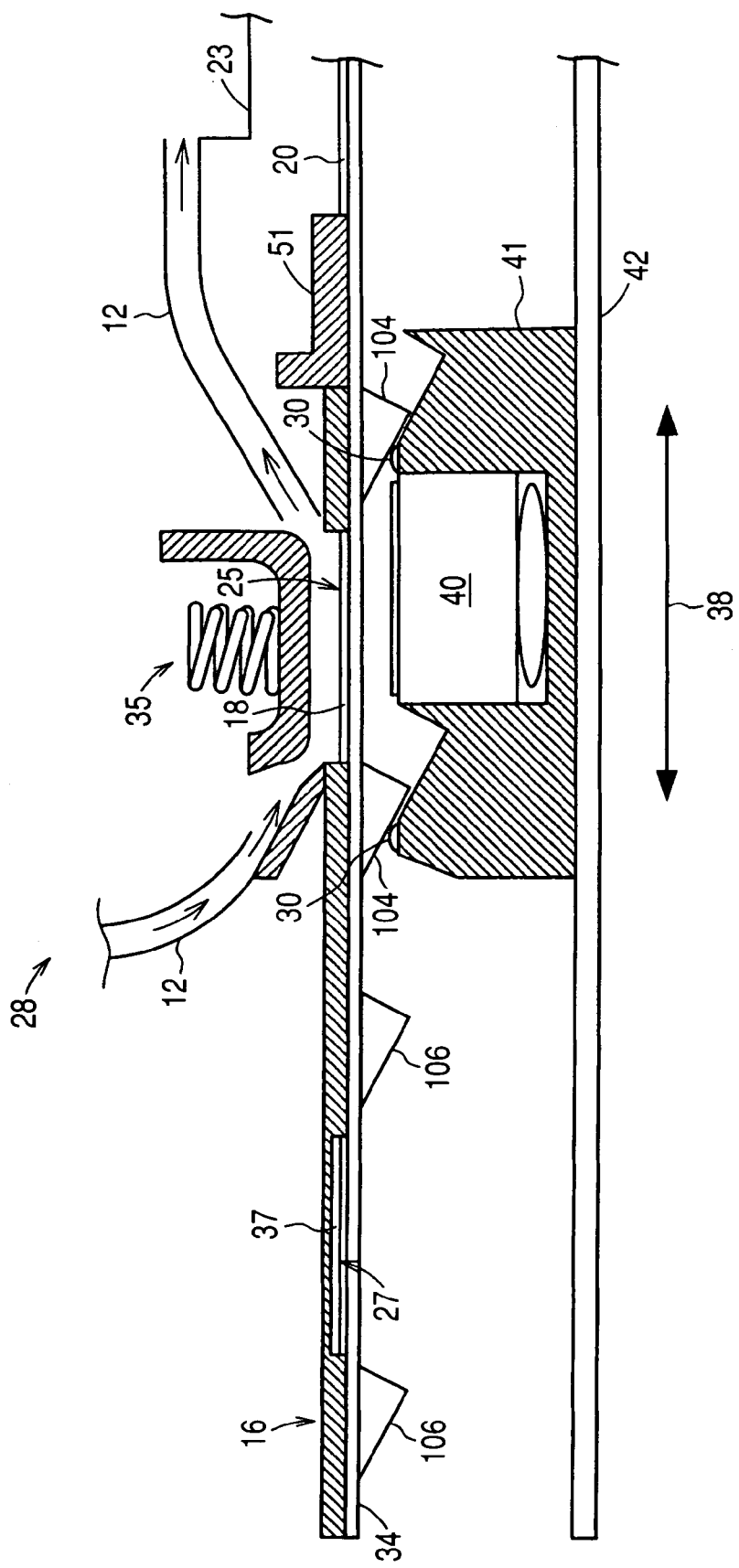
FIG. 43 is a cross-sectional view schematically illustrating a first spacer and a second spacer of the third embodiment.

FIG. 43 is a sectional diagram schematically illustrating first spacers 104 and second spacers 106.

The first spacers and the second spacers of the invention are not limited to the first spacers 94 and the second spacers 96. That is, the first spacers and the second spacers may be the first spacers 104 and the second spacers 106, respectively, which are changed in thickness like a wedge in the moving direction of the line sensor 40, as shown in FIG. 43.

According to the embodiments of the invention, the conveying document on the first transmissive portion and the document placed on the second transmissive portion can be read. The line sensor is disposed at a position opposed to the first transmissive portion by the driver at the time of reading the conveyed document. In the course of conveying the document along the passage, the line sensor applies light to the document through the first transmissive portion and reads the reflected light in the unit of a main scanning line. At the time of reading the document placed on the second transmissive portion, the line sensor is made to move along the second transmissive portion by the driver. In this course, the line sensor applies light to the document through the second transmissive portion and reads the reflected light in the unit of a main scanning line. The driver is driven by the control unit. With this driving, the relative distance between the reading surface of the document in the first transmissive portion and the line sensor is changed. That is, the relative distance is changed by the use of a driving source of the line sensor.

The image reading device is set to the first mode or the second mode by the setting unit. In the first mode, the line sensor is located at a position where the relative distance is substantially equal to the focal distance of the line sensor by the control unit. In this state, the conveyed document is read by the line sensor through the first transmissive portion. Since the document is read in a state where the line sensor is focused, a clear image of the document is obtained. In the second mode, the line sensor is located at a position where the relative distance is different from the focal distance by the control unit. In this state, the conveyed document is read by the line sensor through the first transmissive portion. Since the document is read in a state where the resolution of the line sensor is deteriorated, document image in which the occurrence of a moiré is suppressed or a document image which gets blurred is obtained.

A reading surface of the first transmissive portion may be tilted about a plane in which the line sensor moves.

According to the above-mentioned configuration, it is possible to easily change the relative distance without adding a new member for changing the relative distance.

A downstream portion of the reading surface of the first transmissive portion in a conveying direction of a document in the passage may be more apart from the plane in which the line sensor moves than an upstream portion thereof.

According to the above-mentioned configuration, the conveyed document contacts with the first transmissive portion and is pressed thereon. Accordingly, it is possible to prevent the relative distance from being changed due to the floating of the document from the first transmissive portion.

The image reading device may further include a first spacer of which the thickness varies like a step or like a wedge in a direction in which the line sensor moves and which is interposed between the line sensor and the first transmissive portion in a state where the line sensor is opposed to the first transmissive portion.

The first spacer is changed in thickness like a step or like a wedge in the moving direction of the line sensor. Accordingly, the line sensor gets close to or apart from the first transmissive portion as it is moved by the driving unit.

The image reading device may further include a reference member as a brightness reference of the line sensor that is read by the line sensor. Here, the control unit may change a relative distance between the reading surface of the reference member and the line sensor by actuating the driving unit.

According to the above-mentioned configuration, it is possible to allow the distances to the reference member and the reading surface to be equal to each other. Accordingly, it is possible to prevent an intensity difference between the light intensity for allowing the line sensor to read a document through the first transmissive portion and the light intensity for allowing the line sensor to read the reference member.

The reading surface of the reference member may be tilted about the plane in which the line sensor moves.

According to this configuration, it is possible to easily change the relative distance without newly adding a member for changing the relative distance between the line sensor and the reference member.

The image reading device may further include a second spacer of which the thickness varies like a step or like a wedge in the direction in which the line sensor moves and which is interposed between the line sensor and the reference member in a state where the line sensor is opposed to the reference member.

The second spacer is changed in thickness like a step or like a wedge in the moving direction of the line sensor. Accordingly, the line sensor gets close to or apart from the reference member as it is moved by the driving unit.

The image reading device may further include a reception unit that receives a selection of the first mode or the second mode. Here, the setting unit may set the first mode or the second mode on the basis of the selection received by the reception unit.

Accordingly, it is possible to easily change the resolution of the line sensor in accordance with a user's selection.

The control unit may control the line sensor to perform an operation of reading a test document having a predetermined pattern recorded thereon through the first transmissive portion at a plurality of positions which are different from each other in the relative distance. Here, the control unit may include: a calculation unit that calculates a modulation transfer function (MTF) value at the plurality of positions on the basis of an image signal of the test document acquired from the operation; and a decision unit that decides a reading position at which the line sensor is disposed by the driving unit on the basis of the calculated MTF values in the first mode and the second mode.

The test document has, for example, a white and black pattern recorded thereon. The test document is read by the line sensor through the first transmissive portion. The line sensor is made to move relative to the first transmissive portion by the driver. The position of the line sensor relative to the first transmissive portion is changed and the test document is read by the line sensor. Accordingly, an image signal of the test document is acquired every position at which the line sensor is disposed. The MTF value is calculated every position of the line sensor on the basis of the image signals and the reading positions for the first mode and the second mode are decided on the basis of the MTF values. The conveyed document is read through the first transmissive portion in a state where the line sensor is located at the different reading positions in the first mode and the second mode.

The image reading device may further include: a document tray on which a document to be conveyed along the passage is placed; a first notice unit generating a notice to request placing a first test document on the document tray; a first determination unit determining whether or not the first test document is placed on the document tray in response to the notice from the first notification unit; a second notification unit generates a notice to request placing a second test document on the document tray; and a second determination unit determining whether or not the second test document is placed on the document tray in response to the notice from the second notification unit. Here, the decision unit may decide a reading position for the first mode on the condition that the first determination unit determines that the first test document is placed and may decide a reading position for the second mode on the condition that the second determination unit determines that the second test document is placed.

By allowing a user to place the first test document on the document tray in response to the notice from the first notification unit, the reading position for the first mode is decided. By allowing a user to place the second test document on the document tray in response to the notice from the first notification unit, the reading position for the second mode is decided.

The decision unit may decide a position at which the MTF value is the maximum as the reading position for the first mode.

By setting the image reading device to the first mode, the document is read with the line sensor focused. Accordingly, it is possible to obtain a clearer document image in comparison with a case where it is set to the second mode.

The decision unit may decide as the reading position for the second mode a position at which the MTF value is less than the maximum value and equal to or greater than a threshold value.

By setting the image reading device to the second mode, the document is read with the line sensor not focused. Accordingly, an image in which the occurrence of the moire is suppressed or a blurred image is obtained, in comparison with a case where it is set to the first mode.

On the condition that the same MTF value is calculated plural times by the calculation unit, the decision unit may decide as the reading position a position at which the relative distance corresponding to the same MTF value is the minimum.

Accordingly, even when the document rises up from the first transmissive portion, it is possible to prevent the read image of the document from being extremely unclear.

The image reading device may further include a partitioning unit partitioning a reading area of the line sensor in the conveyed document into a plurality of sub areas. In this case, the decision unit may decide the reading position for the second mode every sub area, and the control unit may change the position of the line sensor to the reading position decided by the decision unit every sub area obtained by the partitioning unit in the course of reading the conveyed document in the second mode.

Information is input from the outside. The reading area of the conveyed document is partitioned into plural sub areas on the basis of the information. In this case, the reading position for the second mode is decided every sub area. In the second mode, the conveyed document is read by the line sensor through the first transmissive portion. The reading position of the line sensor is changed in each sub area in the course of reading the document. Accordingly, the resolution of the line sensor is changed by sub areas to read the document. As a result, in the obtained document image, the occurrence of the moire is suppressed and an image of a partial sub area is blurred.

The image reading device may further include an emphasis unit that emphasizes the document image read by the line sensor. In this case, the emphasis unit may emphasize the document image obtained in the first mode by the use of a first emphasis coefficient and may emphasize the document image obtained in the second mode by the use of a second emphasis coefficient greater than the first emphasis coefficient.

The document image read by the line sensor is emphasized by the emphasis unit. The image obtained in the second mode is emphasized with the emphasis coefficient larger than that of the document image obtained in the first mode. By reading the document in the second mode, the occurrence of the moire is suppressed and an image is prevented from being blurred.

According to embodiments of the invention, the image reading device reads the conveying document on the first transmissive portion and the document placed on the second transmissive portion. The line sensor is disposed at a position opposed to the first transmissive portion by the driving unit at the time of reading the conveyed document. In the course of conveying the document along the passage, the line sensor applies light to the document through the first transmissive portion and reads the reflected light in the unit of a main scanning line. At the time of reading the document placed on the second transmissive portion, the line sensor is made to move along the second transmissive portion by the driving unit. In this course, the line sensor applies light to the document through the second transmissive portion and reads the reflected light in the unit of a main scanning line. The driving unit is driven by the first control unit. With this driving, the relative distance between the reading surface of the document in the first transmissive portion and the line sensor is changed. That is, the relative distance is changed by the use of a driving source of the line sensor.

The reading area of the line sensor in the document is partitioned into plural sub areas by the partitioning unit. The reading area is partitioned on the basis of a document image obtained by pre-scanning the document or a user's setting. In the main scanning of the conveyed document, the relative distance between the reading surface of the document in the first transmissive portion and the line sensor is changed depending on the sub areas by actuating the driving unit moving the line sensor. Accordingly, it is possible to read the conveyed document in a state where a partial area of the document is made to be blurred, without providing a driving source different from the driving unit.

The image reading device may further include a first reception unit that receives a selection of a first mode in which the reading area is partitioned on the basis of the result of the pre-scanning or a second mode in which the reading area is partitioned on the basis of a user's setting. Here, on the condition that the selection of the first mode is received by the first reception unit, the partitioning unit may allow the line sensor to perform the pre-scanning and partition the reading area on the basis of the document image obtained from the pre-scanning. On the condition that the selection of the second mode is received by the first reception unit, the partitioning unit may partition the reading area on the basis of a user's setting without allowing the line sensor to perform the pre-scanning.

In the image reading device according to the embodiments of the invention, the selection of the first mode or the second mode is received by the first reception unit. In the first mode, the reading area is partitioned on the basis of the result of the pre-scanning. In the second mode, the reading area is partitioned on the basis of the user's setting. When the selection of the first mode is received, the pre-scanning is performed on the conveyed document by the line sensor. The reading area of the document to be read by the main scanning is partitioned on the basis of the document image obtained from the pre-scanning. Accordingly, it is possible to partition the reading area by analyzing the document image obtained from the pre-scanning, or to partition the reading area on the basis of the user's operation by displaying the document image obtained from the pre-scanning. When the selection of the second mode is received, the reading area of the document to be read by the main scanning is partitioned on the basis of the user's setting. For example, by setting the same reading area for plural documents, it is possible to read the plural documents with the same condition. The pre-scanning of a document is not performed in the second mode.

The image reading device may further include a correction unit that corrects the shading of the document image obtained from the main scanning process on the basis of white reference data and a change unit that changes the white reference data depending on reading areas of the document image of which the shading is corrected.

The document image obtained from the main scanning process is corrected in shading every reading area on the basis of the white reference data. Since the relative distance is changed in the main scanning process on the conveyed document, the intensity of the light reflected from the document to the line sensor is changed in the course of reading the document. By changing the white reference data depending on the reading areas, it is possible to obtain a document image with uniform image quality so as to correspond to the change in relative distance.

The partitioning unit may partition the reading area into a first area and a second area. The first control unit may control the line sensor to read the first area in a state where the relative distance is made to be substantially equal to the focal distance of the line sensor and may control the line sensor to read the second area in a state where the relative distance is made to be different from the focal distance.

The reading area of the document is partitioned into the first area and the second area by the partitioning unit. The line sensor is located at a position where the relative distance is substantially equal to the focal distance of the line sensor. In this state, the first area of the conveyed document is read by the line sensor through the first transmissive portion. The line sensor is located at a position where the relative distance is different from the focal distance of the line sensor. The second area of the conveyed document in this state is read by the line sensor through the first transmissive portion. The first area of the document is read in a state where the line sensor is focused and the second area of the document is read in a state where the line sensor is out of focus. As a result, a document image in which the first area is clear and the second area is blurred is obtained.

The image reading device may further include a first display unit that displays a first setting screen for inputting designation information for designating the first area or the second area and a second reception unit that receives an input of the designation information to the first setting screen. Here, the partition unit may partition the reading area on the basis of the designation information of which the input is received by the second reception unit.

The first setting screen is displayed in the image reading device. The first setting screen is used to input the designation information for designating the first area or the second area. A user inputs the designation information to the first setting screen. The reading area of the document is partitioned into the first area and the second area on the basis of the input designation information. Accordingly, it is possible to read a document in a state where a partial area of the document is blurred by allowing the user to arbitrarily designate the first area or the second area in the image reading device.

The image reading device may further include a first receiving unit that receives the designation information for designating the first area or the second area from a terminal device connected to the image reading device in a communicable manner. Here, the partitioning unit may partition the reading area on the basis of the designation information received by the first receiving unit.

The image reading device is connected to the terminal device in a communicable manner. The designation information transmitted from the terminal device is received by the first receiving unit. The reading area of a document in the main scanning process is partitioned into the first area and the second area on the basis of the designation information. Accordingly, it is possible to read a document in a state where a partial area of the document is blurred by allowing the user to arbitrarily designate the first area or the second area in the image reading device.

The image reading device may further include a second display unit that displays a document image obtained in the pre-scanning process and a third reception unit that receives an input of the designation information for designating the first area or the second area for the displayed document image. Here, the partitioning unit may partition the reading area on the basis of the designation information received by the third reception unit.

In the image reading device, the pre-scanned document image is displayed on the second display unit. The input of the designation information for designating an area of the displayed document image is received by the third reception unit. The reading area of a document in the main scanning process is partitioned into the first area and the second area on the basis of the designation information. Accordingly, a user can easily designate an area of a document to be blurred by viewing the pre-scanned image displayed in the image reading device.

The image reading device may further include a transmitting unit that transmits the pre-scanned document image to the terminal device connected to the image reading device in a communicable manner and a second receiving unit that receives the designation information for designating the first area or the second area for the transmitted document image from the terminal device. Here, the partitioning unit may partition the reading area on the basis of the designation information received by the second receiving unit.

The image reading device is connected to the terminal device in a communicable manner. The document image pre-scanned by the line sensor is transmitted to the terminal device. For example, in the terminal device, the document image is displayed on a monitor. The terminal device generates the designation information by allowing a user to view the document image displayed on the monitor and to make an operation input. The designation information is transmitted to the image reading device and is received by the second receiving unit. The reading area of the document in the main scanning process is partitioned into the first area and the second area on the basis of the designation information.

The image reading device may further include a first storage unit that stores the designation information for designating the first area or the second area and a fourth reception unit that receives the selection of the designation information stored in the first storage unit. The partitioning unit may partition the reading area on the basis of the designation information on the condition that the selection of the designation information is received by the fourth receiving unit.

The selection of the designation information stored in the first storage unit is received by the fourth reception unit. The reading area of the document is partitioned into the first area and the second area on the basis of the designation information. Accordingly, it is not necessary to input the designation information in the unit of a document when plural documents are read in a state where the reading areas are partitioned into the first area and the second area in the same way.

The image reading device may further include a third display unit that displays a second setting screen for inputting a word or figure, a fifth reception unit that receives an input of a word or figure to the second setting screen, and a detection unit that detects the word or figure of which the input is received by the fifth reception unit from the pre-scanned document image. Here, the partitioning unit may partition an area including the word or figure detected by the detection unit into the second area.

The second setting screen is displayed in the image reading device. The second setting screen is used to input a word or figure. A user inputs a word or figure to the second setting screen. The input word or figure is received by the fifth reception unit. The detection unit detects the word or figure from the pre-scanned document image. The area including the detected word or figure is partitioned into the second area by the partitioning unit. Accordingly, by allowing a user to input a word or figure, it is possible to read a document in a state where an area including the word or figure is blurred.

The image reading device may further include a second transmitting unit that transmits the pre-scanned document image to a terminal device connected to the image reading device in a communicable manner, a third receiving unit that receives a word or figure transmitted from the terminal device in response to the transmission of the document image, and a detection unit that detects the word or figure received by the third receiving unit from the pre-scanned document image. Here, the partitioning unit may partition an area including the word or figure detected by the detection unit into the second area.

The image reading device is connected to the terminal device in a communicable manner. The document image pre-scanned by the line sensor is transmitted to the terminal device. For example, in the terminal device, the document image is displayed on a monitor. The terminal device generates the word or figure information by allowing a user to view the document image displayed on the monitor and to make an operation input. The words or figures are transmitted to the image reading device and is received by the third receiving unit. The reading area of the document in the main scanning process is partitioned into the first area and the second area on the basis of the words or figures.

The image reading device may further include a second storage unit that stores the word or figure and a fifth reception unit that receives the selection of a word or figure stored in the second storage unit. Here, the detection unit may detect the word or figure from the pre-scanned document image on the condition that the selection of the word or figure is received by the sixth reception unit.

The selection of the word or figure stored in the second storage unit is received by the sixth reception unit. In the reading area of a document, the area including the word or figure is partitioned into the second area. Accordingly, it is not necessary to input the word or figure in the unit of a document when plural documents are read in a state where the reading areas thereof are partitioned into the first area and the second area in the same way.

The image reading device according to the embodiments of the invention may further include: a second control unit that allows the line sensor to perform an operation of reading a test document having a predetermined pattern recorded thereon through the first transmissive portion at a plurality of positions different from each other in the relative distance; a calculation unit that calculates an MTF (Modulation Transfer Function) value at each position on the basis of an image signal of the test document obtained from the operation; and a decision unit that decides a reading position where the line sensor is located by the driving unit at the time of reading the first area of the conveyed document in the main scanning process and a reading position where the line sensor is located by the driving unit at the time of reading the second area of the document on the basis of the MTF values.

The test document has, for example, a black and white pattern recorded thereon. The test document is read by the line sensor through the first transmissive portion. The line sensor is moved relative to the first transmissive portion by the driving unit. The position of the line sensor relative to the first transmissive portion is changed and the test document is read by the line sensor. Accordingly, the image signal of the test document is obtained every position where the line sensor is located. The MTF value is calculated every position of the line sensor on the basis of the image signals. The reading position where the line sensor is located at the time of reading the first area and the reading position where the line sensor is located at the time of the second area are decided on the basis of the MTF values. Accordingly, the relative distance is changed in the first area and the second area.

The decision unit may decide a position having the maximum MTF value as the reading position of the line sensor for reading the first area.

According to this configuration, the first area of the document is main-scanned in a state where the line sensor is focused. Accordingly, a document image in which the first area is clear is obtained.

The decision unit may decide a position where the MTF value is a predetermined % of the maximum value as the reading position of the line sensor for reading the second area.

By properly setting the predetermined %, a document image in which the second area is properly blurred is obtained from the main scanning process.

What is claimed is:

1. An image reading device comprising:
a conveying unit configured to convey a recording medium on a first path;
a first transmissive portion having a first surface that allows the recording medium to pass the first surface;
a second transmissive portion having a second surface on which a recording medium is allowed to be placed;
an image reading unit comprising a line sensor extending in a first direction and movable on a second path, the second path continuously extending below the first transmissive portion and below the second transmissive portion, the image reading unit configured to read an image of the recording medium passing the first surface and an image of the recording medium placed on the second surface;
a driver configured to move the image reading unit on the second path; and
a control unit configured to drive the driver to control a movement of the image reading unit,
wherein the second path below the second transmissive portion extends along the second surface in a second direction perpendicular to the first direction,
wherein a relative distance of a third direction perpendicular to the first and second directions between the line sensor and the first surface changes in the second path below the first transmissive portion, and
wherein the control unit is operable to perform: a first reading mode in which the reading unit is positioned at a first reading position and reads the image of the recording medium passing the first surface, the relative distance at the first reading position is a first relative distance; and a second reading mode in which the reading unit is positioned at a second reading position and reads the image of the recording medium passing the first surface, the relative distance at the second reading position is a second distance different than the first distance.

2. The image reading device according to claim 1, wherein the first surface of the first transmissive portion is tilted with respect to the second path below the first transmissive portion.

3. The image reading device according to claim 2, wherein an upstream end of the first surface in a conveying direction of the recording medium in the first path is spaced from the line sensor with a first relative distance, and a downstream end of the first surface in the conveying direction is spaced from the line sensor with a second relative distance that is larger than the first relative distance.

4. The image reading device according to claim 1, further comprising a first spacer having a thickness in the third direction which varies along the second direction, the first spacer interposed between the image reading unit and the first transmissive portion in a state where the line sensor is opposed to the first transmissive portion.

5. The image reading device according to claim 1, further comprising a reference portion as a brightness reference of the line sensor to be read by the line sensor,
wherein the second path continuously extends below the reference portion,
wherein a relative distance of the third direction between the line sensor and the reference portion changes in the second path below the first transmissive portion.

6. The image reading device according to claim 5, wherein the reference portion is tilted with respect to the second path below the reference portion.

7. The image reading device according to claim 5, further comprising a second spacer having a thickness in the third direction which varies along the second direction, the second spacer is interposed between the image reading unit and the reference portion in a state where the line sensor is opposed to the reference portion.

8. The image reading device according to claim 1, wherein the first relative distance is substantially equal to a focal distance of the line sensor.

9. The image reading device according to claim 8, further comprising a setting unit configured to set one of the first reading mode and the second reading mode.

10. The image reading device according to claim 9, further comprising a reception unit configured to receive a selection of the first mode or the second mode,
wherein the setting unit sets one of the first mode and the second mode according to the selection received by the reception unit.

11. The image reading device according to claim 8, further comprising an emphasis unit configured to emphasize the image read by the line sensor, wherein the emphasis unit emphasizes the image obtained in the reading first mode by using a first emphasis coefficient and emphasizes the image obtained in the second mode by using a second emphasis coefficient greater than the first emphasis coefficient.

12. The image reading device according to claim 8, wherein the control unit is configured to allow the image reading unit to perform a test reading operation to read a test document having a predetermined pattern recorded thereon through the first surface at a plurality of reading positions which are different from one another in the relative distance, and wherein the control unit includes:
a calculation unit configured to calculate modulation transfer function (MTF) values at the plurality of reading positions based on image signal of the test document obtained in the test reading operation; and
a decision unit configured to decide at least one of the first reading position and the second reading position based on the calculated MTF values.

13. The image reading device according to claim 12, wherein the decision unit configured to decide a reading position corresponding to a maximum MTF value as the first reading position.

14. The image reading device according to claim 12, wherein the decision unit decides, as the second reading position, a position corresponding to a MTF value less than a maximum MTF value and equal to or greater than a threshold value.

15. The image reading device according to claim 12, wherein, on a condition that a same MTF value is obtained at plural positions by the calculation unit, the decision unit decides, as the first or second reading position, a position corresponding to the same MTF value at which the relative distance is the minimum.

16. The image reading device according to claim 12, further comprising a partitioning unit configured to partition a reading area of the line sensor with respect to the conveyed recording medium into a plurality of sub areas and to designate a reading mode to each of the sub areas, wherein the control unit changes the position of the line sensor to the reading position corresponding to the designated reading mode designated by the partitioning unit for the respective sub area in a course of reading the reading medium passing the first surface.

17. The image reading device according to claim 12, further comprising:
a document tray that allows the recording medium to be placed thereon and to be fed into the first path;
a first notification unit configured to generate a first notice to request placing a first test document on the document tray;
a first determination unit configured to determine whether or not the first test document is placed on the document tray in response to the first notice;
a second notification unit configured to generate a second notice to request placing a second test document on the document tray; and
a second determination unit configured to determine whether or not the second test document is placed on the document tray in response to the second notice,
wherein the control unit starts the test reading operation and activate the calculation unit and the decision unit to decide the first reading position on a condition that the first determination unit determines that the first test document is placed, and the control unit starts the test reading operation and activate the calculation unit and the decision unit to decide the second reading position on a condition that the second determination unit determines that the second test document is placed.

18. The image reading device according to claim 1, further comprising: a partitioning unit configured to partition a reading area of the line sensor with respect to the conveyed recording medium into a plurality of sub areas and to designate a reading mode to each of the sub areas.

19. The image reading device according to claim 18,
wherein the control unit is operable to perform a second scanning process and optionally perform a first scanning process, the second scanning process that allows the image reading unit to read a recording medium, and the first scanning process that is performed prior to the second scanning process and allows the image reading unit to read the recording medium in the first reading mode, and
when the first scanning process is performed, the second scanning process allows the image reading unit to read the recording medium having been read in the first scanning process.

20. The image reading device according to claim 19 further comprising:
a first reception unit configured to receive a selection of a first partition mode in which the reading area is partitioned based on a result of the first scanning process or a second partition mode in which the reading area is partitioned based on the preset designation,
wherein, on a condition that the first reception unit receives the selection of the first mode, the partitioning unit allows the image reading unit to perform the first scanning process and partition the reading area based on an image obtained in the first scanning process, and
wherein, on a condition that the first reception unit receives the selection of the second mode, the partitioning unit partition the reading area based on the preset designation without allowing the image reading unit to perform the first scanning process.

21. The image reading device according to claim 20,
wherein the plurality of sub areas include: a first reading area to be scanned in the first reading mode; and a second reading area to be scanned in the second reading mode,
wherein, in the first partition mode, the control unit allows the image reading unit to perform the second scanning process in the second reading mode,
wherein the control unit is configured to synthesize: an image corresponding to the first reading area obtained in the first scanning process; and an image corresponding to the second reading area obtained in the second scanning process.

22. The image reading device according to claim 20,
wherein, in the second partition mode, the control unit allows a position of the line sensor to change a reading position corresponding to the designated reading mode for the respective sub area in a course of reading the reading medium during the second scanning process.

23. The image reading device according to claim 20, further comprising:
a data storage unit configured to store white reference data in correspondence with a plurality of the reading modes,
a correction unit configured to correct a shading of the image obtained in the second scanning process based on the white reference data; and
a selecting unit configured to select the white reference data stored in the data storage unit depending on the reading mode designated in the respective sub area of which the shading is corrected.

24. The image reading device according to claim 20, wherein the partitioning unit partitions the reading area into a first area and a second area, and wherein the control unit controls the line sensor to read the sub first area in a state where the first distance is substantially equal to the focal distance of the line sensor and controls the line sensor to read the second area in a state where the second distance is be different from the focal distance.

25. The image reading device according to claim 24, further comprising:

a first display unit configured to display a first setting screen that requests an input of designation information for designating at least one of the first area and the second area; and a second reception unit configure to receive an input of the designation information in response to the first setting screen, wherein the partition unit partitions the reading area based on the designation information received by the second reception unit.

26. The image reading device according to claim 24, further comprising:

a first receiving unit connectable to a terminal device and configured to receive designation information for designating at least one of the first area and the second area from the terminal device, wherein the partitioning unit partitions the reading area based on the designation information received by the first receiving unit.

27. The image reading device according to claim 24, further comprising:

a second display unit configured to display the image obtained in the first scanning process; and a third reception unit configured to receive an input of designation information for designating at least one of the first area and the second area for the displayed image, wherein the partitioning unit partitions the reading area based on the designation information received by the third reception unit.

28. The image reading device according to claim 24, further comprising:

a transmitting unit connectable to a terminal device and configured to transmit an image obtained in the first scanning process to the terminal device connected; and a second receiving unit connectable to the terminal device and configured to receive designation information for designating at least one of the first area and the second area for the transmitted image from the terminal device, wherein the partitioning unit partitions the reading area based on the designation information received by the second receiving unit.

29. The image reading device according to claim 24, further comprising:

a first storage unit configured to store designation information for designating at least one of the first area and the second area; and a fourth reception unit configured to receive a selection of the designation information stored in the first storage unit wherein the partitioning unit partitions the reading area based on the designation information on a condition that the selection of the designation information is received by the fourth receiving unit.

30. The image reading device according to claim 24, further comprising:

a third display unit configured to display a second setting screen that requests an input of at least one character or figure;

a fifth reception unit configured to receives an input of the character or figure in response to the second setting screen; and a detection unit configured to detect the word or figure received by the fifth reception unit from the image obtained in the first scanning process, wherein the partitioning unit defines an area including the character or figure detected by the detection unit as the second area.

31. The image reading device according to claim 24, further include a second transmitting unit connectable to a terminal device and configured to transmit the image obtained in the first scanning process to a terminal device;

a third receiving unit configured to receive at least one character or figure transmitted from the terminal device in response to a transmission of the image; and a detection unit configured to detect the character or figure received by the third receiving unit from the image obtained in the first scanning process, wherein the partitioning unit defines an area including the character or figure detected by the detection unit as the second area.

32. The image reading device according to claim 31, further comprising:

a second storage unit configured to store at least one of the character and figure; and a fifth reception unit configured to receive a selection of the character or figure stored in the second storage unit, wherein the detection unit detects the character or figure from the image obtained in the first scanning process on a condition that the selection of the character or figure is received by the sixth reception unit.

33. The image reading device according to claim 24, further comprising:

a second control unit configured to allow the image reading unit to perform a test reading operation to read a test document having a predetermined pattern recorded thereon through the first surface at a plurality of positions different from each other in the relative distance;

a calculation unit configured to calculate modulation transfer function (MTF) values at the plurality of reading positions based on image signal of the test document obtained in the test reading operation; and a decision unit configured to decide a reading position where the line sensor is located by the driving unit at a time of reading the first area of the conveyed recording medium in the second scanning process and a reading position where the line sensor is located by the driving unit at a time of reading the second area of the recording medium based on the MTF values.

34. The image reading device according to claim 33, wherein the decision unit decides a position having the maximum MTF value as the reading position of the image reading unit for reading the first area.

35. The image reading device according to claim 33, wherein the decision unit may decides a position where the MTF value has a predetermined ratio to the maximum value as the reading position of the image reading unit for reading the second area.

* * * * *